(12) United States Patent
Serizawa et al.

(10) Patent No.: US 10,444,758 B2
(45) Date of Patent: Oct. 15, 2019

(54) AUTONOMOUS TRAVELING DEVICE

(71) Applicants: Keiichi Serizawa, Kanagawa (JP); Kazuhiro Takabayashi, Tokyo (JP); Daisuke Maeda, Kanagawa (JP)

(72) Inventors: Keiichi Serizawa, Kanagawa (JP); Kazuhiro Takabayashi, Tokyo (JP); Daisuke Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 223 days.

(21) Appl. No.: 15/365,258

(22) Filed: Nov. 30, 2016

(65) Prior Publication Data

US 2017/0153641 A1    Jun. 1, 2017

(30) Foreign Application Priority Data

Dec. 1, 2015 (JP) .................. 2015-235228

(51) Int. Cl.
| | |
|---|---|
| *G05D 1/02* | (2006.01) |
| *G05D 1/00* | (2006.01) |
| *G08G 1/16* | (2006.01) |
| *G06K 9/00* | (2006.01) |
| *G01C 3/08* | (2006.01) |

(Continued)

(52) U.S. Cl.
CPC .............. *G05D 1/024* (2013.01); *G01C 3/08* (2013.01); *G01C 21/3407* (2013.01); *G05D 1/0088* (2013.01); *G05D 1/0244* (2013.01); *G05D 1/0272* (2013.01); *G05D 1/0274* (2013.01); *G06K 9/00664* (2013.01); *G06K 9/00805* (2013.01); *G06K 9/2036* (2013.01); *G08G 1/16* (2013.01); *G05D 2201/0216* (2013.01)

(58) Field of Classification Search
CPC .... G05D 1/024; G05D 1/0088; G05D 1/0244; G05D 1/00; G01C 3/08; G01C 1/3407
USPC ............................................. 701/23
See application file for complete search history.

(56) References Cited

U.S. PATENT DOCUMENTS

| | | | |
|---|---|---|---|
| 9,383,753 B1 * | 7/2016 | Templeton | ............ G05D 1/0246 |
| 9,958,379 B1 * | 5/2018 | Zhu | ........................ G01S 17/10 |

(Continued)

FOREIGN PATENT DOCUMENTS

| | | |
|---|---|---|
| JP | 2003-121546 | 4/2003 |
| JP | 2003-287693 | 10/2003 |

(Continued)

*Primary Examiner* — Krishnan Ramesh
(74) *Attorney, Agent, or Firm* — Oblon, McClelland, Maier & Neustadt, L.L.P.

(57) ABSTRACT

An autonomous traveling device includes a vehicle body, a traveling body to move the vehicle body, a ranging device to consecutively change a direction of emission of light beams while optically scanning a scanning range, and a reflection body to change a direction of an optical path of at least part of light beams emitted from the ranging device and reflected to an area other than a center area of the scanning range. Further, an autonomous traveling device includes an optical path changing device. The optical path changing device changes an angle of inclination downwardly relative to a scanning plane of the ranging device and changes a direction of an incident light from a lateral direction to a forward direction of the vehicle body. Further, the optical path changing device changes a direction of an incident light toward a foot area of the vehicle body.

17 Claims, 31 Drawing Sheets

(51) Int. Cl.
*G01C 21/34* (2006.01)
*G06K 9/20* (2006.01)

(56) References Cited

U.S. PATENT DOCUMENTS

| | | | | |
|---|---|---|---|---|
| 2015/0362921 | A1* | 12/2015 | Hanaoka | G01B 11/24 701/23 |
| 2016/0062361 | A1* | 3/2016 | Nakano | G05D 1/024 701/25 |
| 2016/0132056 | A1* | 5/2016 | Yoshino | G01S 17/08 701/23 |
| 2016/0152241 | A1* | 6/2016 | Denda | B60W 40/12 701/23 |
| 2016/0170412 | A1* | 6/2016 | Yamamoto | G05D 1/024 701/23 |
| 2016/0274840 | A1* | 9/2016 | Bannai | G06F 3/1238 |
| 2017/0240170 | A1* | 8/2017 | Tani | G08G 1/16 |

FOREIGN PATENT DOCUMENTS

| | | |
|---|---|---|
| JP | 2011-096170 | 5/2011 |
| JP | 2016-130964 | 7/2016 |
| JP | 2016-156922 | 9/2016 |
| JP | 2016-159985 | 9/2016 |
| JP | 2016-160062 | 9/2016 |
| JP | 2016-173731 | 9/2016 |
| JP | 2016-175757 | 10/2016 |
| JP | 2016-175775 | 10/2016 |

* cited by examiner

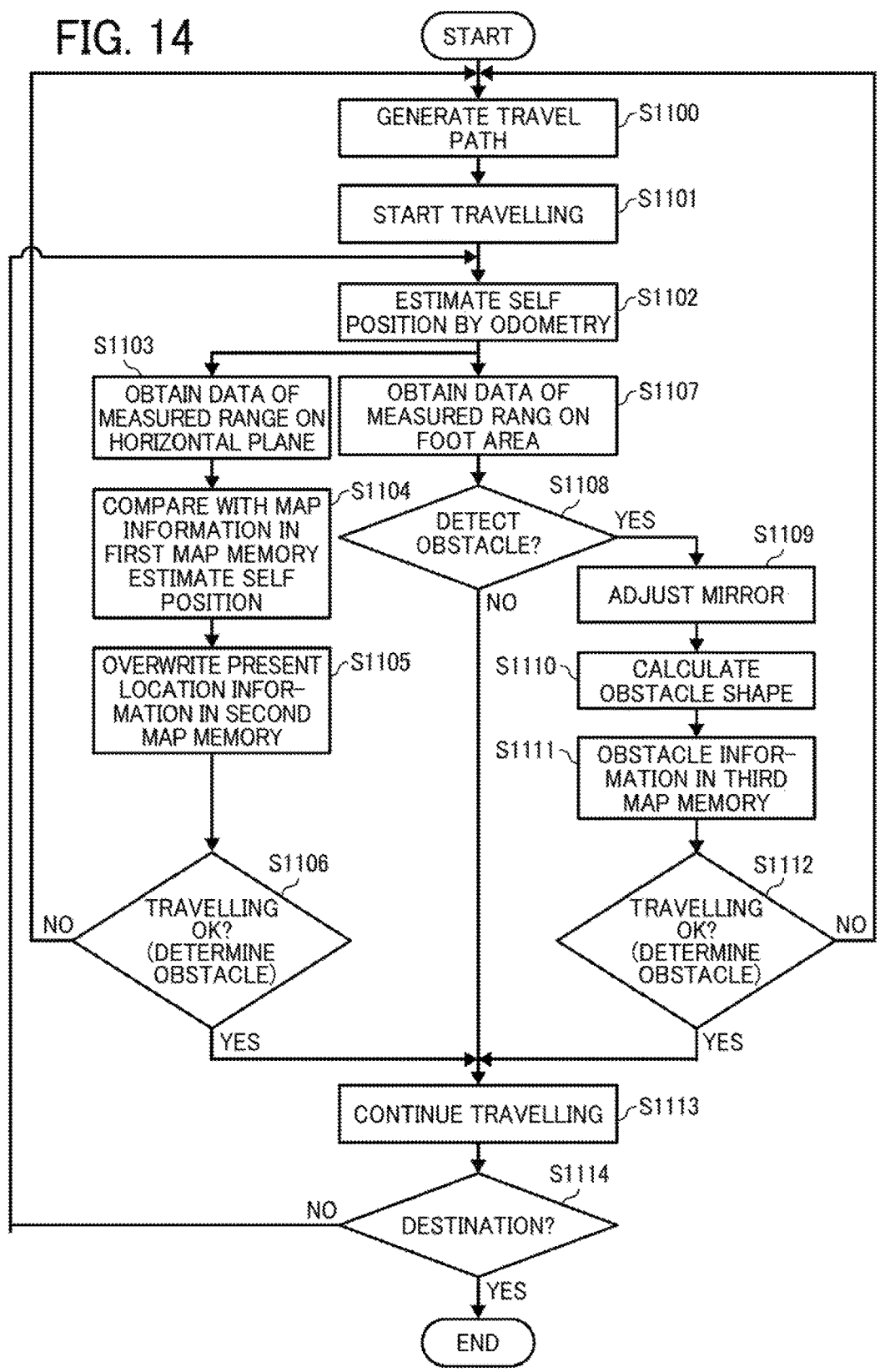

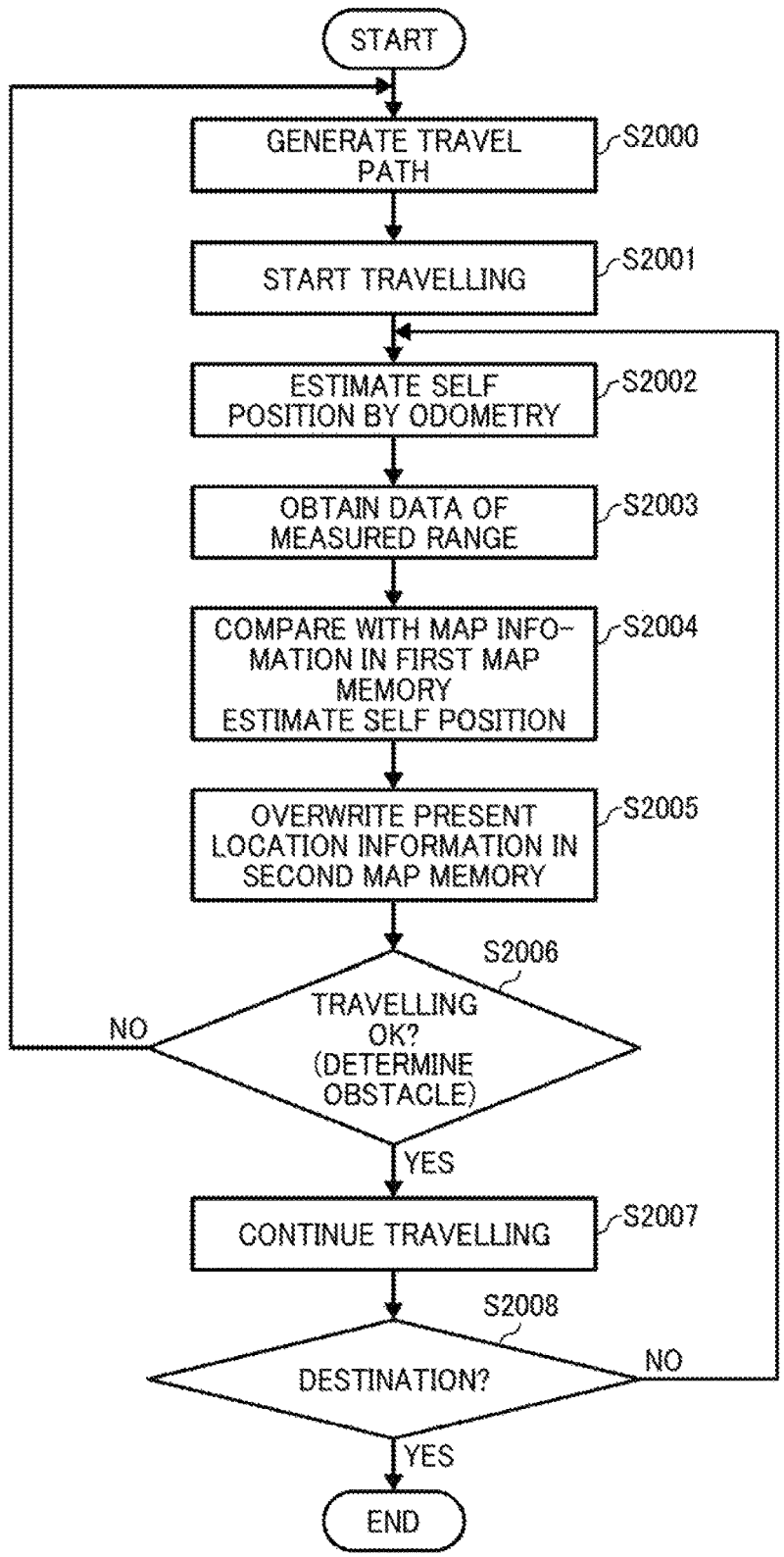

AUTONOMOUS TRAVELING DEVICE

CROSS-REFERENCE TO RELATED APPLICATION

This patent application is based on and claims priority pursuant to 35 U.S.C. § 19(a) to Japanese Patent Application No. 2015-235228, filed on Dec. 1, 2015, in the Japan Patent Office, the entire disclosure of which is hereby incorporated by reference herein.

BACKGROUND

Technical Field

This disclosure relates to an autonomous traveling device having a ranging device to measure distance to an object.

Related Art

Autonomous traveling devices are known to include an optical scanning ranging sensor such as a laser rangefinder that consecutively changes a light emitting direction of laser light to detect an obstacle or obstacles around a target.

For example, a known autonomous traveling device includes a configuration in which laser light is emitted to scan the front of the autonomous traveling device. By receiving the reflection light reflected by an object in a region of detection, the autonomous traveling device measures distance to the object.

SUMMARY

At least one aspect of this disclosure provides an autonomous traveling device including a vehicle body, a traveling body configured to move the vehicle body, a ranging device configured to consecutively change a direction of emission of light beams while optically scanning a scanning range, and a reflection body configured to change a direction of an optical path of at least part of light beams emitted from the ranging device and reflected to an area other than a center area of the scanning range.

Further, at least one aspect of this disclosure provides an autonomous traveling device including a vehicle body, a traveling body configured to move the vehicle body, a ranging device configured to consecutively change a direction of emission of light beams while optically scanning a scanning range, and an optical path changing device configured to change a direction of an optical path of at least part of light beams emitted from the ranging device and reflected to an area other than a center area of the scanning range. The optical path changing device changes an angle of inclination downwardly relative to a scanning plane of the ranging device and changes a direction of an incident light from a lateral direction to a forward direction of the vehicle body.

Further, at least one aspect of this disclosure provides an autonomous traveling device including a vehicle body, a traveling body configured to move the vehicle body, a ranging device configured to consecutively change a direction of emission of light beams while optically scanning a scanning range, and an optical path changing device configured to change a direction of an optical path of at least part of light beams emitted from the ranging device and reflected to an area other than a center area of the scanning range. The optical path changing device includes a device configured to change a direction of an incident light toward a foot area of the vehicle body.

BRIEF DESCRIPTION OF THE SEVERAL VIEWS OF THE DRAWINGS

FIG. 14 is a flowchart of a control operation of the autonomous traveling robot according to Embodiment 2;

FIG. 31 is a flowchart of a control operation of the autonomous traveling robot according to Embodiment 6.

DETAILED DESCRIPTION

Figure 1A:
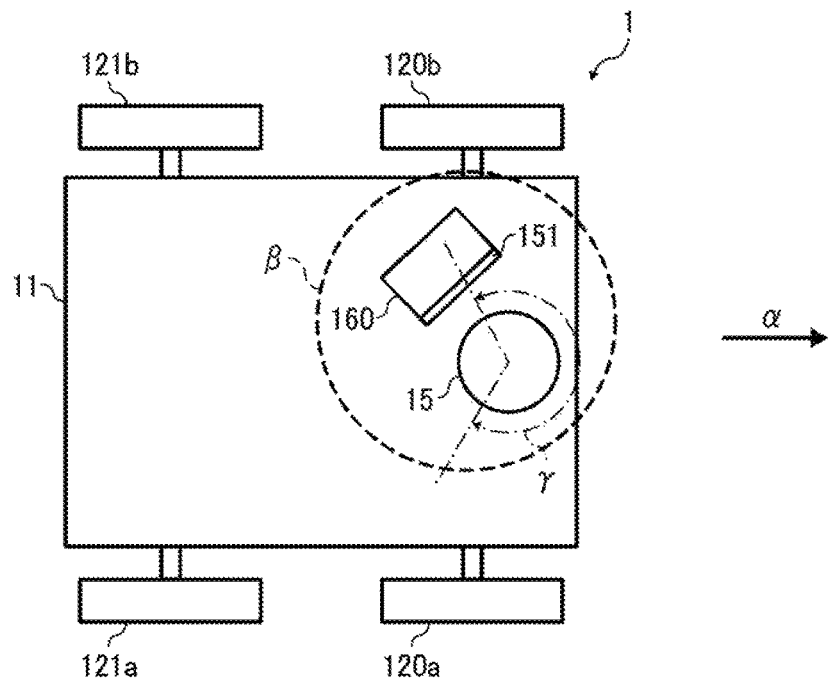
FIG. 1A is a top view illustrating a position and optical path of a mirror included in an autonomous traveling robot according to Embodiment 1 of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

It is to be noted that, size (dimension), material, shape, and relative positions used to describe each of the components and units are examples, and the scope of this disclosure is not limited thereto unless otherwise specified.

Embodiment 1

Descriptions are given of an autonomous robot 1 according to Embodiment 1 of this disclosure, with reference to the following figures.

Figure 2A:
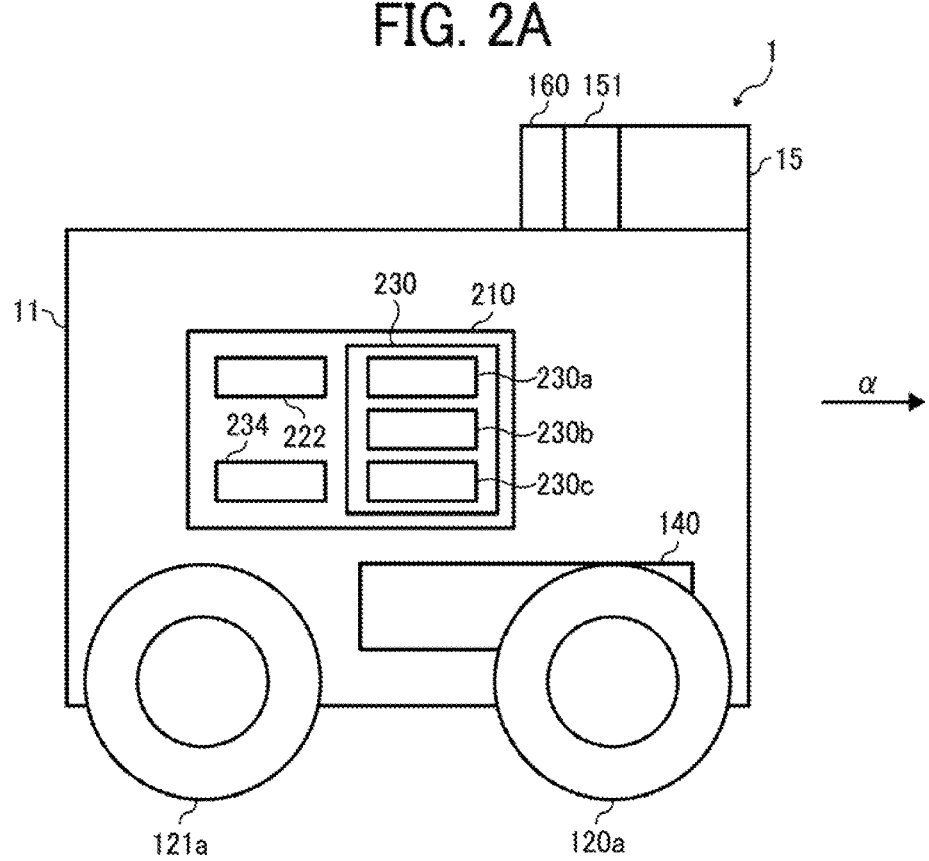
FIG. 2A is a side view illustrating the autonomous traveling robot according to Embodiment 1 of this disclosure.
Figure 2B:
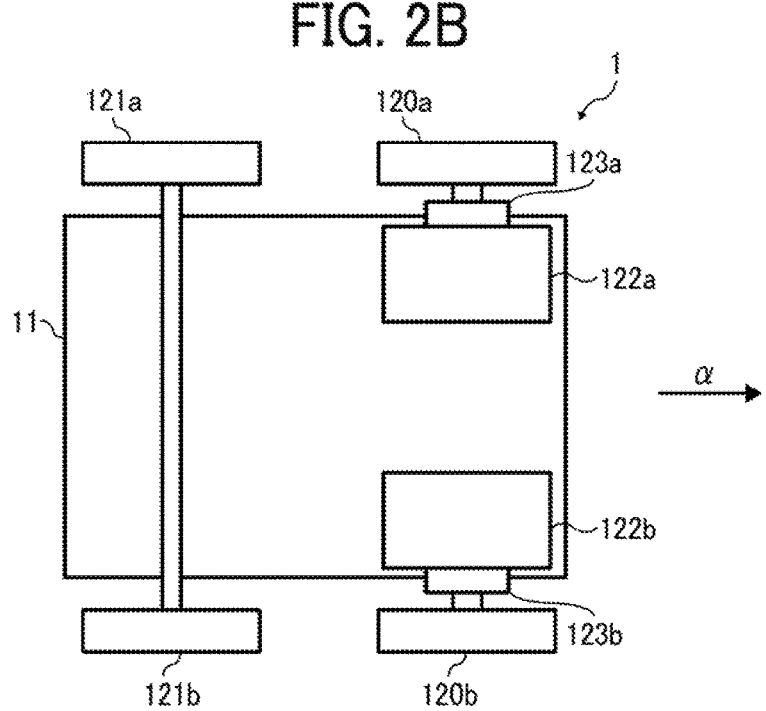
FIG. 2B is a bottom view illustrating the autonomous traveling robot according to Embodiment 1 of this disclosure.

FIG. 2A is a side view illustrating a schematic configuration of the autonomous traveling device 1 that functions as an autonomous traveling device according to Embodiment 1 of this disclosure. FIG. 2B is a bottom view illustrating the configuration of the autonomous traveling device 1 of FIG. 2A.

There are various types of autonomous traveling robots, such as an autonomous traveling robot to convey objects to a designated place automatically and an autonomous traveling robot to tow a dolly. The autonomous traveling robot 1 according to the present embodiment is applicable to any of these types.

As illustrated in FIG. 2, the autonomous traveling robot 1 includes a vehicle body 11, drive wheels 120, auxiliary wheels 121, drive motors 122, encoders 123, and a calculator 210. Each of the encoders 123 detects the number of rotations of the drive wheels 120. The calculator 210 performs control of autonomous travel. The encoders 123, the drive motors 122, the drive wheels 120, and the auxiliary wheels 121 form a driving section (see FIG. 8).

The autonomous traveling robot 1 includes two drive wheels 120, two drive motors 122, and two encoders 123. Specifically, a right drive motor 122a transmits a driving force to a right drive wheel 120a and a right encoder 123a detects the number of rotations of the right drive wheel 120a. A right auxiliary wheel 121a moves along with rotation of the right drive wheel 120a. Similarly, a left drive motor 122b transmits a driving force to a left drive wheel 120b and a left encoder 123b detects the number of rotations of the left drive wheel 120b. A left auxiliary wheel 121b moves along with rotation of the left drive wheel 120b.

A direction indicated by arrow α in FIG. 2 is a forward travel direction in which the autonomous traveling robot 1 moves straight forward. The forward travel direction is the right side of the autonomous traveling robot 1 in FIG. 2. It is to be noted that the forward travel direction is also referred to simply as a travel direction.

The calculator 210 contains a drive motor controller 222, a map data base memory 230, and a path calculator 234.

The drive motor controller 222 generates a control signal to drive the drive wheels 120 and transmits the control signal to the drive motors 122. The map data base memory 230 stores map data used to control autonomous traveling. The path calculator 234 calculates a path and a distance to a designated destination.

The map data base memory 230 includes a first map memory 230a, a second map memory 230b, and a third map memory 230c. The first map memory 230a stores map information that is previously stored. The second map memory 230b stores obstacle information to be obtained by horizontal scanning. The third map memory 230c stores obstacle information to be obtained by foot scanning. Accordingly, map information, obstacle information through horizontal scanning, and obstacle information through foot scanning are stored in different places separately.

The speed and distance of movement of the autonomous traveling robot 1 are obtained based on the number of rotations of the drive wheels 120 (i.e., the right drive wheel 120a and the left drive wheel 120b) detected by the encoder 123 (i.e., the right encoder 123a and the left encoder 123b).

In addition, the vehicle body 11 contains a battery 140 that functions as a power source of the autonomous traveling robot 1. The autonomous traveling robot 1 also includes a laser ranging sensor 15 at the front. The laser ranging sensor 15 is a non-contact type sensor to recognize obstacles that appear in a direction of movement of the autonomous traveling robot 1. In the present embodiment, the laser ranging sensor 15 includes a laser rangefinder (hereinafter, also referred to as an "LRF") and is disposed such that the light emitting direction of the laser light is set to be substantially horizontal.

The laser ranging sensor 15 emits laser light while consecutively changing a direction of emission of light beams (hereinafter, also referred to as a light emitting direction) and receives reflection light reflected from an object within a fan-shaped detection range. By so doing, the laser ranging sensor 15 measures distance to the object. Further, the laser ranging sensor 15 is fixed to the autonomous traveling robot 1 so that a forward direction toward a center area of the scanning range matches with the travel direction when the autonomous traveling robot 1 moves straight forward. The laser range sensor 15 forms an obstacle detecting section (see FIG. 8).

When distance information of a distance to the obstacle recognized by the laser ranging sensor 15 is inputted to the calculator 210, the calculator 210 performs a control of autonomous traveling to generate a travel path.

In the control of autonomous traveling, the self position of the autonomous traveling robot 1 is estimated by matching the map information that is previously stored in the first map memory 230a, a distance of movement that is estimated by an odometry (that is, the distance of movement is calculated based on the number of rotations of the encoders 123), and distance information that is detected by the laser ranging sensor 15.

The autonomous traveling robot 1 including the above-described configuration controls an amount of driving of the right drive wheel 120a and an amount of driving of the left drive wheel 120b individually. By so doing, various movement of travel such as straight forward moving, curving, rearward moving, and circulating can be performed. Consequently, when a destination that is designated by a user or is previously programmed is inputted, the path calculator 234 generates a travel path. In order to follow the travel path, the drive motor controller 222 controls the drive motors 122 (i.e., the right drive motor 122a and the left drive motor 122b), so that the autonomous traveling device 1 reaches the destination.

In the map data base memory 230 provided inside the calculator 210, map information is stored in the first map memory 230a. The map information is a grid map that is obtained by illustrating with grid lines connecting grid points aligned at constant intervals over the shape of an entire use area. When the autonomous traveling robot 1 is to operate, a destination is previously set on the grid map of the map information. The obstacle information detected by the laser ranging sensor 15 is set to each grid at real time. Then, the autonomous traveling robot 1 moves to the destination along the generated travel path.

Alternatively, the autonomous traveling robot 1 may perform autonomous travel in the use area while the laser ranging sensor 15 is detecting the distance before operating the autonomous traveling robot 1, so that the detected obstacle information is previously stored in the map information stored in the first map memory 230a.

Figure 3:
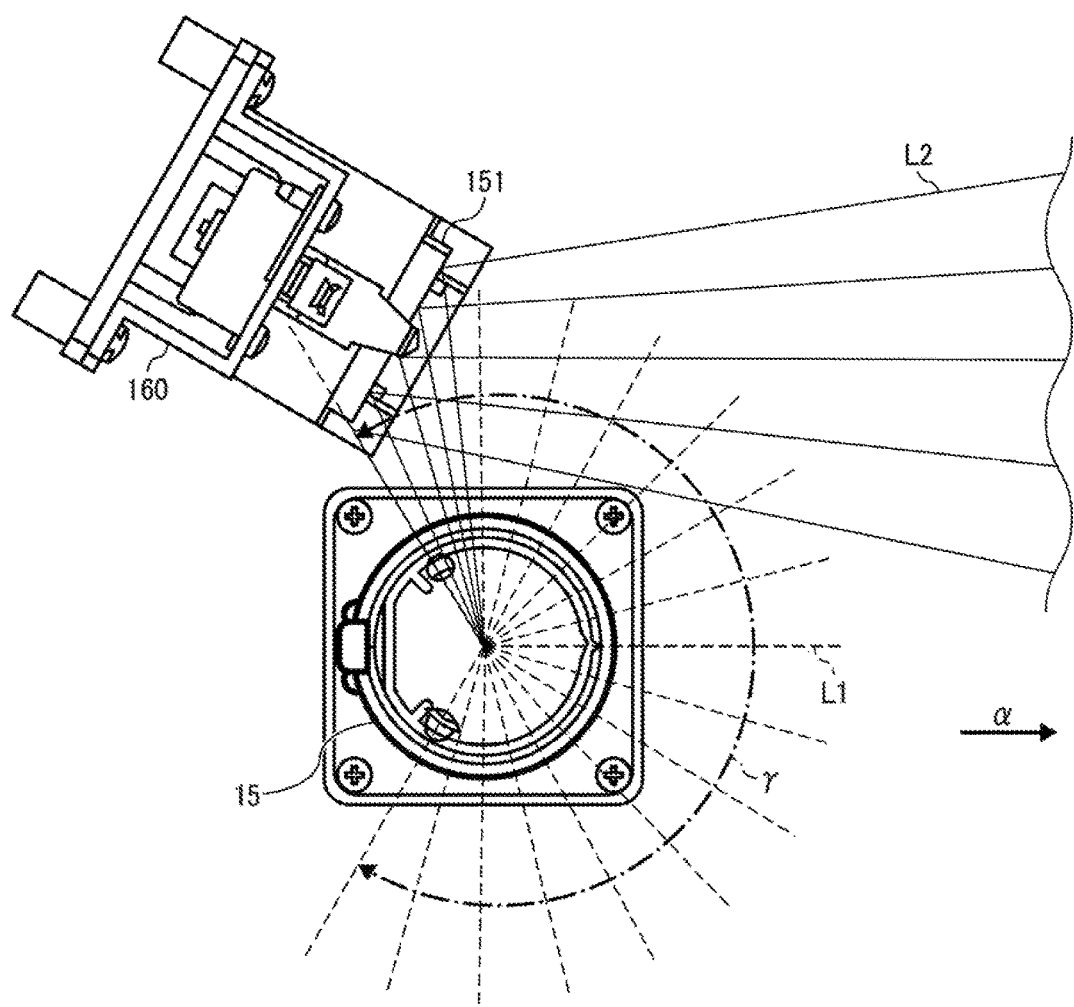
FIG. 3 is an enlarged top view illustrating a region indicated by a dotted line β in FIG. 1A.

FIG. 1A is a top view illustrating positions of the laser ranging sensor 15 and a mirror 151 and an optical path of laser light in the autonomous traveling robot 1 according to Embodiment 1 of this disclosure. FIG. B is a right side view of the autonomous traveling robot 1 according to Embodiment 1. FIG. 3 is an enlarged top view illustrating a region indicated by a dotted line β in FIG. 1A.

A range indicated by arrow γ in a dotted line in FIGS. 1A and 3 indicates a scanning range in which the laser ranging sensor 15 emits light to measure distance.

Figure 1B:
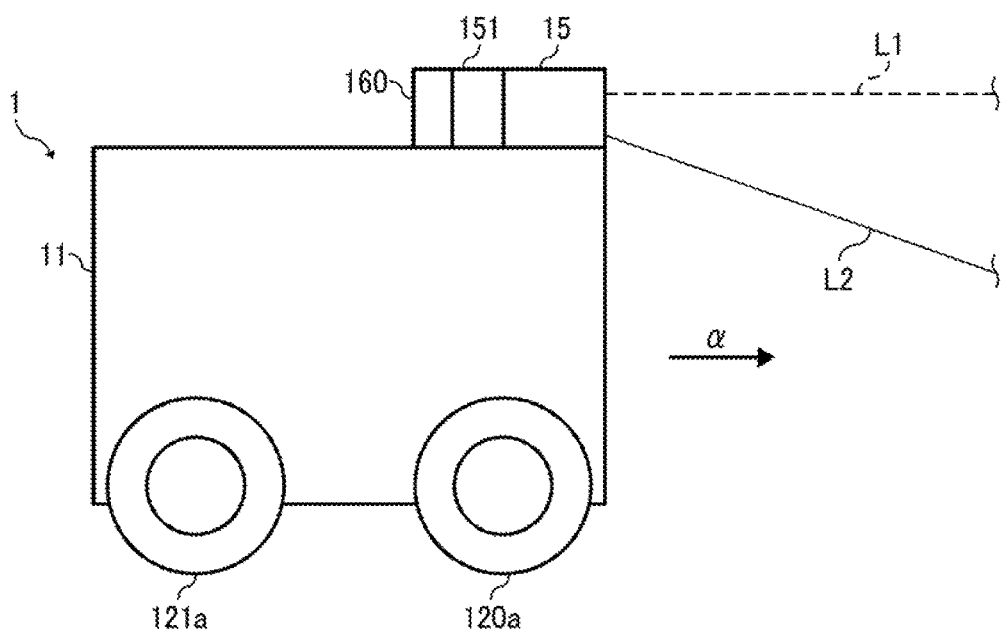
FIG. 1B is a right side view illustrating the position and optical path of the mirror included in the autonomous traveling robot according to Embodiment 1 of this disclosure.

The autonomous traveling robot 1 has the mirror 151 at a rear side of the scanning range γ from the laser ranging sensor 15 as a center, with respect to the travel direction indicated by arrow α in FIGS. 1A, 1B, and 3. The mirror 151 is fixed to the vehicle body 11 by a mirror retaining unit 160.

A dashed line L1 in FIGS. 1B and 3 represents a direct laser light L1 that performs horizontal scanning along a scanning face of the laser ranging sensor 15. By contrast, a solid line L2 in FIGS. 1B and 3 represents a reflection laser light L2 that is emitted from the laser ranging sensor 15 and is reflected on the mirror 151 to perform foot scanning in the travel direction of the autonomous traveling robot 1.

By disposing the mirror 151 described above, while horizontal scanning in a horizontal direction is being performed, foot scanning in the travel direction can also be performed simultaneously by reflecting part of the laser light in the scanning range γ by the mirror 151, without changing an arrangement angle of the mirror 151. Accordingly, ranging in the travel direction on a virtual horizontal surface including a light emitting position from which the laser ranging sensor 15 emits light and ranging around a foot area in the travel direction can be performed at the same time. It is to be noted that the "foot area" indicates an area immediately in front or back of the autonomous traveling robot 1 or an immediate forward or rearward vicinity.

Figure 4:
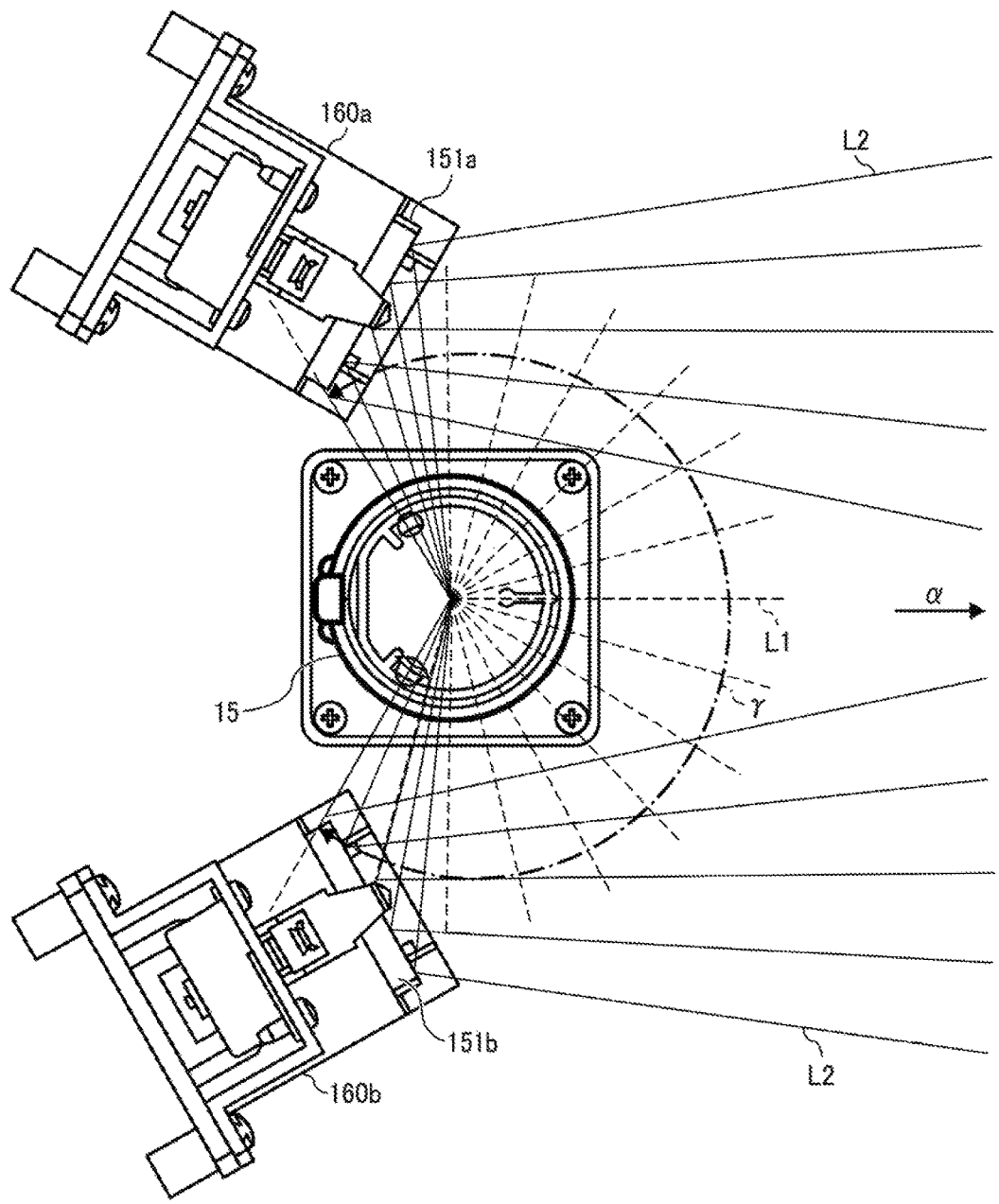
FIG. 4 is an enlarged top view illustrating the autonomous traveling robot according to Embodiment 1, including two mirrors and a ranging sensor disposed near the autonomous traveling robot.

FIG. 4 is an enlarged top view illustrating the autonomous traveling robot 1 according to Embodiment 1, including two mirrors, which are a first mirror 151a and a second mirror 151b, and an adjacent area of the autonomous traveling robot 1 near the laser ranging sensor 15.

In FIG. 4, the first mirror 151a and the second mirror 151b are disposed at the rear side of the scanning range γ of the laser ranging sensor 15. The first mirror 151a and the second mirror 151b have different arrangement angles. Consequently, this configuration can measure distance at multiple levels using a single unit of the laser ranging sensor 15.

Figure 5A:
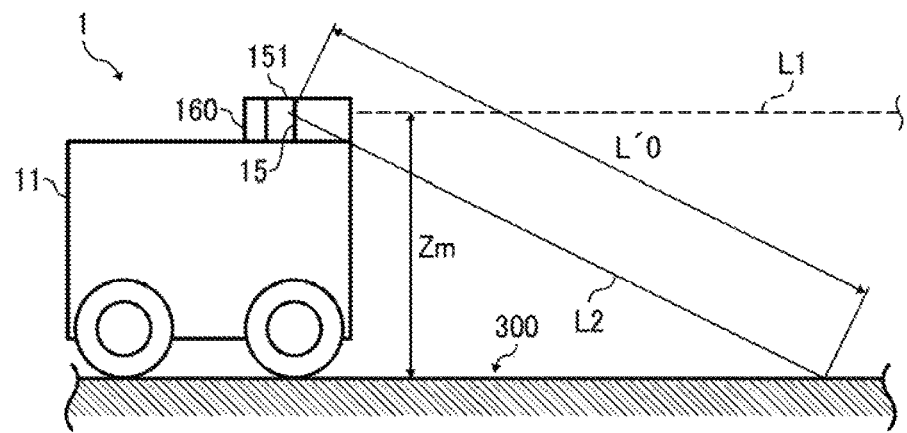
FIG. 5A is a diagram illustrating how to detect irregularity of a foot area of the autonomous traveling robot.
Figure 5B:
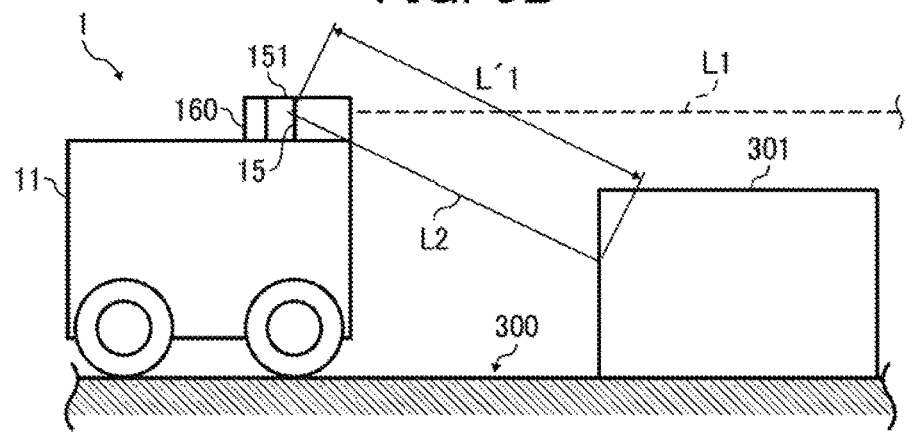
FIG. 5B is a diagram illustrating a state in which an obstacle is disposed in a travel direction of the autonomous traveling robot.
Figure 5C:
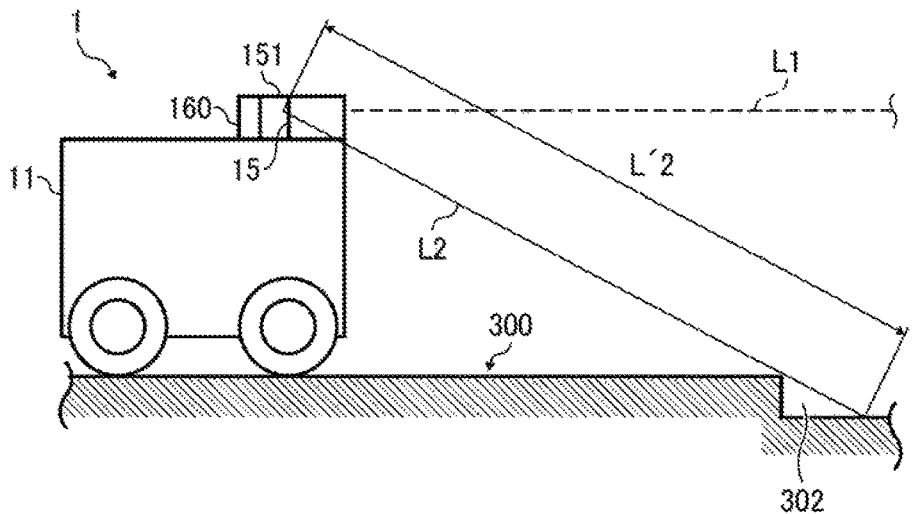
FIG. 5C is a diagram illustrating a state in which a recess is found in the travel direction.

FIGS. 5A through 5C are diagrams illustrating how to detect irregularity of foot area of the autonomous traveling robot 1. FIG. 5A is a diagram illustrating a state in which no irregularity is found in the travel direction. FIG. 5B is a diagram illustrating a state in which an obstacle 301 that is lower than the laser ranging sensor 15 is disposed on a floor 300 in the travel direction of the autonomous traveling robot 1. FIG. 5C is a diagram illustrating a state in which a recess 302 is formed on the floor 300 in the travel direction of the autonomous traveling robot 1.

As illustrated in FIG. 5A, when the obstacle 301 and the recess 302 are not found in the travel direction of the autonomous traveling robot 1, the floor 300 is detected by the reflection laser light L2. At this time, an object to which the reflection laser light L2 is emitted is the floor 300. Then, the laser ranging sensor 15 detects a distance "L'0" that is geometrically calculated based on layout conditions, as a distance from the mirror 151 to the object. The layout conditions include horizontal positions and heights of the laser ranging sensor 15 and the mirror 151 in the autonomous traveling robot 1 and a degree of inclination of the mirror 151.

By contrast, as illustrated in FIG. 5B, when the obstacle 301 is found on the floor 300 in the travel direction, the reflection laser light L2 is emitted to a side face of the obstacle 301. At this time, the laser ranging sensor 15 detects a distance "L'1" from the mirror 151 to an object, that is, the obstacle 301. The distance "L'1" is shorter than the distance "L'0" previously set to detect the floor 300.

In addition, as illustrated in FIG. 5C, when the recess 302 is found on the floor 300 in the travel direction, the reflection laser light L2 is emitted to a of a bottom face of the recess 302. At this time, the laser ranging sensor 15 detects a distance "L'2" from the mirror 151 to an object, that is, the bottom face of the recess 302. The distance "L'2" is shorter than the distance "L'0" previously set to detect the floor 300.

After having detected the obstacle 301 or the recess 302 in the travel direction, the autonomous traveling robot 1 calculates the travel path to avoid the obstacle 301 and the recess 302 detected by the calculator 210, based on the map information previously stored and the estimated self position.

In a state in which the reflection laser light L2 is emitted at the side face of the obstacle 301, as illustrated in FIG. 5B, the distance L'1 decreases as the autonomous traveling robot 1 approaches the obstacle 301. Then, when the reflection laser light L2 is emitted on a top face of the obstacle 301, the distance L'1 remains constant even though the autonomous traveling robot 1 approaches the obstacle 301. Accordingly, when the reflection laser light L2 comes to emit on the top face of the obstacle 301, a height of the obstacle 301 can be recognized based on the distance L'1. Therefore, when the obstacle 301 has a height over which the autonomous traveling robot 1 can climb, the autonomous traveling robot 1 may not avoid the obstacle 301 but may climb over the obstacle 301 to move to the destination along the initial travel path.

Next, a description is given of a method of calculating the laser range using the reflection laser light L2 in the autonomous traveling robot 1 according to Embodiment 1, with reference to FIGS. 6A, 6B, 7A, and 7B.

Figure 6A:
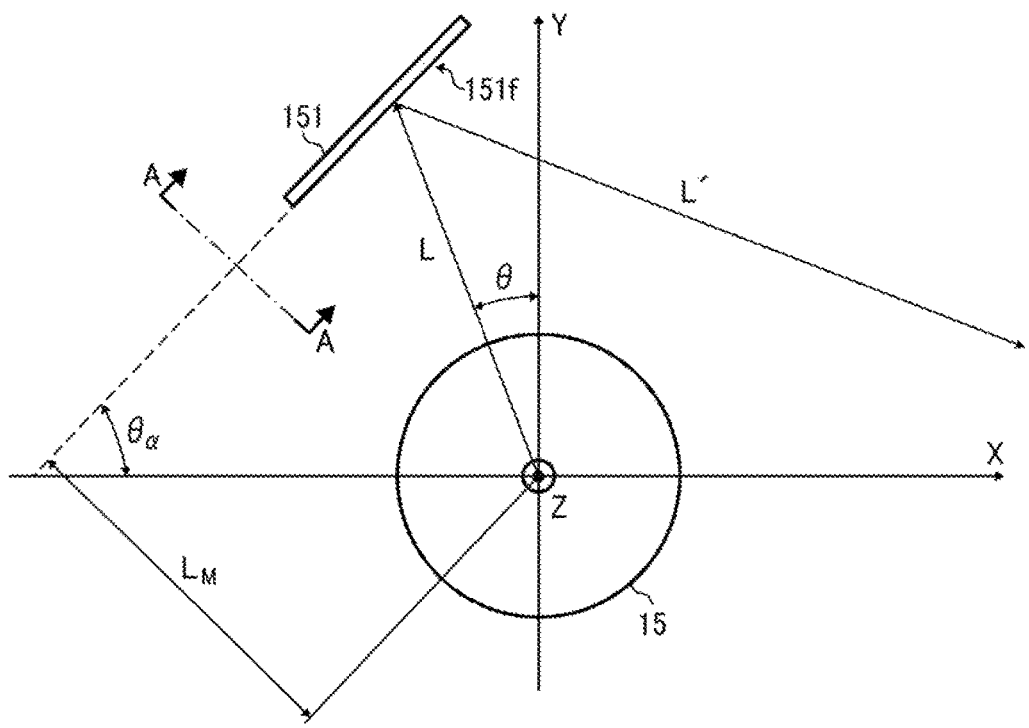
FIG. 6A is a top view illustrating how to calculate a laser range using coordinates when the center of the LRF functions as a point of origin.
Figure 6B:
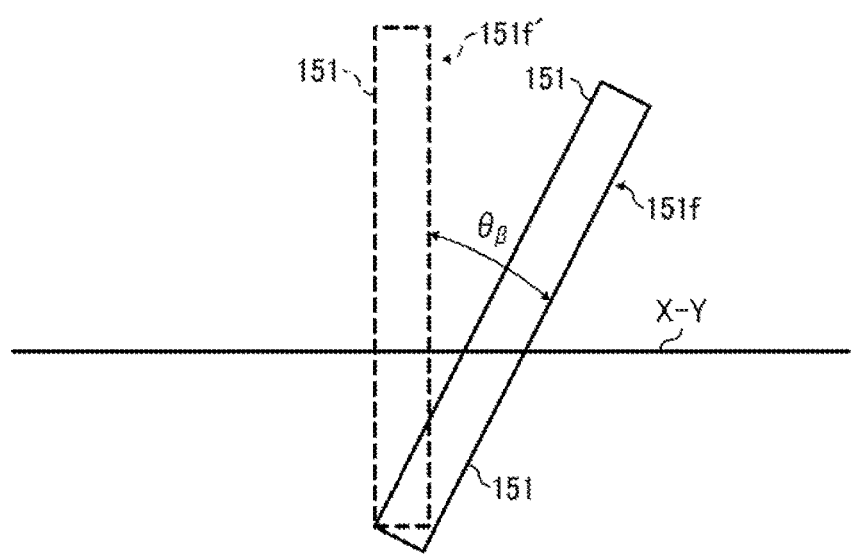
FIG. 6B is a diagram illustrating an angle of inclination of the mirror.

FIGS. 6A and 6B are diagrams illustrating a calculation method using coordinates having an origin that is a center of a light emitting position (i.e., the center of an LRF) from which the laser ranging sensor 15 emits laser light while consecutively changing the light emitting direction. FIG. 6A is a top view of the laser ranging sensor 15 and the mirror 151. FIG. 6B is a diagram illustrating an angle of inclination β of the mirror 151, viewed along a line A-A of FIG. 6A.

A straight line X-Y in FIG. 6B indicates a plane X-Y.

Figure 7A:
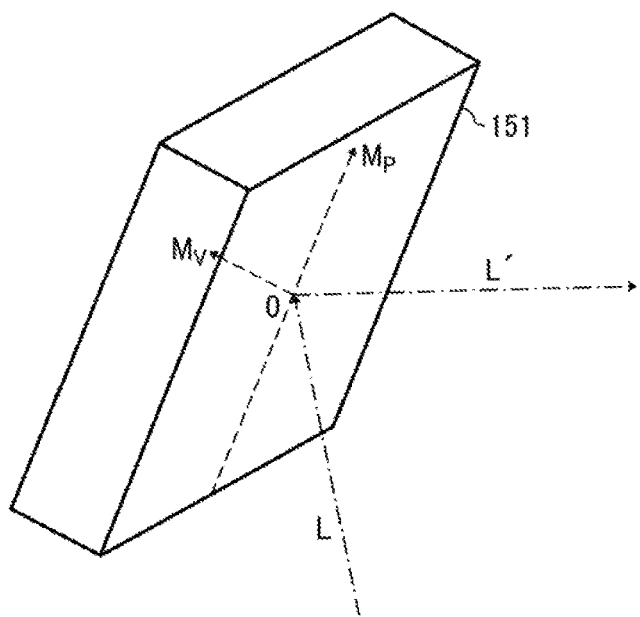
FIG. 7A is a perspective view illustrating a method of calculating a laser range using coordinates with a mirror reflection point as an origin with a position of the mirror reflection point indicated.
Figure 7B:
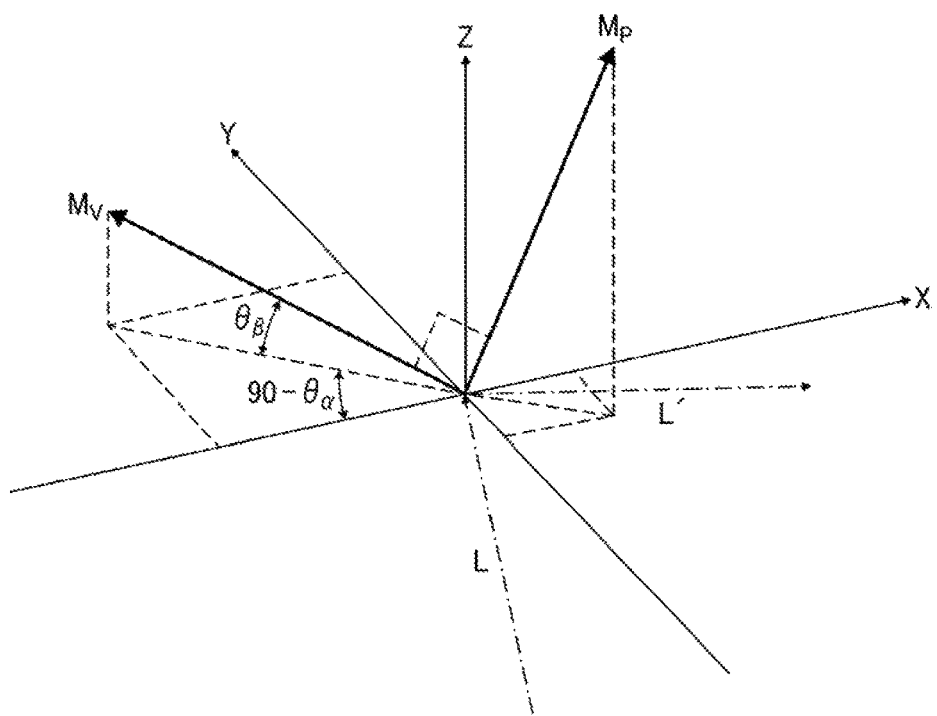
FIG. 7B is a diagram illustrating the method of calculating a laser range using three-dimensional coordinates.

FIGS. 7A and 7B are diagram illustrating a calculation method using coordinates having an origin that is a mirror reflection point of the mirror 151 on the surface of which the reflection laser light L2 reflects. FIG. 7A is a perspective view illustrating a position of a mirror reflection point "0" of the mirror 151. FIG. 7B is a diagram illustrating a calculation method using three-dimensional coordinates having an origin that is the reflection point "0".

In FIGS. 6A through 7B, an X-axis represents the travel direction (indicated by arrow α) of the autonomous traveling robot 1, a Y-axis represents a horizontal direction (a left and right direction) perpendicular to the X-axis, and a Z-axis represents a vertical direction that directs upward.

Axial Eccentricity of Z-axis of Mirror: θα,
Axial Eccentricity of X-axis of Mirror: θβ,
Emission Angle from LRF: θ,
Distance from Scanning Plane to Floor: Zm (See FIG. 5A),
Distance from Center of LRF to Mirror Surface: LM,
Distance from Center of LRF to Mirror Reflection Point: L, and
Line Length of Reflected Light from Mirror Reflection Point to Target Object: N.

The above-described "θβ" is an angle formed by a virtual mirror reflection face 151*f* extends perpendicular to the X-Y plane indicated by the dashed line in FIG. 6B and a mirror reflection face 151*f* that is inclined to the plane X-Y.

An incident light from the LRF (i.e., the laser ranging sensor 15) to the mirror 151 is represented by vector in Expression 1.

$$\vec{L}(A,B,C) \qquad \text{Expression 1.}$$

Then, Expression 2 is obtained.

$$A=-|L|\cdot\sin\theta\ B=|L|\cdot\cos\theta\ C=0 \qquad \text{Expression 2.}$$

When "L" is expressed with "LM" and "θα" that are layout parameters, Expression 3 is obtained.

$$|L| = \frac{L_M}{\cos(\theta_\alpha - \theta)}. \qquad \text{Expression 3}$$

Based on Expression 2 and Expression 3, Expression 4 is obtained.

$$\vec{L}(A,B,C) \qquad \text{Expression 4.}$$

Expression 4 is expressed by Expression 5.

$$A = \frac{-L_M \cdot \sin\theta}{\cos(\theta_\alpha - \theta)} \quad B = \frac{L_M \cdot \cos\theta}{\cos(\theta_\alpha - \theta)} \quad C = 0. \qquad \text{Expression 5}$$

Next, the mirror reflection face 151*f* is represented by vector.

A vector vertical to the mirror reflection face 151*f* is represented by Expression 6.

$$\vec{M}_V(a,b,c) \qquad \text{Expression 6.}$$

Then, a vector parallel to the mirror reflection face 151*f* and vertical to the incident light L and a reflection light L' is represented by Expression 7.

$$\vec{M}_P(a',b',c') \qquad \text{Expression 7.}$$

Then, Expression 8 and Expression 9 are obtained based on Expression 6 and Expression 7.

$$\vec{M}_V(a,b,c)=(-\cos\theta_\beta\cdot\cos(90-\theta_\alpha),\cos\theta_\beta\cdot\sin(90-\theta_\alpha),\sin\theta_\beta) \qquad \text{Expression 8.}$$

$$\vec{M}(a',b',c')=(\cos(90-\theta_\beta)\cdot\cos(90-\theta_\alpha),-\cos(90-\theta_\beta)\cdot\sin(90-\theta_\alpha),\sin(90-\theta_\beta)) \qquad \text{Expression 9.}$$

Next, the reflection light L' is represented by vector.

A vector of the reflection light is represented by Expression 10.

$$\vec{L}'(A',B',C') \qquad \text{Expression 10.}$$

Here, the incident light vector is represented by Expression 11, the reflection light vector is represented by Expression 12, and a mirror normal vector is represented by Expression 13.

$$\vec{L} \qquad \text{Expression 11.}$$

$$\vec{L}' \qquad \text{Expression 12.}$$

$$\vec{M}_V \qquad \text{Expression 13.}$$

The relation of the incident light vector, the reflection light vector, and the mirror normal vector is expressed by Expressions 14, 15, and 16.

$$k\cdot\vec{M}_V=\vec{L}-\vec{L}'\ (k: \text{constant}) \qquad \text{Expression 14.}$$

$$k\cdot(a,b,c)=(A,B,C)-(A',B',C') \qquad \text{Expression 15.}$$

$$A'=A-k\cdot a\ B'=B-k\cdot b\ C'=C-k\cdot c \qquad \text{Expression 16.}$$

Further, the reflection light vector that is represented by Expression 17 is perpendicular to a vector parallel to the mirror reflection face 151*f* that is represented by Expression 18.

$$\vec{L}' \qquad \text{Expression 17.}$$

$$\vec{M}_P \qquad \text{Expression 18.}$$

Therefore, Expression 19 is obtained.

$$\vec{M}_P\cdot\vec{L}'=a'\cdot A'+b'\cdot B'+c'\cdot C'=0 \qquad \text{Expression 19.}$$

Based on Expression 14 and Expression 19, "k" is obtained by Expression 20.

$$k = \frac{a'\cdot A+b'\cdot B+c'\cdot C}{a\cdot a'+b\cdot b'+c\cdot c'} = \frac{a'\cdot A+b'\cdot B}{a\cdot a'+b\cdot b'+c\cdot c'} \qquad \text{Expression 20}$$

(because $C = 0$ based on Expression 2.).

Based on Expression 16 and Expression 20, the reflection light vector is obtained by Expression 21.

$$\vec{L}'(A',B',C') \qquad \text{Expression 21.}$$

Next, in order to obtain the length N of the reflection light L' reaching the floor 300, the reflection light L' is expression using a linear expression.

The mirror reflection point is represented by Expression 22 in reference to FIGS. 6A and 6B.

$$\frac{x-A}{A'} = \frac{y-B}{B'} = \frac{z}{C'}. \qquad \text{Expression 22}$$

The height from the origin (i.e., the center of the LRF) to the floor 300 is expressed as |Zm (the absolute Zm), the coordinates of which the reflection light L' emits the floor 300 are expressed by Expression 23.

$$x = A - \frac{A'}{C'}\cdot Zm,\ y = B - \frac{B'}{C'}\cdot Zm,\ z = -Zm. \qquad \text{Expression 23}$$

With the above-described expressions, coordinates at which the mirror reflection point and the reflection light L' irradiate the floor 300 are obtained. Accordingly, by calculating the distance between the mirror reflection point and a point indicated by the coordinates, the length N of the reflection light L' reaching the floor 300 is obtained.

A length calculated by adding a length L from the center of the LRF to the mirror reflection point to the length N of the reflection light L to the floor 300 is a measured range to the floor 300 detected when the obstacle 301 and the recess 302 are not on the floor 300.

An optical path length to scan the foot area is represented as "L+N". That is, in a case in which the obstacle 301 and the recess 302 are not on the floor 300, the measured range by the laser ranging sensor 15 is measured as a value of "L+N+Measurement Error".

When a measured range is shorter than the value, it is determined that an obstacle 301 is disposed on the floor 300. By contrast, the measured range is longer than the value, it is determined that a recess 302 is formed on the floor 300.

Further, by using the laser ranging data to the foot area with the above-described calculation method, coordinates (x, y, and z) of a laser ranging point of laser light is converted to a coordinate system located at the vehicle body 11 as a center, considering an attaching position of the laser ranging sensor 15. Then, the distance information of an estimation value of the self position of the vehicle body 11 calculated based on odometry and the coordinate system located at the vehicle body 11 as a center are converted to distance information of an absolute coordinate system in the installation environment. By so doing, the position information of the obstacle 301 in the foot area in the absolute coordinate system can be obtained.

As illustrated in FIG. 5, the autonomous traveling robot 1 can detect the obstacle 301 in the foot area in the travel direction while performing the above-described self position estimation. When the obstacle 301 in the Z direction (i.e., in the vertical direction) is detected by laser scanning in a foot direction that is an obliquely downward direction toward a foot area of the autonomous traveling robot 1, the height of the obstacle 301 is recognized based on changes of the L' value due to approach of the autonomous traveling robot 1 to the obstacle 301, as described above. By approaching the obstacle 301 while scanning the reflection laser light L2 in a lateral direction, the height of the obstacle 301 can be recognized. Therefore, the shape of the obstacle 301 can be grasped.

When the height of the recognized obstacle 301 is higher than a height of an object of which the autonomous traveling robot 1 has traveling performance to climb over, a region in which the obstacle 301 is detected is determined as an obstacle existing region. Accordingly, even when the obstacle 301 is not detected in the light emitting range of the direct laser light L1 with which the laser ranging sensor 15 performs horizontal scanning, the obstacle existing region is determined as a traveling prohibited area.

The autonomous traveling robot 1 according to Embodiment 1 stores map information of the entire use area into the first map memory 230a. Information of the obstacle 301 obtained by horizontal scanning of the laser ranging sensor 15 for self position estimation and information of the present location estimated by this information are stored into the second map memory 230b. In addition, information of the obstacle 301 located at a position lower than the laser ranging sensor 15 is obtained by scanning in the foot direction of the laser ranging sensor 15 and is stored into the third map memory 230c.

When the height of the obstacle 301 is lower than the setting position of the laser ranging sensor 15, it is likely that a detection result obtained by the direct laser light L1 that scans in the horizontal direction and a detection result obtained by the reflection laser light L2 that scans the foot direction are different. In this case, if both detection results are overwritten in the second map memory 230b, information of layout map for the self position estimation and information of the position of the obstacle 301 obtained based on a result of 16i laser ranging do not match. As a result, it becomes difficult to estimate the self position of the autonomous traveling robot 1.

In order to address this inconvenience, the coordinates of the obstacle 301 detected by the reflection laser light L2 that scans in the foot direction are stored to the third map memory 230c, so that the coordinates are overwritten in a data base memory different from the map information that is previously stored and the obstacle information obtained by the direct laser light L1. By so doing, the autonomous traveling robot 1 can secure the travel path while performing self position estimation.

Figure 8:
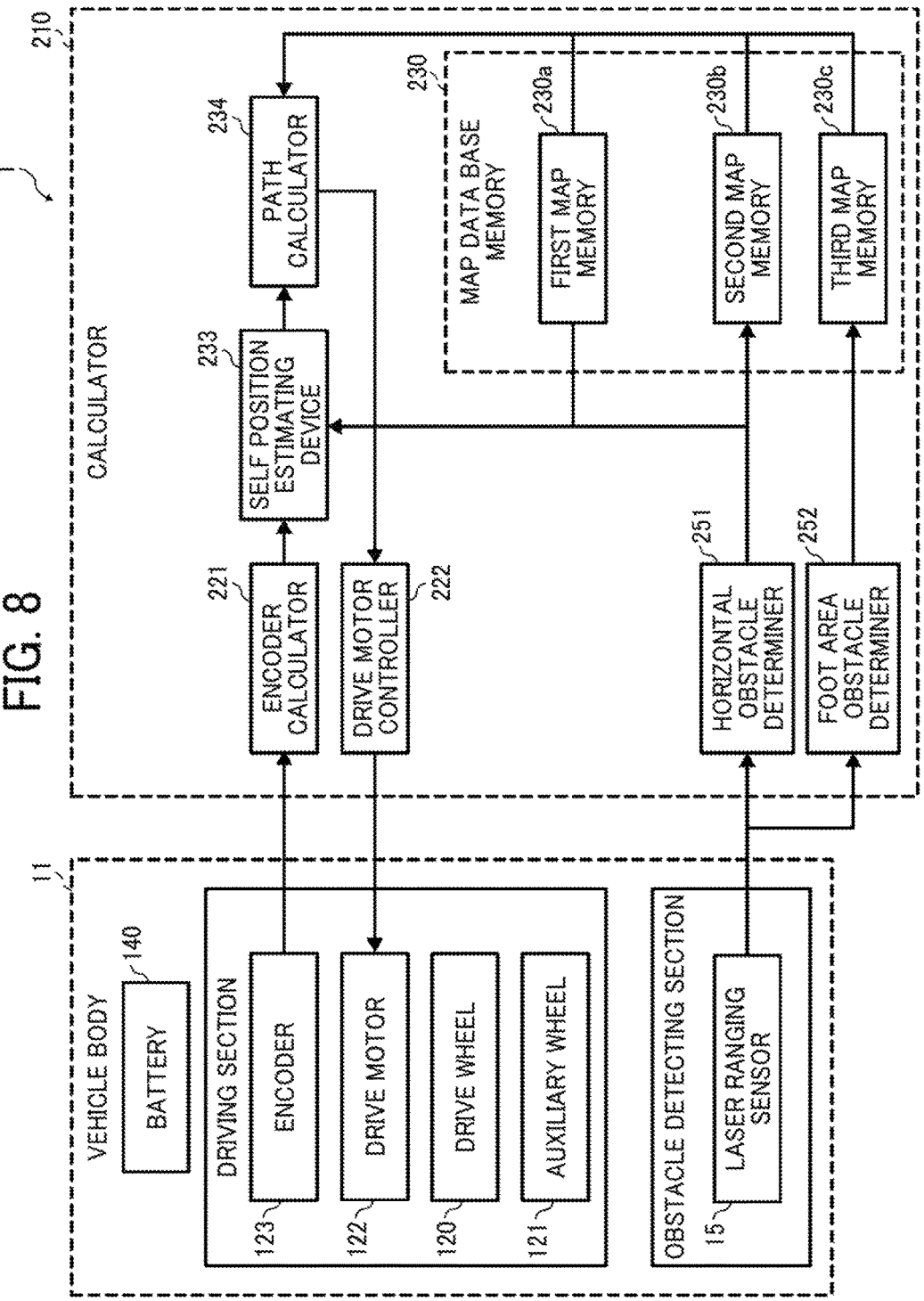
FIG. 8 is a block diagram illustrating a control system of the autonomous traveling robot according to Embodiment 1.

FIG. 8 is a block diagram illustrating an example of a control system of the autonomous traveling robot 1 according to Embodiment 1.

The laser ranging sensor 15 is an optical scanning laser ranging device to measure distance to an object in an installation environment. The calculator 210 includes a horizontal obstacle determiner 251, a foot area obstacle determiner 252, a self position estimating device 233, and an encoder calculator 221. The foot area obstacle determiner 252 detects the obstacle 301 in an area around foot based on distance information obtained by the laser ranging sensor 15. The self position estimating device 233 estimates the self position based on the distance information obtained by the laser ranging sensor 15. Then, the self position estimating device 233 performs self position estimation to correct the self position obtained based on the amount of movement, using the estimated self position.

In the odometry that calculates the self position based on the accumulated value of the amount of movement, the accumulated error according to the distance of movement increases. The autonomous traveling robot 1 corrects the self position calculated by the odometry by using the self position estimated based on the distance information obtained by the laser ranging sensor 15, thereby grasping the correct self position.

The calculator 210 includes the drive motor controller 222 to control the drive motor 122 that functions as a moving device, based on the obstacle information detected by the foot area obstacle determiner 252 and the self position estimated by the self position estimation.

When the destination of the autonomous traveling robot 1 is set, the path calculator 234 generates the path based on the map data (the position information) previously inputted in the first map memory 230a. According to the generated path, the drive motor controller 222 controls the drive motor controller 222 to start traveling. While traveling, the encoder 123 that is mounted on the drive shaft that is a rotary shaft of the drive wheels 120 monitors the number of rotations of the drive wheels 120. Then, the encoder calculator 221 calculates the amount of movement of the autonomous traveling robot 1.

The autonomous traveling robot 1 measures distance to a surrounding object by the laser ranging sensor 15 at a timing previously determined by the control system. In the configuration of Embodiment 1, both the ranging in the horizontal direction and the ranging in the foot direction can be performed simultaneously. Data of measured ranges by the direct laser light L1 of the laser ranging sensor 15 is processed by the horizontal obstacle determiner 251 and data of measured ranges by the reflection laser light L2 is processed by the foot area obstacle determiner 252.

The horizontal obstacle determiner 251 compares the data of measured ranges by the direct laser light L1 and the map data stored in the first map memory 230a, and then determines whether there is an obstacle in the horizontal direction of the laser ranging sensor 15.

Further, based on the result of comparison, the self position estimating device 233 estimates the self position of the autonomous traveling robot 1. In the determination of obstacle in the horizontal direction, there is a case in which an obstacle that is not in the map data stored in the first map memory 230a, such as human and other mobile car, is detected, the detection result is stored in the second map memory 230b.

The foot area obstacle determiner 252 calculates the position of the obstacle 301 based on the data of measured ranges by the reflection laser light L2, and then the position information is stored in the third map memory 230c.

The autonomous traveling robot 1 calculates the path based on the position information estimated by the self position estimating device 233 and the information stored in the first map memory 230a, the second map memory 230b, and the third map memory 230c. Consequently, the autonomous traveling device 1 can perform efficient autonomous travel to the destination.

Figure 9:
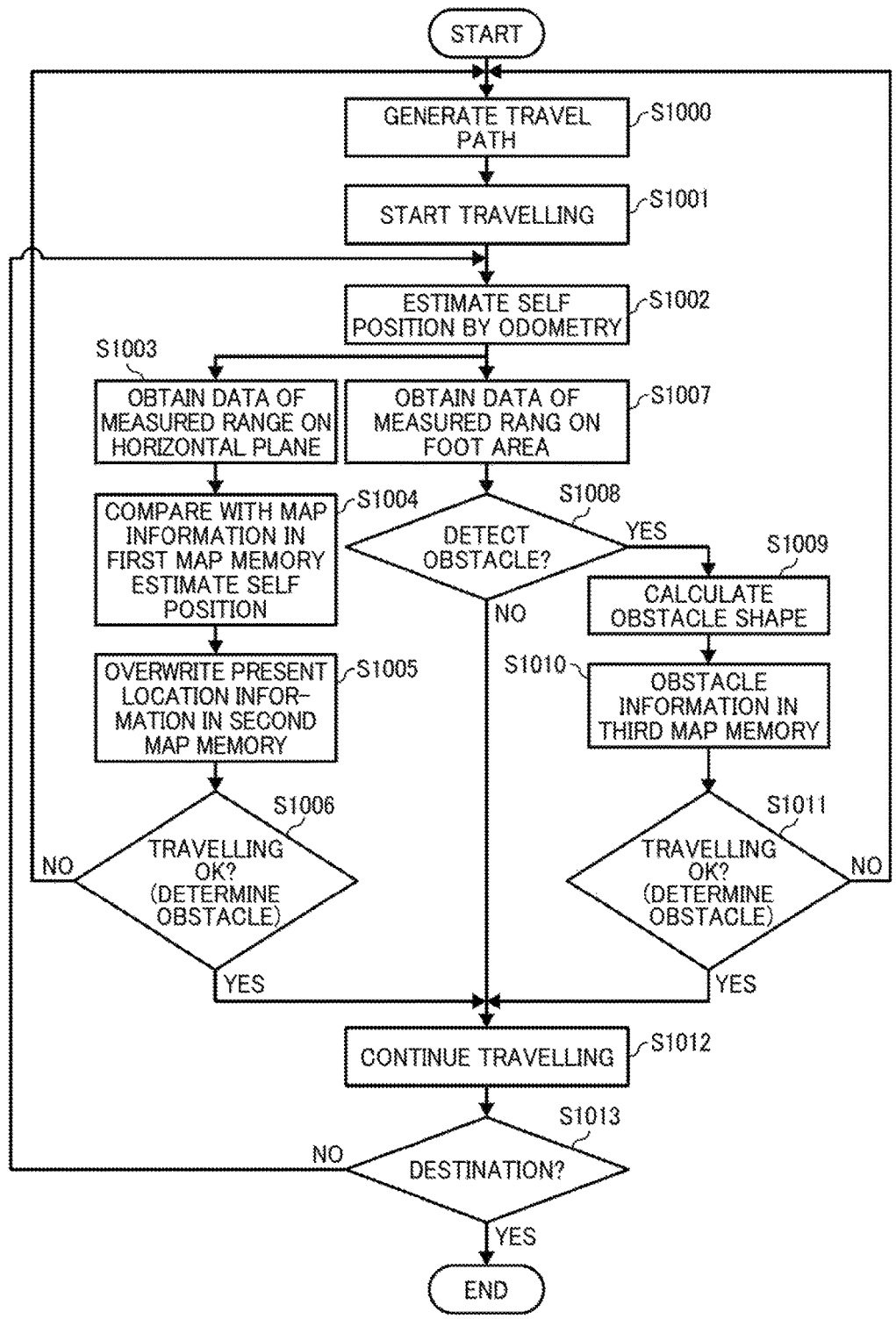
FIG. 9 is a flowchart of a control operation of the autonomous traveling robot according to Embodiment 1.

FIG. 9 is a flowchart of an example of a control of the autonomous traveling robot 1 according to Embodiment 1.

On starting the control of autonomous traveling, the calculator 210 generates a travel path to a designated destination in step S1000. Then, the autonomous traveling robot 1 start traveling, in step S1001. While traveling, the autonomous traveling robot 1 performs self position estimation by the odometry, in step S1002.

While the autonomous traveling robot 1 is traveling, the control of ranging on a horizontal plane and the control of ranging on the foot area.

Next, a description is given of a control of ranging on the horizontal plane.

Of laser lights that is emitted by the laser ranging sensor 15 while consecutively changing the light emitting direction, the direct laser light L1 that is not incident on the mirror 151 obtains data of measured range on a virtual horizontal plane including the light emitting position. By comparing the result obtained based on odometry in step S1002 and the data of measured range obtained in step S1003 with the map information (i.e., geometric information) stored in the first map memory 230a, the self position on the map data is estimated, in step S1004.

The estimated self position is overwritten to the second map memory 230b, as the present location of the autonomous traveling robot 1, in step S1005.

Based on the data of measured range obtained by the direct laser light L1, existence of the obstacle 301 is checked to determine whether the autonomous traveling robot 1 can continue traveling, in step S1006.

When it is determined that the autonomous traveling robot 1 can continue traveling (NO in step S1006), the procedure goes back to step S1000 to generate the travel path again.

When it is determined that the autonomous traveling robot 1 can continue traveling (YES in step S1006), the autonomous traveling robot 1 continues traveling, in step S1012. Then, it is determined whether the autonomous traveling robot 1 has reached the destination, in step S1013.

When it is determined that the autonomous traveling robot 1 has not yet reached the destination (NO in step S1013), the procedure goes back to step S1002 to repeat the operation.

When it is determined that the autonomous traveling robot 1 has reached the destination (YES in step S1013), the control of autonomous traveling ends.

Next, a description is given of a control of ranging on the foot area.

Of laser lights that is emitted by the laser ranging sensor 15 while consecutively changing the light emitting direction, the reflection laser light L2 that enters (incident) and reflects on the mirror 151 obtains data of measured range on the foot area in the forward travel direction of the autonomous traveling robot 1, in step S1007. Based on the data of measured range on the foot area in the forward direction, it is detected whether there is the obstacle 301, in step S1008.

When the obstacle 301 is not detected (NO in step S1008), the autonomous traveling robot 1 continues traveling, in step S1012.

By contrast, when the obstacle 301 is detected (YES in step S1008), the autonomous traveling robot 1 approaches the obstacle 301, so that the shape of the obstacle 301 is calculated based on the distance of movement and the data of measured range, in step S1009.

Based on information of the shape of the obstacle 301 obtained by the calculation, the obstacle information in the third map memory 230c is overwritten, in step S1010.

Next, it is determined whether the autonomous traveling robot 1 can continue traveling, based on the information of the shape of the obstacle 301 obtained by the above-described calculation, in step S1011.

When the obstacle 301 has a height over which the autonomous traveling robot 1 can climb, it is determined that the autonomous traveling robot 1 can continue traveling (YES in step S1011), and the autonomous traveling robot 1 continues traveling, in step S1012.

By contrast, when the obstacle 301 has a height over which the autonomous traveling robot 1 cannot climb, it is determined that the autonomous traveling robot 1 cannot continue traveling (NO in step S1011), and the procedure goes back to step S1000 to generate the travel path again.

In step S1008, existence of the obstacle 301 is detected based on the data of measured range. When the obstacle 301 is detected (YES in step S1008), the procedure goes through steps S1009, S1010, and S1011. When it is determined that the autonomous traveling robot 1 cannot continue traveling (NO in step S1011), the procedure goes back to step S1000 to generate the travel path again.

In recent years, ranging sensors having a laser rangefinder (LRF) provide enhanced performance. Such ranging sensors generally have a viewing angle of 180 degrees or greater. In a case in which such a ranging sensor is disposed so as to scan the forward direction of an autonomous traveling device, the autonomous traveling device can have a scanning range of 90 degrees or greater in the travel direction of the autonomous traveling device.

However, there is a case in which the autonomous traveling device travels without any problem when a certain range (for example, at a viewing angle of approximately 60 degrees) in a forward travel direction thereof. In this case, the ranging sensor emits laser light in a range wider than expected.

In addition, when the ranging sensor is disposed at the front side of the autonomous traveling device in order to scan the forward direction of the autonomous traveling device, it is likely that an optical path in the scanning range is blocked by a framework of the autonomous traveling device that is disposed at a rear side or a lateral side of the ranging sensor. In this case, the ranging sensor is to emit laser light in a range where ranging cannot be performed. In a case in which the ranging sensor is disposed on a top face of the autonomous traveling device, the optical path is prevented from being blocked by the framework of the autonomous traveling device. However, when the autonomous traveling device loads an object on the top face, the ranging sensor cannot be located on the top face of the autonomous traveling device.

The autonomous traveling robot 1 according to Embodiment 1 includes the mirror 151 disposed in a region that corresponds to the rear side of the scanning range of the laser ranging sensor 15. The mirror 151 is inclined downwardly. According to this configuration, laser light is emitted toward the rear side from the center of the laser ranging sensor 15 and then is reflected on the mirror 151, so that the laser light is emitted to the forward foot area of the autonomous traveling robot 1. According to this emission of the laser light to the foot area of the autonomous traveling robot 1, an obstacle having a relatively low height and located in the travel path in the forward direction of the autonomous traveling robot 1 can be detected. Thus, the laser light emitted to the outside of the scanning range in which laser ranging is performed to avoid an obstacle during autonomous travel and to estimate the self position of the autonomous traveling robot 1 can be used by the autonomous traveling robot 1 to detect an obstacle in the foot area or underfoot.

Further, when the framework of the autonomous traveling robot 1 is disposed in the scanning range at the rear side or the lateral side of the laser ranging sensor 15, the mirror 151 is disposed between the framework and the laser ranging sensor 15. By so doing, the laser light emitted in a direction in which the framework is disposed can be used to detect an obstacle on the foot area or underfoot.

In Embodiment 1, the laser ranging sensor 15 includes a laser rangefinder having a scanning range γ of approximately 270 degrees (i.e., approximately 135 degrees relative to the forward direction of the laser ranging sensor 15).

The laser light that is emitted in a range of approximately 180 degrees in the forward direction of the autonomous traveling robot 1 (i.e., approximately 90 degrees relative to the forward direction of the laser ranging sensor 15). Accordingly, when the autonomous traveling robot 1 travels in the forward direction, the distance can be measured in a forward direction of approximately 180 degrees including a range in which the distance is to be measured reliably (for example, approximately 60 degrees relative to the forward direction of the laser ranging sensor 15).

Further, the mirror 151 is disposed in a range having an angle of approximately 45 degrees at the rear side of the autonomous traveling robot 1 (specifically, in a range of from +90 degrees to +135 degrees relative to the forward direction of the laser ranging sensor 15 and a range of from −90 degrees to −135 degrees relative to the forward direction of the laser ranging sensor 15. Accordingly, the laser light is emitted to the scanning range of approximately 45 degrees at the rear side of the autonomous traveling robot 1, which is the outside of the scanning range in which laser ranging is performed when the autonomous traveling robot 1 travels in the forward direction. The laser light can be used to measure distance on the foot area, which is a direction different from the light emitting direction of the laser ranging sensor 15.

The autonomous traveling robot 1 uses a single laser ranging sensor 15 to emit laser light in the horizontal direction to perform the self position estimation and to emit the laser light in the foot direction to detect the obstacle on the foot area. Accordingly, when compared with a configuration having two LRFs, which are a LRF that emits laser light in the horizontal direction and another LRF that emits laser light in the foot direction, the autonomous traveling robot 1 according to Embodiment 1 reduces the installation costs and space.

Recent ranging sensors with a function of optically scanning and measuring distance or ranging to a target object have an increased scanning range of laser light. An autonomous traveling device including the above-described ranging sensor has a greater scanning range of the ranging sensor when compared with a case of measuring distance for avoiding an obstacle during autonomous travel and for self position estimation. In this case, laser light is emitted in a scanning range outside a range to be measured. However, the laser light has not been used to measure distance for autonomous travel.

A comparative autonomous traveling device emits laser light in the horizontal direction and in the foot direction by switching the light emitting direction of the laser light at a reflecting portion, so that the laser light is emitted in the travel direction from a ranging sensor. However, while switching the light emitting direction at the reflecting portion, the comparative autonomous traveling device can obtain either one of data of measured range in the horizontal direction and data of measured range in the foot direction. That is, the comparative autonomous traveling device cannot obtain both data simultaneously.

By contrast, the autonomous traveling robot 1 according to Embodiment 1 measure distance in the forward direction of the mirror 151 in the horizontal direction and a distance on the forward foot area simultaneously without switching the light emitting direction of the laser light to be emitted from the laser ranging sensor 15. Accordingly, the autonomous traveling robot 1 can reliably perform both the self position estimation by ranging in the horizontal direction and the obstacle detection on the foot area by ranging in the foot direction.

The autonomous traveling robot 1 constantly detects an obstacle in the horizontal direction while detecting an obstacle in the foot direction, so that the self position of the autonomous traveling robot 1 can be estimated constantly. Therefore, the autonomous traveling robot 1 can travel a set travel path precisely. In addition, the autonomous traveling robot 1 constantly detects an obstacle on the foot area in the travel direction. Therefore, even when an obstacle that is not stored in the map data previously inputted is added, the obstacle can be detected. Accordingly, the autonomous traveling robot 1 can be prevented from hitting the obstacle.

An example of an installation environment of the autonomous traveling robot 1 is a distribution warehouse. In such a distribution warehouse and a place where objects are frequently relocated, a range to a location higher than the objects is measured. Therefore, stable self position estimation can be performed. When the autonomous traveling robot 1 according to Embodiment 1 is employed, the mounting position of the laser ranging sensor 15 is set to a position higher than the location where the objects are frequently relocated. By so doing, stable self position estimation can be performed.

Further, in autonomous travel, a laser ranging sensor is installed at a position so as to measure distance lower than an object in order to recognize an obstacle. In addition, objects stored in a distribution warehouse have various heights. Therefore, when performing autonomous travel under installation environment such as a warehouse, it is preferable to perform ranging with multiple levels. In order to achieve the ranging with multiple levels, multiple mirrors (i.e., the first mirror 151a and the second mirror 151) functioning as multiple reflection members are disposed, as illustrated in FIG. 4. By so doing, laser ranging with multiple levels can be performed with a single ranging sensor (i.e., the laser ranging sensor 15), thereby performing autonomous travel.

Further, when information is updated with information of the obstacle detected in the horizontal direction and information of the obstacle in the foot direction being superimposed in the same memory, the information of the obstacle stored in the memory becomes unable to recognize whether the obstacle is a wall of the layout of the indoor installation environment or a temporary obstacle.

In order to address this inconvenience, the map information of the entire using area of Embodiment 1, the obstacle information obtained by horizontal scanning, and the obstacle information obtained by the foot scanning are separately stored in the first map memory 230a, the second map memory 230b, and the third map memory 230c, respectively. That is, the memories to store the obstacle information detected when scanned with multiple levels by the laser ranging sensor 15 are divided into various levels.

By so doing, information of the layout of the installation environment and information of a temporary obstacle are grasped individually, and therefore can be managed in each division. Accordingly, the precision in self position estimation can be enhanced and the travel path can be generated efficiently under the installation environment where the locations of objects within the layout frequently change as a distribution warehouse.

Embodiment 2

Next, a description is given of the autonomous robot 1 according to Embodiment 2 of this disclosure.

Different from configuration of the autonomous traveling robot 1 according to Embodiment 1, the autonomous traveling robot 1 according to Embodiment 2 includes an actuator function with which the mirror retaining unit 160 changes the installation angle of the mirror 151. Other parts and components of the autonomous traveling robot 1 according to Embodiment 2 are identical to the parts and components of the autonomous traveling robot 1 according to Embodiment 1. Therefore, a detailed description is omitted here.

Figure 10A:
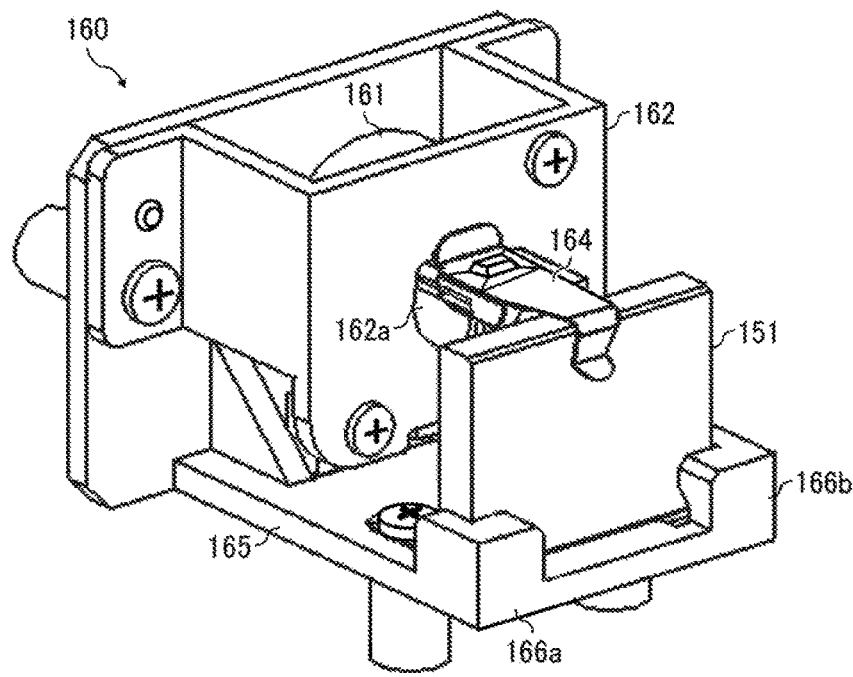
FIG. 10A is a perspective view illustrating a mirror retaining unit according to Embodiment 2 of this disclosure.
Figure 10B:
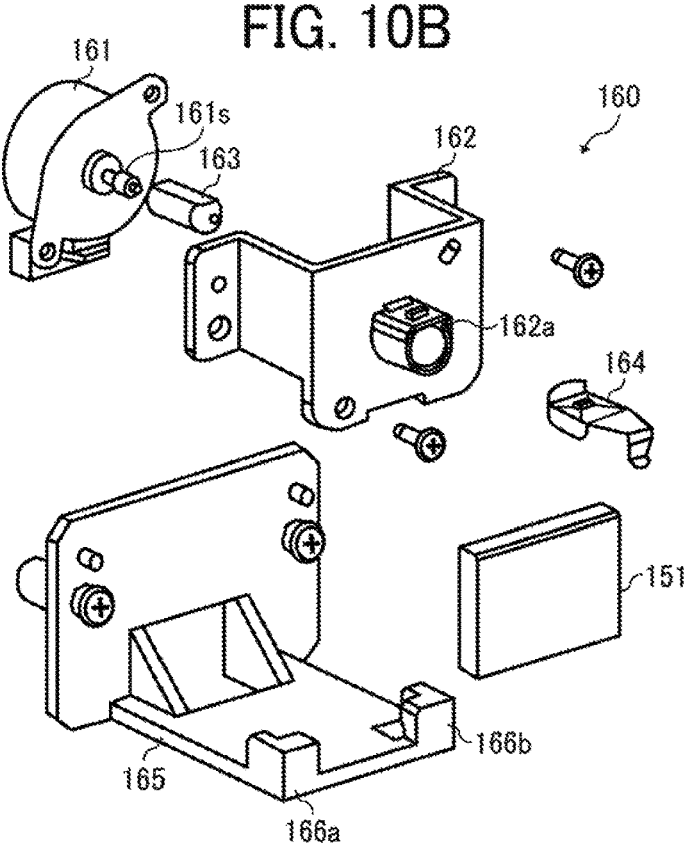
FIG. 10B is an exploded perspective view of the mirror retaining unit of FIG. 10A.
Figure 10C:
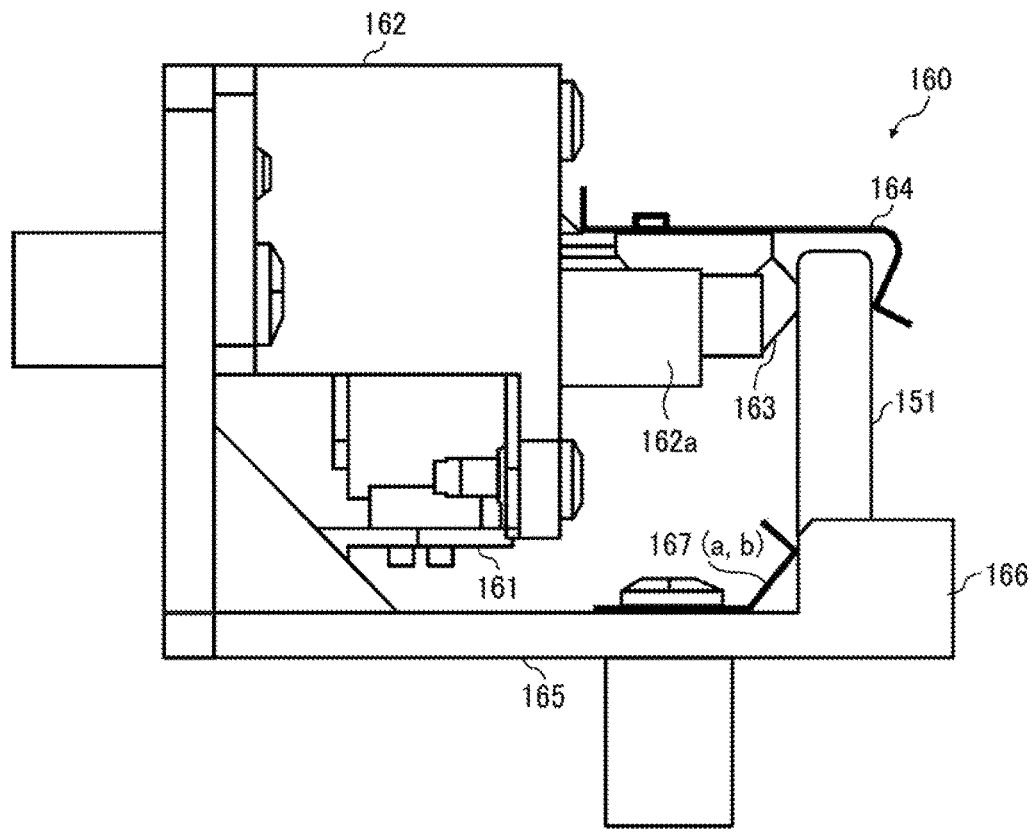
FIG. 10C is a side view illustrating the mirror retaining unit of FIG. 10A.
Figure 10D:
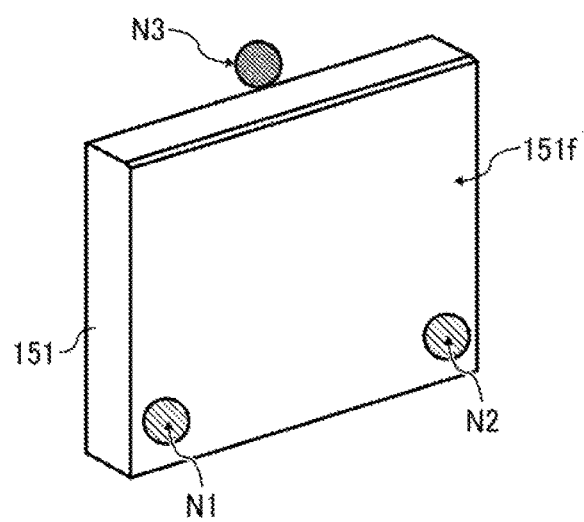
FIG. 10D is a diagram illustrating a fixing position of the mirror.

FIGS. 10A through 10D are diagrams illustrating the mirror retaining unit 160 according to Embodiment 2. Specifically, FIG. 10A is a perspective view illustrating the mirror retaining unit 160 according to Embodiment 2. FIG. 10B is an exploded perspective view of the mirror retaining unit 160 of FIG. 10A. FIG. 10C is a side view illustrating the mirror retaining unit 160 of FIG. 10A. FIG. 10D is a diagram illustrating a fixing position of the mirror 151 fixed by the mirror retaining unit 160.

As illustrated in FIGS. 10A through 10D, the mirror retaining unit 160 includes a mirror adjusting motor 161, a motor holder 162, an adjuster 163, three leaf springs (an upper leaf spring 164, a first lower leaf spring 167a, and a second lower leaf spring 167b), and a mirror base 165. The mirror adjusting motor 161 employs a stepping motor.

Generally, when mirrors are arranged, a reflection face is provided on a plane determined by three points. As illustrated in FIG. 10D, the mirror 151 of Embodiment 2 fixes the position of the mirror reflection face 151f by abutment of three points, which are two points N1 and N2 at a lower part of the mirror reflection face 151f and one point N3 at an upper part on a back side of the mirror reflection face 151f.

The mirror base 165 has respective seat surfaces of the first abutting portion 166a and the second abutting portion 166b, against which the lower part of the mirror reflection face 151f abuts. The first lower leaf spring 167a and the second lower leaf spring 167b are both fixed to the mirror base 165 and bias the two points at the lower part of the mirror reflection face 151f toward bearing surfaces of the first lower leaf spring 167a and the second lower leaf spring 167b, respectively. The two points at the lower part of the mirror reflection face 151f abut the respective bearing surfaces of the first abutting portion 166a and the second abutting portion 166b of the mirror base 165. According to abutment of two points, an angle of the mirror 151 in a longitudinal direction (that is the angle θα) is determined.

The mirror retaining unit 160 includes the adjuster 163 that engages with a rotor 161s of the mirror adjusting motor 161. The leading end of the adjuster 163 contacts a point at the upper part of the back face side of the above-described mirror reflection face 151f. The upper leaf spring 164 is fixed to the motor holder 162 and biases the point at the upper part of the back face side of the mirror reflection face 151f toward the leading end of the adjuster 163. Consequently, the point at the upper part of the back face side of the mirror reflection face 151f contacts the leading end of the adjuster 163. Accordingly, three points to determine the position of the mirror reflection face 151f are fixed. According to this determination of the point at which the upper leaf spring 164 contacts the mirror reflection face 151f relative to the two points at the lower part of the mirror reflection face 151f that abut the respective bearing surface of the first abutting portion 166a and the second abutting portion 166b of the mirror base 165, an angle of the mirror 151 in the lateral direction (that is, the angle θβ) is determined.

The adjuster 163 is cut to form a D shape in cross section. Therefore, an opening of an adjuster inserting portion 162a of the motor holder 162 is also a D shape in cross section, so that the adjuster 163 that is engaged with the mirror adjusting motor 161 is inserted into the D-shaped opening of the adjuster inserting portion 162a. In a state in which the adjuster 163 is inserted into the adjuster inserting portion 162a, the rotation of the adjuster 163 is regulated. In addition, the rotor 161s has an external thread and the adjuster 163 has an internal thread at an opening that engages with the rotor 161s. According to this configuration, rotary motion in which the mirror adjusting motor 161 rotates the rotor 161s is changed to linear motion of the adjuster 163.

As the mirror adjusting motor 161 drives the rotor 161s, the rotor 161s rotates. With this action, the amount of projection of the adjuster 163 to the motor holder 162 changes. This change of the amount of projection changes the position at which the leading end of the adjuster 163 of the three points determining the position of the mirror reflection face 151f. Accordingly, an angle of mounting the mirror 151 (that is, the angle θβ) can be changed optionally.

Figure 11A:
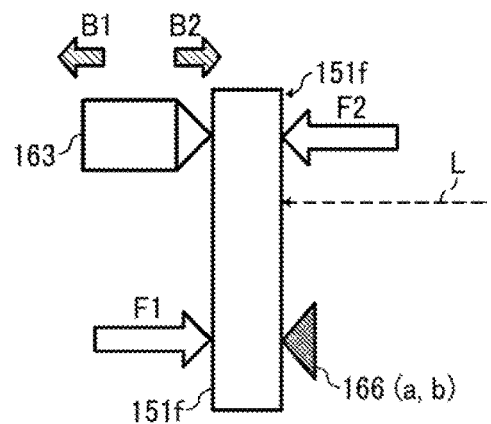
FIG. 11A is a diagram illustrating a relation of an amount of projection of an adjuster and inclination of a mirror when the mirror is not inclined.
Figure 11B:
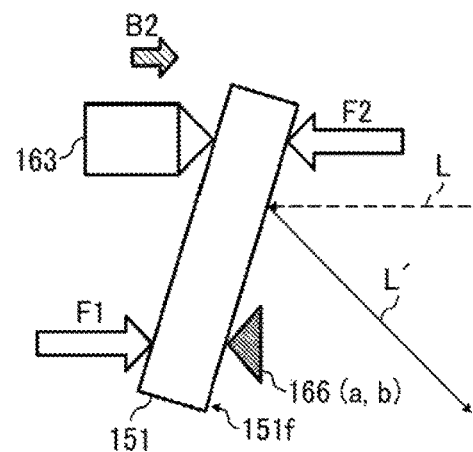
FIG. 11B is a diagram illustrating the relation of the amount of projection of the adjuster and the inclination of the mirror in an initial state.
Figure 11C:
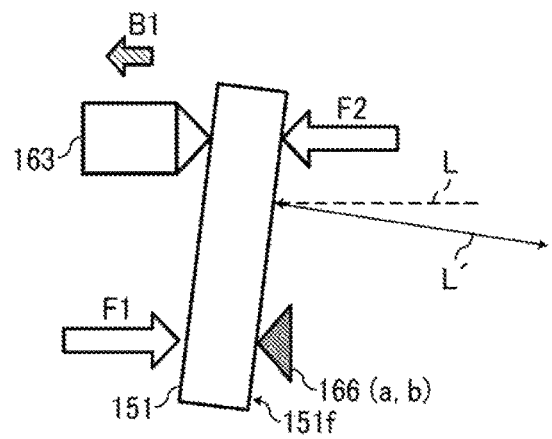
FIG. 11C is a diagram illustrating the relation of the amount of projection of the adjuster and the inclination of the mirror when an obstacle is detected.

FIGS. 11A, 11B, and 11C are diagrams illustrating relation of the amount of projection of the adjuster 163 and the inclination of mirror 151. FIG. 11A is a diagram illustrating a state in which the mirror 151 is not inclined. FIG. 11B is a diagram illustrating the mirror 151 in an initial state. FIG. 11C is a diagram illustrating the mirror when an obstacle is detected.

Figure 12:
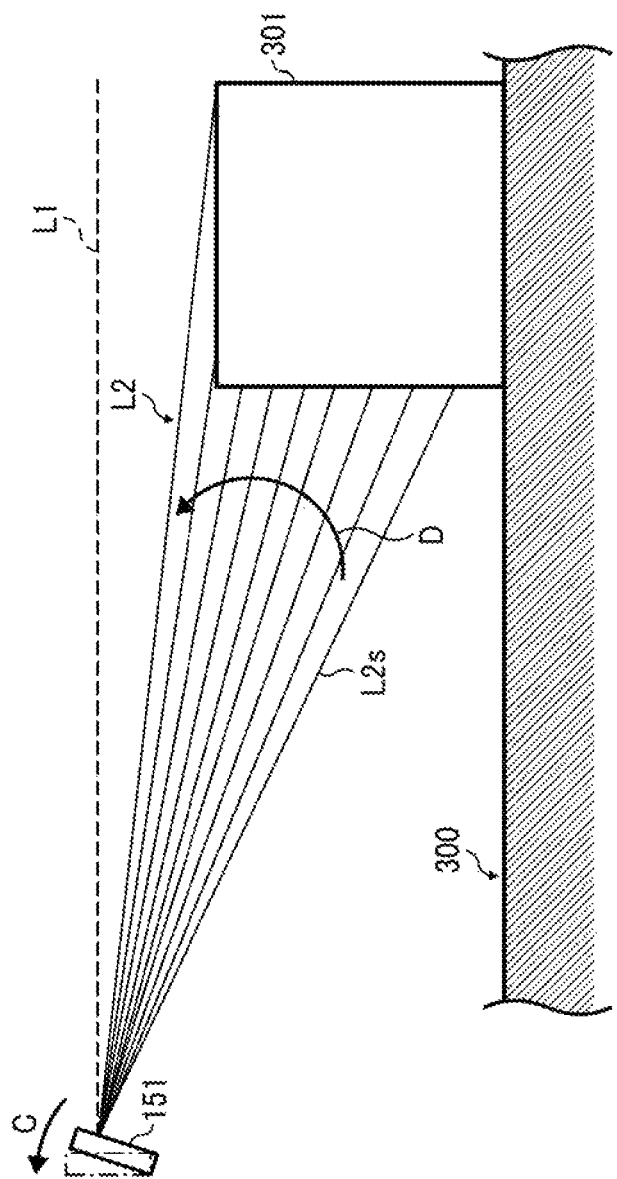
FIG. 12 is a diagram illustrating changes of the light emitting direction of the reflection laser light when the inclination of the mirror is changed.

FIG. 12 is a diagram illustrating changes of the light emitting direction of the reflection laser light L2 when the inclination of the mirror 151 is changed.

Arrow "F1" in FIG. 11 indicates a biasing force applied by the first lower leaf spring 167a and the second lower leaf spring 167*b*. Arrow "F2" in FIG. 11 indicates a biasing force applied by the upper leaf spring 164.

Arrow "L" illustrated with a dashed line in FIGS. 11A, 11B, and 11C indicates an incident light to the mirror reflection face 151*f*. Arrow "L'" illustrated with a solid line in FIGS. 11B and 11C indicates a reflection light of the incident light L reflected on the mirror reflection face 151*f*.

As the amount of projection of the adjuster 163 increases, the leading end of the adjuster 163 is displaced to a side indicated by arrow B2 in FIG. 11A. By contrast, as the amount of projection of the adjuster 163 decreases, the leading end of the adjuster 163 is displaced to a side indicated by arrow B1 in FIG. 11A.

The position of the lower part of the mirror 151 is fixed by abutting the first abutting portion 166*a* and the second abutting portion 166*b*, both functioning as mirror receiving portions, by the biasing force applied by the first lower leaf spring 167*a* and the second lower leaf spring 167*b*.

When the autonomous traveling robot 1 starts autonomous traveling, the initial state of the mirror 151, as illustrated in FIG. 11B. At this time, as illustrated in FIG. 11B, the amount of projection of the adjuster 163 increases to cause the mirror reflection face 151*f* to be inclined to face down. At this time, the light emitting direction is a straight line as indicated by "L2*s*" in FIG. 12.

The autonomous traveling robot 1 according to Embodiment 2 has the same light emitting direction of the reflection laser light L2 in the initial position of the autonomous traveling robot 1 according to Embodiment 1. Further, the autonomous traveling robot 1 according to Embodiment 2 performs the same method of detecting the obstacle 301 as Embodiment 1.

When the autonomous traveling robot 1 performs autonomous travel in the initial state as illustrated in FIG. 11B and detects the obstacle 301 by the reflection laser light L2, the mirror adjusting motor 161 is driven to reduce the amount of projection of the adjuster 163 to a state as illustrated in FIG. 11C, so as to reduce the inclination of the mirror reflection face 151*f*. At this time, the mirror 151 rotate as indicated by arrow indicated by arrow C in FIG. 12 and the light emitting direction of the reflection laser light L2 changes as indicated by arrow D in FIG. 12.

The autonomous traveling robot 1 according to Embodiment 2 changes the angle of the mirror 151. By so doing, the light emitting direction of the reflection laser light L2 is changed, as illustrated in FIG. 12, and therefore the height of the obstacle 301 is recognized based on the information of measured range when the light emitting direction is changed.

Figure 13:
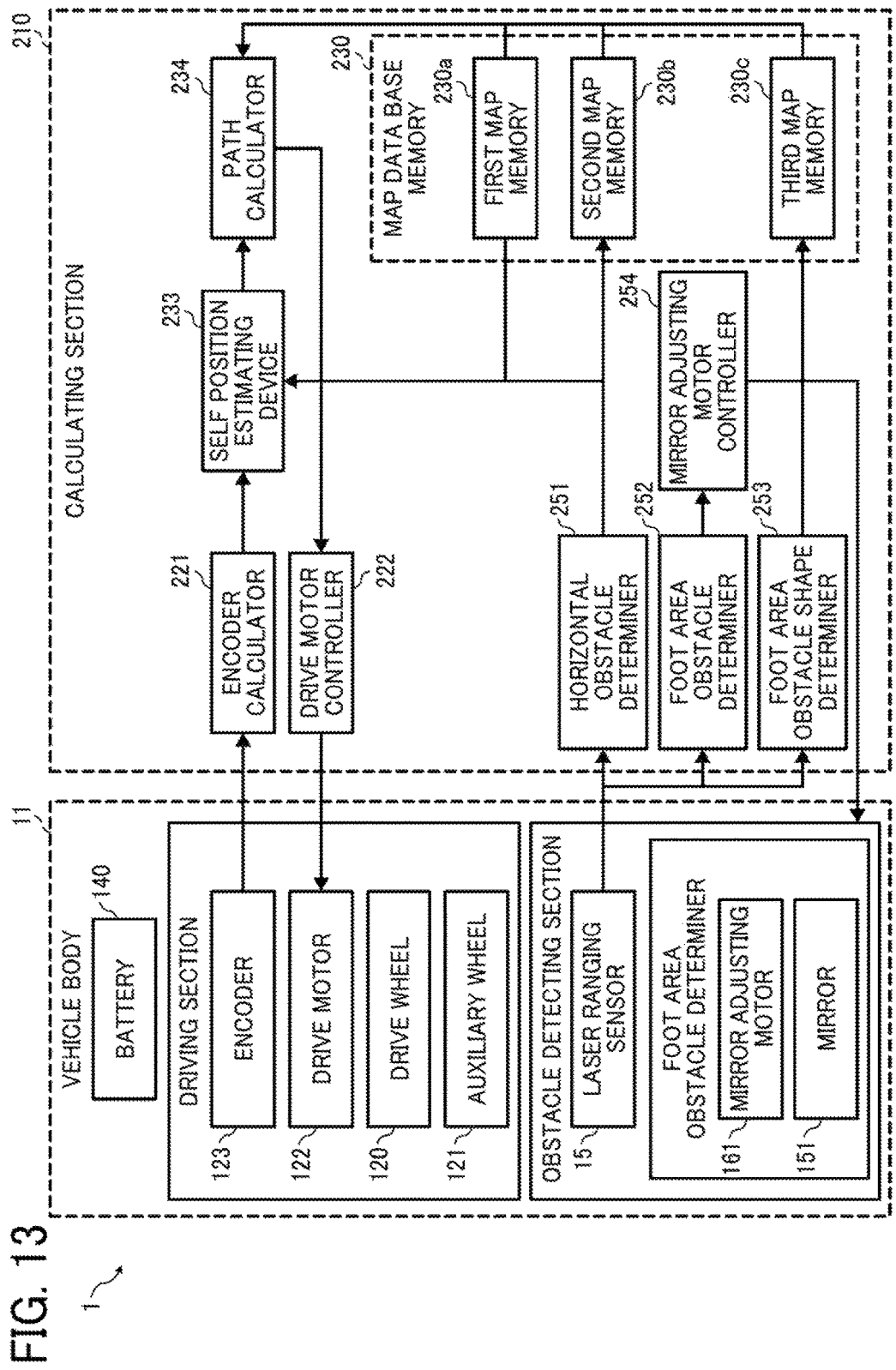
FIG. 13 is a block diagram illustrating a control system of the autonomous traveling robot according to Embodiment 2.

FIG. 13 is a block diagram illustrating an example of the control system of the autonomous traveling robot 1 according to Embodiment 2.

Components and units in the block diagram of Embodiment 2 in FIG. 13 are basically identical to the components and units of Embodiment 1 in FIG. 8, except that the calculator 210 in the block diagram in FIG. 13 further includes a foot area obstacle shape determiner 253 and a mirror adjusting motor controller 254 and the vehicle body 11 includes a foot area obstacle detector. Other parts and components in the block diagram of the autonomous traveling robot 1 according to Embodiment 2 are identical to the parts and components in the block diagram of the autonomous traveling robot 1 according to Embodiment 1. Therefore, a detailed description is omitted here.

In the autonomous traveling robot 1 according to Embodiment 2, the foot area obstacle determiner 252 first determines existence of the obstacle 301 based on the data of measured range to the foot area. In the autonomous traveling robot 1 according to Embodiment 2, when the foot area obstacle determiner 252 determines that the obstacle 301 is found, the laser ranging sensor 15 measures the range to the obstacle 301 while the mirror adjusting motor controller 254 controls the mirror adjusting motors 161. Based on the data of measured range, the foot area obstacle shape determiner 253 stores shape data of the obstacle 301 to the third map memory 230*c*.

FIG. 14 is a flowchart of an example of a control of the autonomous traveling robot 1 according to Embodiment 2.

Steps in the flowchart of Embodiment 2 in FIG. 14 are basically identical to the steps in the flowchart of Embodiment 1 in FIG. 9, except that the flowchart of FIG. 14 further includes an additional step to move the mirror (step S1109). Other steps in the flowchart of the control of the autonomous traveling robot 1 according to Embodiment 2 (steps S1100 through S1108 and S1110 through S1114) are identical to steps in the flowchart of the control of the autonomous traveling robot 1 according to Embodiment 1 (steps S1000 through S1013), respectively. Therefore, a detailed description is omitted here.

When the obstacle 301 is detected based on the data of measured range (YES in step S1108), the autonomous traveling robot 1 according to Embodiment 2 drives the mirror adjusting motor 161 to move the mirror 151, in step S1109. At this time, the data of measured range is obtained while the inclination of the mirror 151 is being changed until the laser scanning face of the reflection laser light L2 inclined downwardly relative to the horizontal plane becomes substantially parallel to the horizontal plane. Then, based on the angle of the mirror 151 and the data of measured range, the shape of the obstacle 301 is calculated, in step S1110.

Other steps in the flowchart of the control of the autonomous traveling robot 1 according to Embodiment 2 are identical to steps in the flowchart of the control of the autonomous traveling robot 1 according to Embodiment 1. Therefore, a detailed description is omitted here.

It is to be noted that the control to move the mirror 151 may be performed when the autonomous traveling robot 1 is either traveling or stopped.

With the above-described configuration of the autonomous traveling robot 1 according to Embodiment 1, the autonomous traveling robot 1 travels toward the obstacle 301 after the obstacle 301 has been detected, so that the height of the obstacle 301 is recognized. However, the autonomous traveling robot 1 moves up to the position where the height of the obstacle 301 is recognized. Therefore, it takes long time from the detection of the obstacle 301 to recognition of the height of the obstacle 301. In addition, depending on the travel speed and stopping performance of the autonomous traveling robot 1, there may be a case in which the autonomous traveling robot 1 does not stop at the moment of recognition of the height of the obstacle 301. Further, the autonomous travel robot 1 moves to recognize the height of the obstacle 301, and therefore this travel path may be useless as a result.

By contrast, when the autonomous traveling robot 1 is controlled to change the travel path on detection of the obstacle 301, even if the obstacle 301 has the sufficient height over which the autonomous traveling robot 1 can climb, a travel path is generated again to detour the obstacle 301.

As illustrated in FIGS. 11A, 11B, 11C, and 12, in the autonomous traveling robot 1 according to Embodiment 2, when the obstacle 301 is detected on the foot area, the autonomous traveling robot 1 according to Embodiment 2 causes the mirror adjusting motor 161 (i.e., the first mirror adjusting motor 161a and the second mirror adjusting motor 161b) to change the inclination of the mirror 151 (i.e., the first mirror 151a and the second mirror 151b). According to this change of the mirror 151, the autonomous traveling robot 1 can recognize the height of the obstacle 301 compared with a case in which the autonomous traveling robot 1 moves and checks the obstacle 301. Consequently, the autonomous traveling robot 1 can be operated more smoothly.

Further, the mirror retaining unit 160 includes the mirror adjusting motor 161 that changes the angle of inclination of the mirror 151. With this configuration, the obstacle 301 is detected while the attitude of the mirror 151 is changed according to the detection result of the obstacle 301. By so doing, the shape of the obstacle 301 other than the plane in the horizontal direction and the plane in the foot direction can be grasped. Further, the distance information of the estimation value of the self position of the vehicle body 11 and the coordinate system located at the vehicle body 11 as a center are converted to distance information of the absolute coordinate system. Accordingly the three-dimensional information of the obstacle 301 on the foot area in the absolute coordinate system can be obtained.

The laser ranging sensor 15 that functions as an optical scanning laser ranging device measures distance to an object in the scanning face. Therefore, even if the reflection laser light L2 detects the obstacle 301 on the foot area, the height of the obstacle 301 cannot be grasped. Therefore, even if the obstacle 301 has the height over which the autonomous traveling robot 1 can climb, the obstacle 301 is dealt as an obstacle and the autonomous traveling robot 1 moves to the destination by detouring the obstacle 301.

By contrast, similar to the autonomous traveling robot 1 according to Embodiment 2, the inclination of the mirror 151 is changed to swing the light emitting direction of the reflection laser light L2 upwardly from the foot area. Accordingly, the height of the obstacle 301 detected by the reflection laser light L2 that is emitted to the foot area can be grasped. Therefore, when the obstacle 301 has the height over which the autonomous traveling robot 1 can climb, the autonomous traveling robot 1 can move to the destination along the shortest travel route.

When the distance information of the obstacle 301 detected by the direct laser light L1 that is emitted in the forward direction of the autonomous traveling robot 1 is different from the distance information of the obstacle 301 detected by the reflection laser light L2, the mirror 151 may be controlled to change the angle of inclination. For example, in a case in which the laser ranging sensor 15 has detected the obstacle 301 that is taller than the laser ranging sensor 15 and has a projection at a portion lower than the laser ranging sensor 15, the distance detected by the reflection laser light L2 is shorter than the distance detected by the direct laser light L1. In this case, by swinging the mirror 151 upwardly, the three-dimensional shape data of the obstacle 301 having a projecting shape at the portion lower than the laser ranging sensor 15 can be obtained, and therefore the autonomous travel robot 1 can avoid contacting with the obstacle 301.

Embodiment 3

Next, a description is given of the autonomous robot 1 according to Embodiment 3 of this disclosure.

Figure 15A:
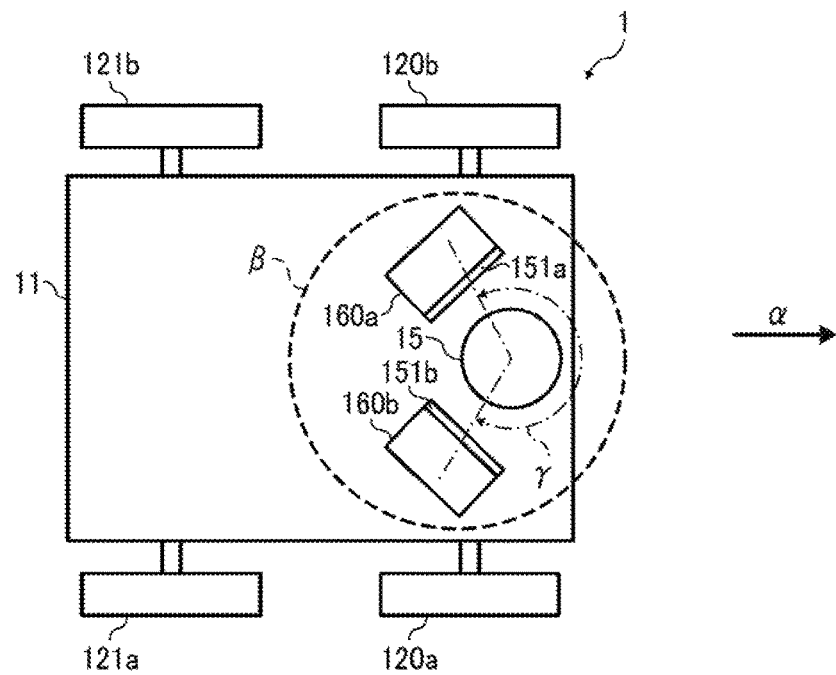
FIG. 15A is a top view illustrating the autonomous traveling robot according to Embodiment 3.
Figure 15B:
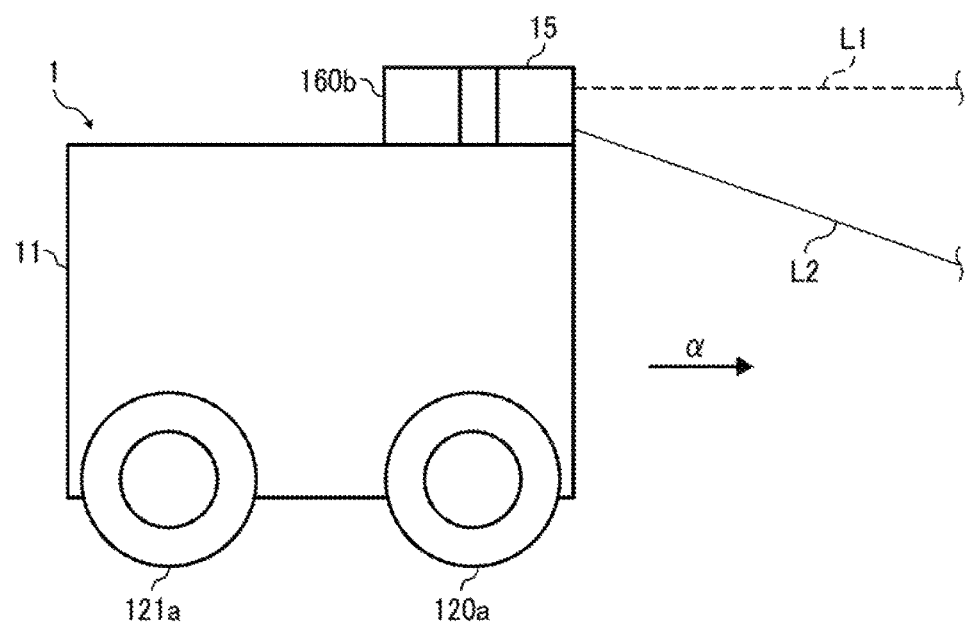
FIG. 15B is a right side view illustrating the autonomous traveling robot according to Embodiment 3.
Figure 16:
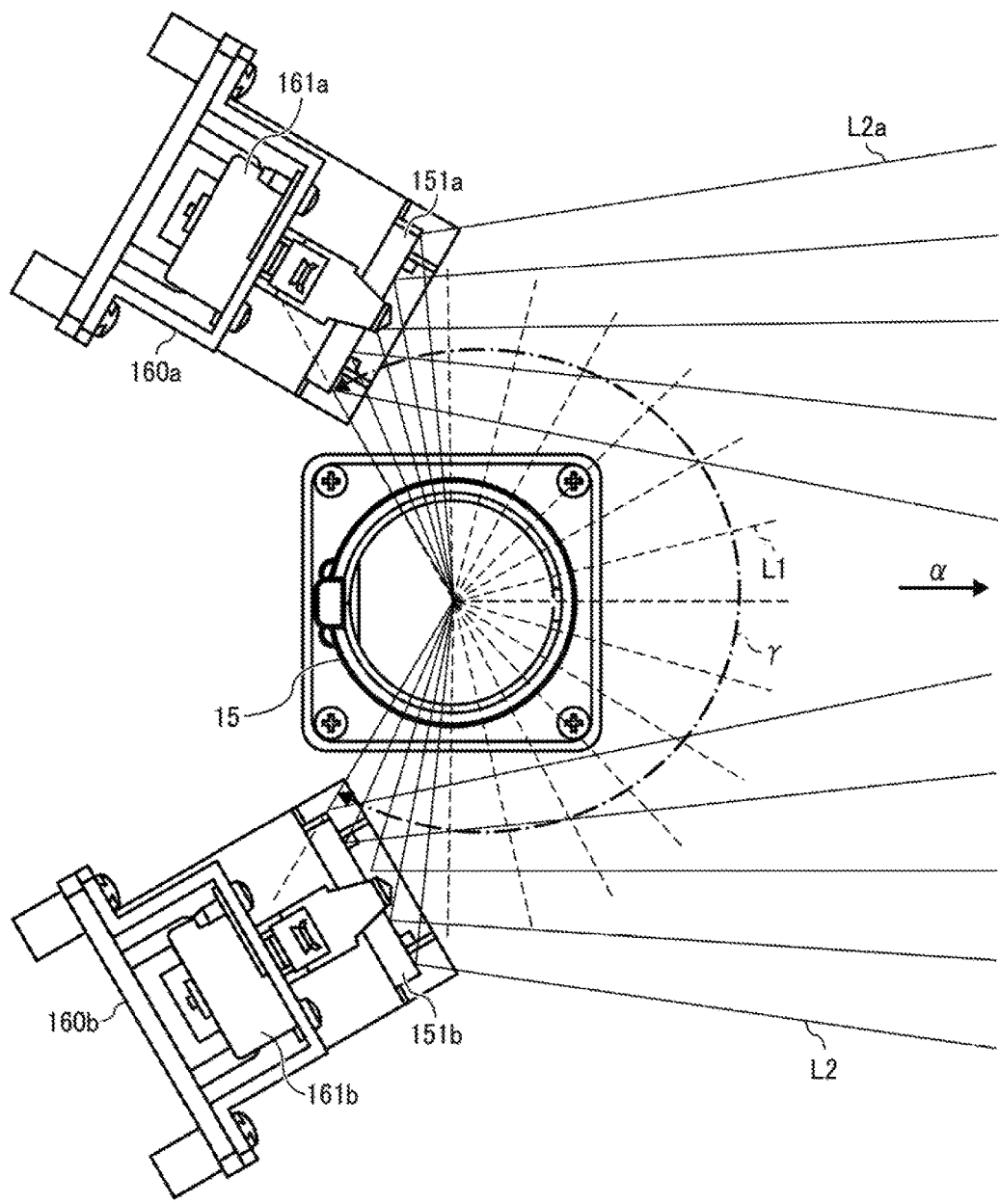
FIG. 16 is an enlarged top view illustrating the region indicated by a dotted line 3 in FIG. 15A.

FIG. 15A is a top view illustrating the autonomous traveling robot 1 according to Embodiment 3 and FIG. 15B is a right side view illustrating the autonomous traveling robot 1 according to Embodiment 3. FIG. 16 is an enlarged top view illustrating a region indicated by a dotted line β in FIG. 15A. The range indicated by arrow γ in a dotted line in FIGS. 15A and 16 indicates a scanning range in which the laser ranging sensor 15 emits light to measure distance.

Different from configuration of the autonomous traveling robot 1 according to Embodiment 2, the autonomous traveling robot 1 according to Embodiment 3 includes multiple sets of combination of the mirror 151 and the mirror retaining unit 160 that changes the installation angle of the mirror 151. Other parts and components of the autonomous traveling robot 1 according to Embodiment 3 are identical to the parts and components of the autonomous traveling robot 1 according to Embodiment 2. Therefore, a detailed description is omitted here.

The autonomous traveling robot 1 according to Embodiment 3 includes a set of combination of the first mirror 151a and a first mirror retaining unit 160a and another set of combination of the second mirror 151b and a second mirror retaining unit 160b disposed symmetrically across the center of the laser ranging sensor 15.

The first mirror 151a and the second mirror 151b are disposed such that the mirror reflection face 151f is tilted to face downwardly. By so doing, part of the laser light in the scanning range is reflected on the first mirror 151a and the second mirror 151b to irradiate the foot area in the travel direction of the autonomous traveling robot 1

With the above-described configuration, the laser ranging sensor 15 can scan both the horizontal direction and the foot direction simultaneously without switching the arrangement angles of the first mirror 151a and the second mirror 151b. Further, while the autonomous traveling robot 1 according to Embodiment 2 includes a single mirror 151, the autonomous traveling robot 1 according to Embodiment 3 includes multiple mirrors, which are the first mirror 151a and the second mirror 151b. Therefore, when compared with Embodiment 2, the autonomous traveling robot 1 according to Embodiment 3 has a wider scanning range on the foot area. Accordingly, a greater amount of the obstacle information is obtained, and therefore a more optimal travel path is generated.

Similar to the autonomous traveling robot 1 according to Embodiment 2, the autonomous traveling robot 1 according to Embodiment 3 causes the mirror adjusting motor 161 (i.e., the first mirror adjusting motor 161a and the second mirror adjusting motor 161b) to change the inclination of the mirror 151 (i.e., the first mirror 151a and the second mirror 151b) when the reflection laser light L2 (i.e., reflection laser lights L2a and L2b) has detected the obstacle 301.

Figure 17A:
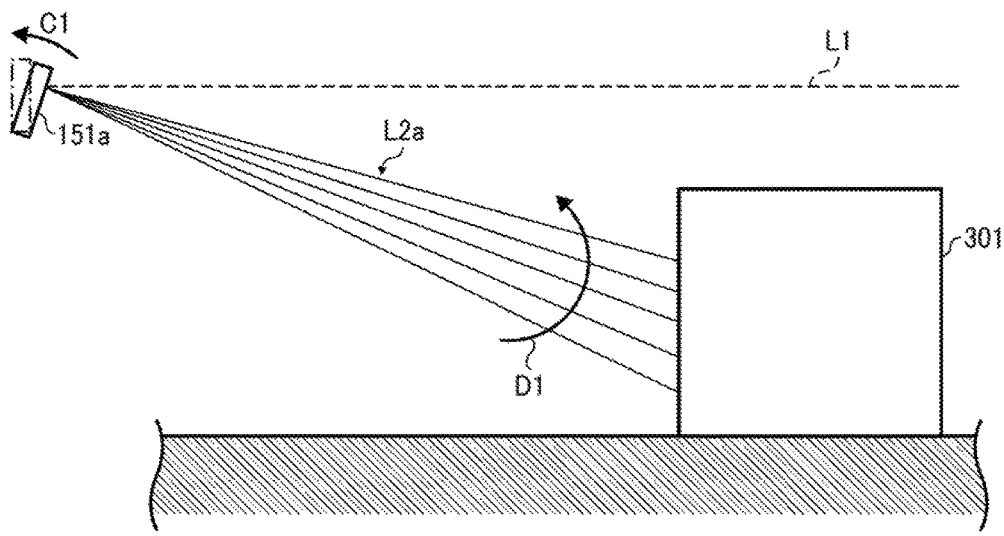
FIG. 17A is a diagram illustrating changes of the light emitting direction of the reflection laser light when the inclination of one of two mirror is changed.
Figure 17B:
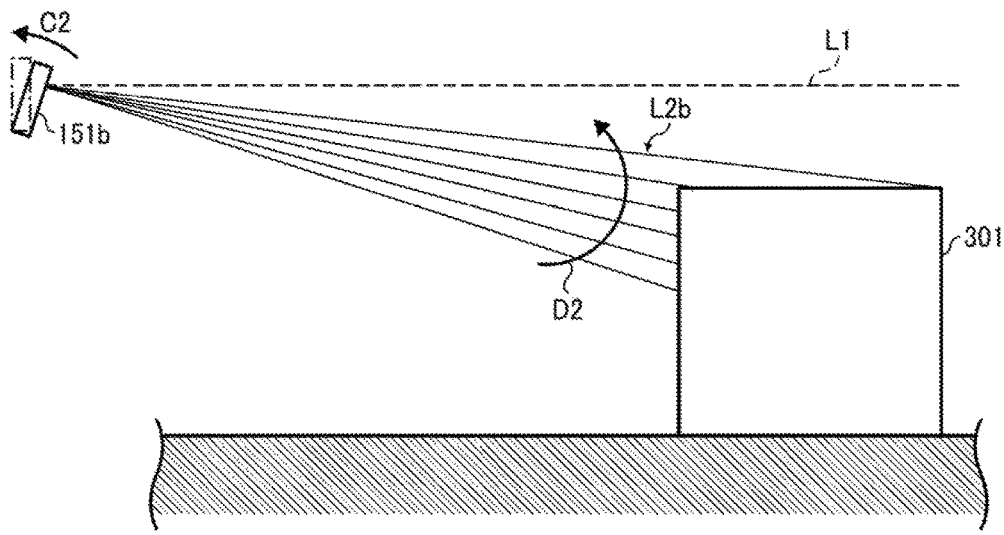
FIG. 17B is a diagram illustrating changes of the light emitting direction of the reflection laser light when the inclination of the other of the two mirrors is changed.

FIGS. 17A and 17B are diagrams illustrating changes of the light emitting direction of the reflection laser light L2 (i.e., reflection laser lights L2a and L2b) when an inclination of the first mirror 151a and an inclination of the second mirror 151b are changed. FIG. 17A illustrates the changes of the light emitting direction of the first mirror 151a and FIG. 17B illustrates the changes of the light emitting direction of the second mirror 151b.

As illustrated in FIGS. 17A and 17B, the autonomous traveling robot 1 according to Embodiment 3 has different swinging ranges of the first mirror 151a and the second mirror 151b when a three-dimensional detection of the obstacle 301 is performed.

Specifically, the first mirror 151a rotates as indicated by arrow C1 in FIG. 17A and the light emitting direction of the reflection laser light L2 (L2a) changes as indicated by arrow D1 in FIG. 17A. The first mirror 151a swings to emit the reflection laser light L2 (L2a) to a range lower than the height of the obstacle 301 illustrated in FIG. 17A.

By contrast, the second mirror 151b rotates as indicated by arrow C2 in FIG. 17B and the light emitting direction of the reflection laser light L2 (L2b) changes as indicated by arrow D2 in FIG. 17B. The second mirror 151b swings to emit the reflection laser light L2 (L2b) to a range higher than the height of the obstacle 301 illustrated in FIG. 17B.

Accordingly, when the shape of the obstacle 301 in the vertical direction is measured after the obstacle 301 is detected, the swinging range of the single mirror 151 illustrated in FIG. 12 can be divided (into two sections in Embodiment 3). Therefore, a time to spend for grasping the shape of the obstacle 301 can be reduced to half the time. By so doing, the shape of the obstacle 301 can be detected more quickly.

Further, the first mirror 151a and the second mirror 151b may have respective ranges identical to each other to swing as illustrated in FIG. 12. In this case, the scanning range when the mirror 151 swings can be greater, and therefore a greater amount of information of the shape of the obstacle can be obtained.

The control of the autonomous traveling robot 1 according to Embodiment 3 has a flowchart identical to the control of the autonomous traveling robot 1 according to Embodiment 2, which is FIG. 13. Therefore, please see FIG. 13 for a detailed description of an example of the control of the autonomous traveling robot 1 according to Embodiment 3. The control of ranging on the foot area in steps S1007 through S1012 performs a concurrent processing to multiple mirrors 151.

Figure 18:
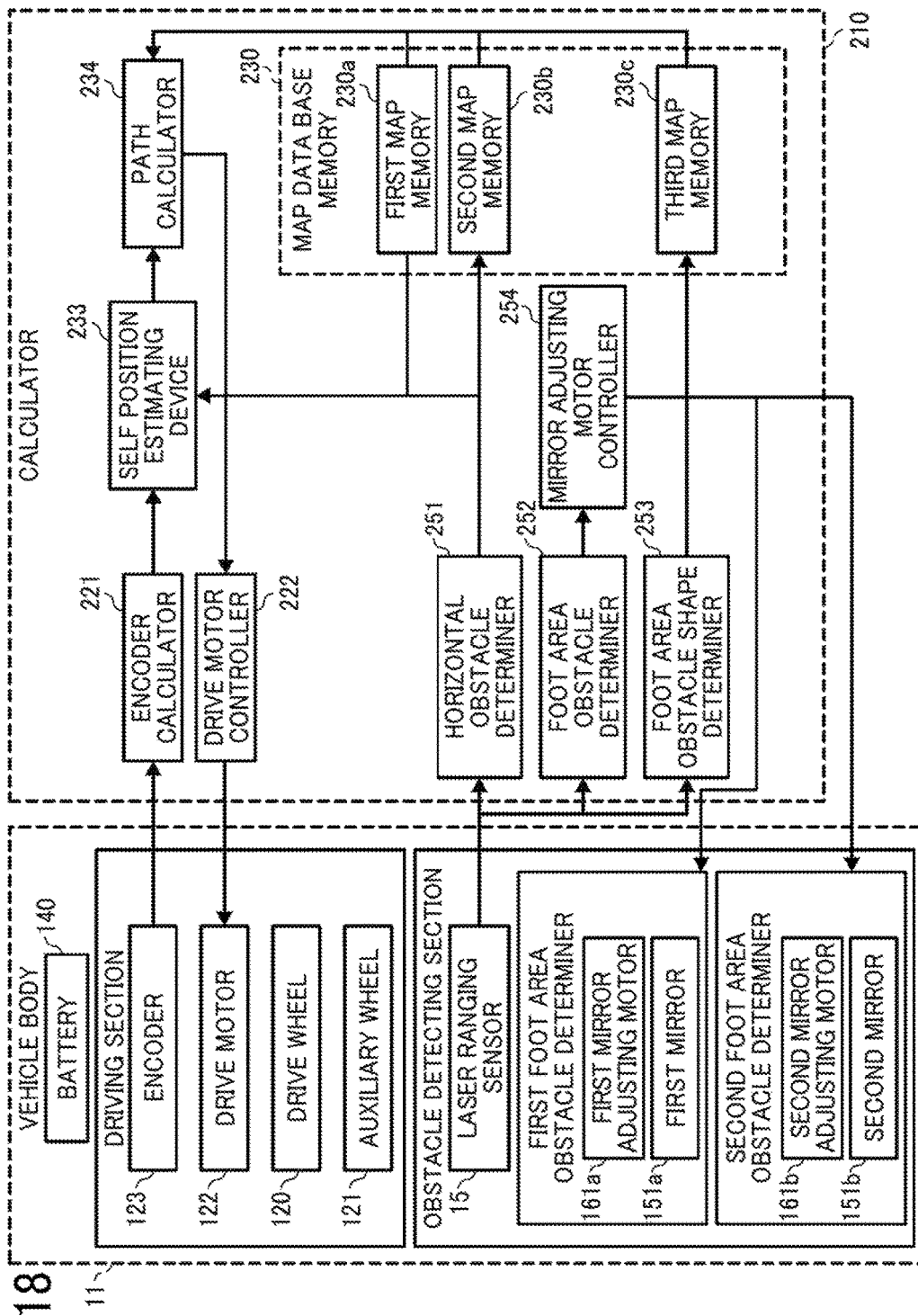
FIG. 18 is a block diagram illustrating a control system of the autonomous traveling robot according to Embodiment 3.

FIG. 18 is a block diagram illustrating a functional configuration of the control system of the autonomous traveling robot 1 according to Embodiment 3.

Different from the block diagram of the autonomous traveling robot 1 according to Embodiment 2 illustrated in FIG. 13, the block diagram of the autonomous traveling robot 1 according to Embodiment 3 includes multiple foot obstacle detectors having the mirror adjusting motor 161 and the mirror 151. Other parts and components in the block diagram of the autonomous traveling robot 1 according to Embodiment 3 are identical to the parts and components in the block diagram of the autonomous traveling robot 1 according to Embodiment 2. Therefore, a detailed description is omitted here.

In the autonomous traveling robot 1 according to Embodiment 3, when the foot area obstacle determiner 252 determines that the obstacle 301 is found, the mirror adjusting motor controller 254 controls the two mirror adjusting motors 161, which are the first mirror adjusting motor 161a and the second mirror adjusting motor 161b.

Embodiment 4

Next, a description is given of the autonomous robot 1 according to Embodiment 4 of this disclosure.

Figure 19A:
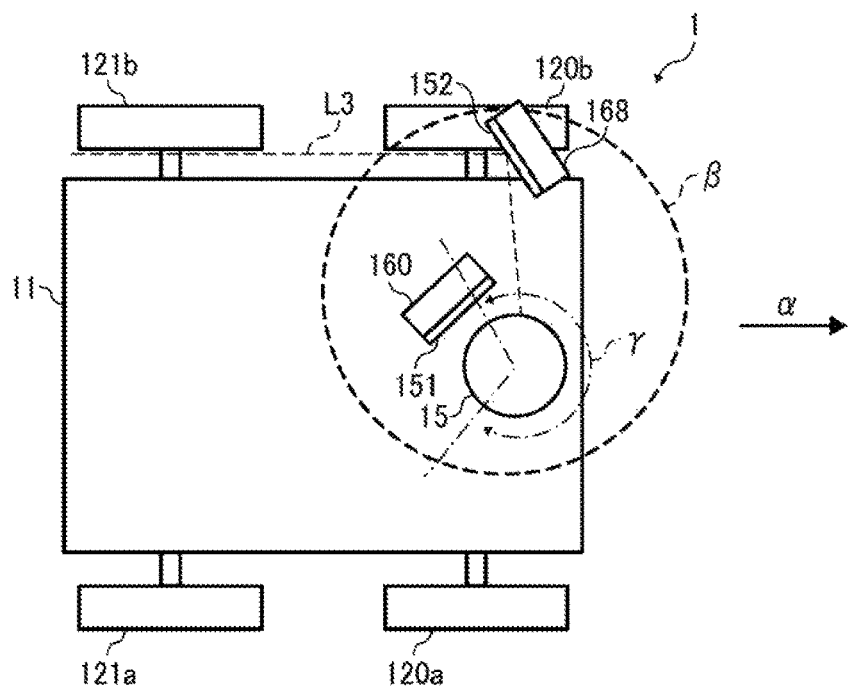
FIG. 19A is a top view illustrating the autonomous traveling robot according to Embodiment 4.
Figure 19B:
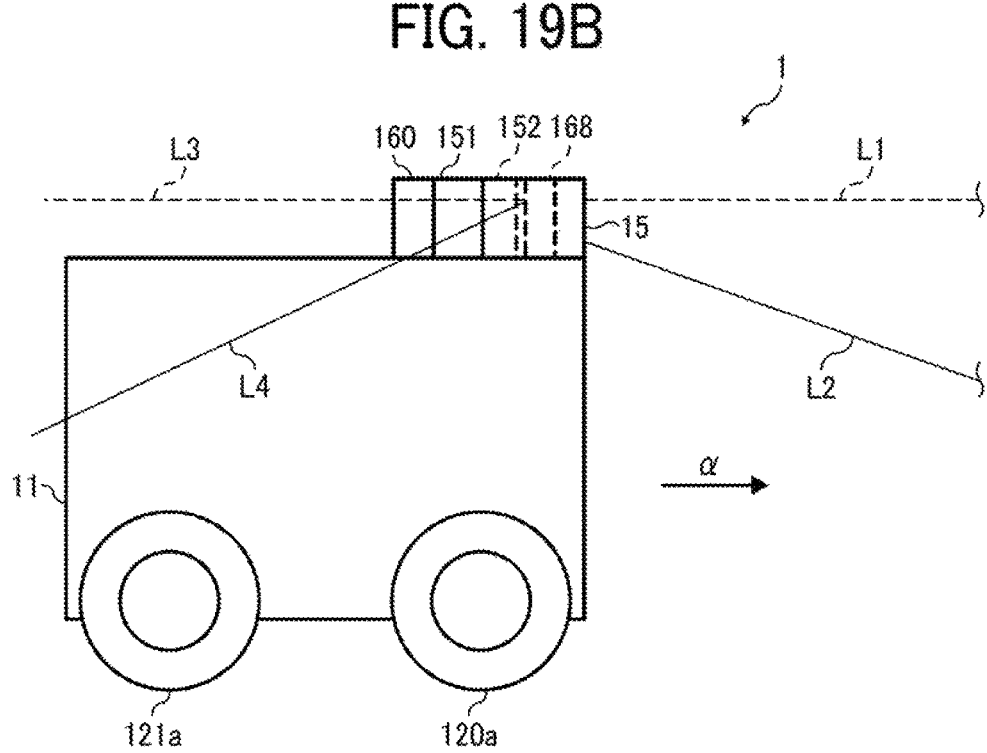
FIG. 19B is a right side view illustrating the autonomous traveling robot according to Embodiment 4.
Figure 20:
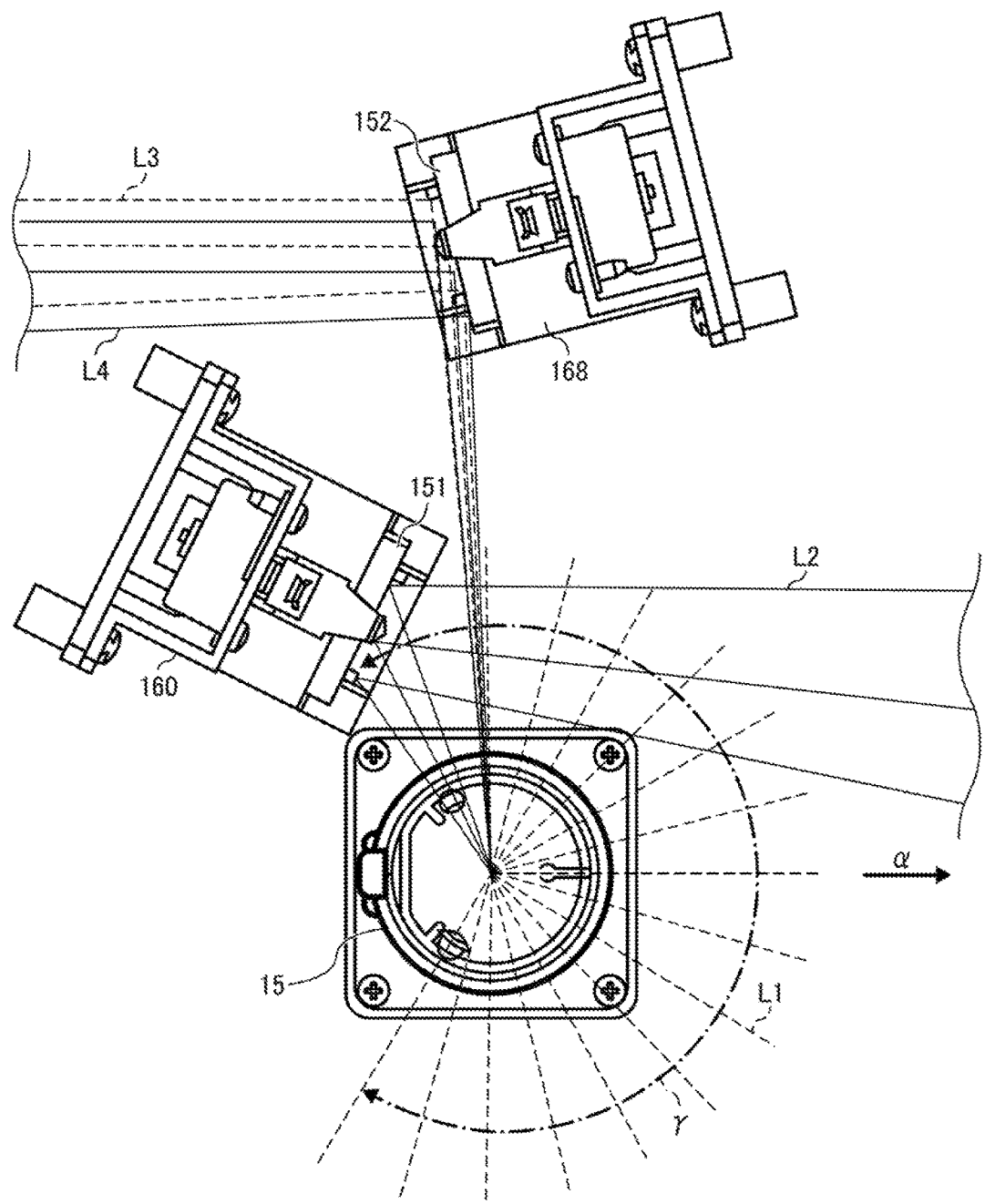
FIG. 20 is an enlarged top view illustrating the region indicated by a dotted line β in FIG. 19A.

FIG. 19A is a top view illustrating the autonomous traveling robot 1 according to Embodiment 4 and FIG. 19B is a right side view illustrating the autonomous traveling robot 1 according to Embodiment 4. FIG. 20 is an enlarged top view illustrating a region indicated by a dotted line β in FIG. 19A. The range indicated by arrow γ in a dotted line in FIGS. 19A and 20 indicates a scanning range in which the laser ranging sensor 15 emits light to measure distance.

Components and units of the autonomous traveling robot 1 according to Embodiment 4 are basically identical to the components and units of the autonomous traveling robot 1 according to Embodiment 2, except that the autonomous traveling robot 1 according to Embodiment 4 further includes a side mirror 152 and a side mirror retaining unit 168.

As illustrated in FIGS. 19A, 19B, and 20, the autonomous traveling robot 1 according to Embodiment 4 has a configuration in which part of the laser light that is emitted by the laser ranging sensor 15 is reflected on the side mirror 152. By so doing, laser lights indicated by dashed lines "L3" in FIGS. 19A, 19B, and 20 are emitted in the rearward direction on the lateral side of the autonomous traveling robot 1.

With this configuration, the autonomous travel robot 1 can scan both the forward and rearward thereof in the horizontal direction without switching the light emitting direction of the laser light of the laser ranging sensor 15 simultaneously. At the same time, the autonomous traveling robot 1 can scan the forward foot area with the mirror 151.

Accordingly, the autonomous traveling robot 1 according to Embodiment 4 can reliably perform both the self position estimation by scanning the forward horizontal direction and the obstacle detection in the rearward direction by scanning the rearward direction.

Since the autonomous traveling robot 1 constantly performs the self position estimation while detecting an obstacle in the rearward direction, the precision of travel thereof can be enhanced.

In addition, the autonomous traveling robot 1 detects an obstacle in the rearward and horizontal direction. Therefore, when moving backward, the autonomous traveling robot 1 can detect the obstacle in the rearward and horizontal direction.

Similar to the mirror retaining unit 160, the side mirror retaining unit 168 includes an actuator function with which the side mirror retaining unit 168 changes the installation angle of the side mirror 152. By tilting the side mirror 152 such that the reflection surface of the side mirror 152 faces downwardly, laser lights indicated by solid lines "L4" in FIGS. 19A, 19B, and 20 are emitted to the foot area in the rearward direction on the lateral side of the autonomous traveling robot 1 to scan the foot area. When an obstacle is detected on the foot area in the rearward direction on the lateral side of the autonomous traveling robot 1, the side mirror retaining unit 168 swings the side mirror 152. By so doing, the three-dimensional shape data of the shape of the obstacle in the rearward direction on the lateral side can be obtained, and therefore the autonomous travel robot 1 can avoid contacting with the obstacle 301 in the rearward direction on the lateral side.

In Embodiment 4, the obstacle information obtained by the laser light reflected on the side mirror 152 is stored separately in the first map memory 230a, the second map memory 230b, and the third map memory 230c.

By storing the obstacle information in separate memories, such as the first map memory 230a, the second map memory 230b, and the third map memory 230c, information of layout of the installation environment and information of a temporary obstacle are grasped individually, and therefore can be managed in each division.

As illustrated in FIGS. 19A, 19B, and 20, in Embodiment 4, the side mirror 152 is disposed in the rearward direction from the center of the laser ranging sensor 15 in the scanning range.

The autonomous traveling robot 1 detect information used for autonomous travel in the forward direction, such as estimation of the self position and detection of an obstacle in the travel path based on the information of laser ranging by the laser ranging sensor 15 in the forward horizontal direction. When performing such autonomous travel, there is a case in which information of laser ranging by the laser light emitted in a direction substantially horizontal is not used even if the laser light is emitted in the forward direction from the center of the laser ranging sensor 15. In this case, the side mirror 152 may be disposed at a position in the scanning range of the laser ranging sensor 15 in the direction substantially horizontal and forward from the center area of the scanning range of the laser ranging sensor 15.

Figure 21A:
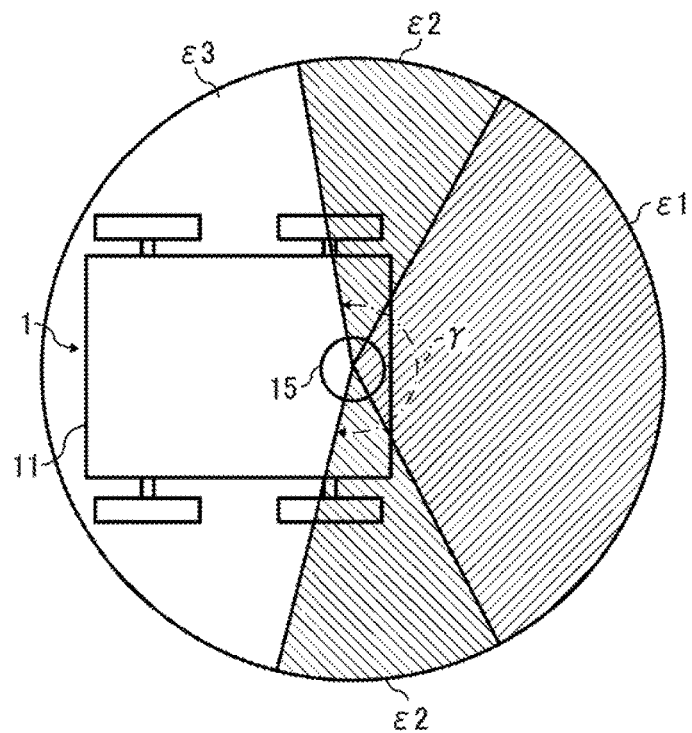
FIG. 21A is a diagram illustrating a detection range by a ranging sensor without a side mirror.
Figure 21B:
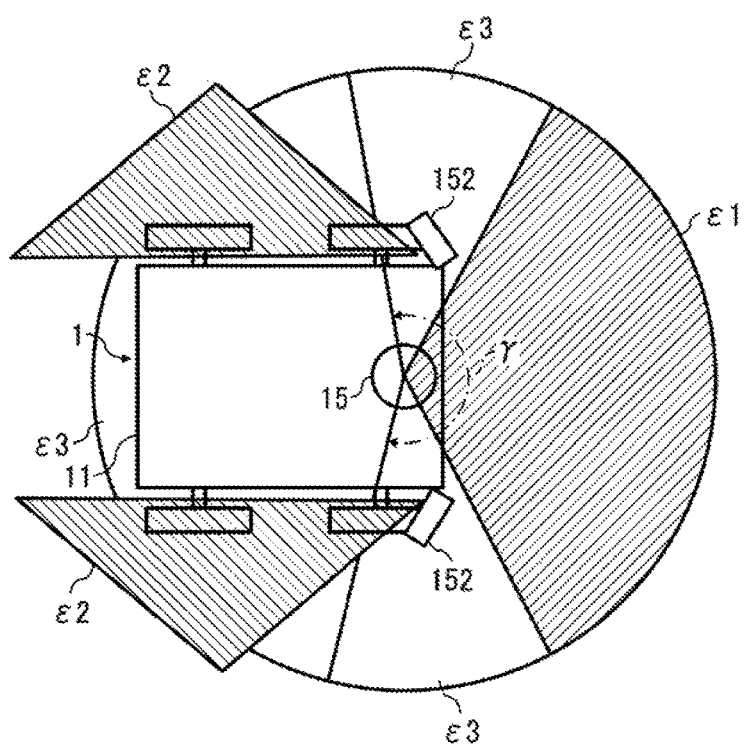
FIG. 21B is a diagram illustrating the detection range by the ranging sensor with a side mirror.

FIGS. 21A and 21B are top views illustrating comparison of detection ranges of the laser ranging sensor 15 of the autonomous traveling robot 1 with or without the side mirror 152 disposed beyond the center of the laser ranging sensor 15 of the autonomous traveling robot 1 according to Embodiment 4. FIG. 21A is a diagram illustrating the detection range by the laser ranging sensor 15 without the side mirrors 152. FIG. 21B is a diagram illustrating the detection range by the laser ranging sensor 15 with the side mirrors 152.

A region indicated by symbol epsilon 1 in FIGS. 21A and 21B indicates a detection range for using the data of measured range for autonomous travel in the forward direction. A region indicated by symbol epsilon 2 in FIGS. 21A and 21B indicates a detection range for detecting an obstacle. A region indicated by symbol epsilon 3 in FIGS. 21A and 21B indicates a blind spot range in which the laser ranging sensor 15 cannot measure distance.

The configuration illustrated in FIG. 21B includes the minimum required extent or the least required range for autonomous travel of the autonomous traveling robot 1 in the forward direction to emit laser light in the forward horizontal direction and another range in which part of laser light to be emitted other than the least required range is emitted in the rearward direction on both lateral sides of the autonomous traveling robot 1.

As illustrated in FIG. 21B, with the configuration having the side mirrors 152, the laser light that has been emitted to the outside of the scanning range used for autonomous travel can be used to detect an obstacle located in the rearward direction through the rearward and obliquely downward direction on the foot area of the autonomous traveling robot 1.

Embodiment 5

Next, a description is given of the autonomous traveling robot 1 according to Embodiment 5 of this disclosure.

Figure 22A:
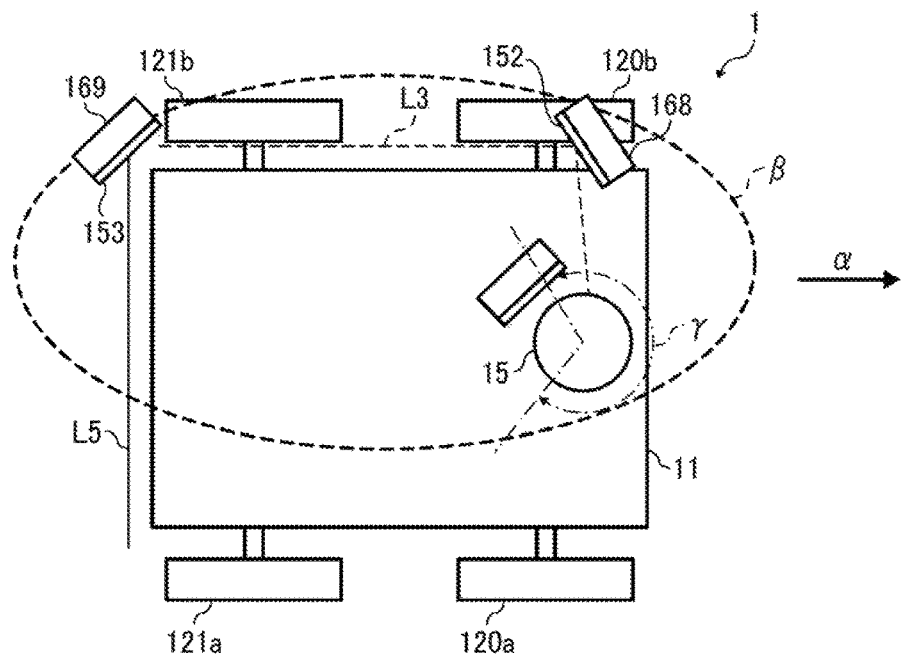
FIG. 22A is a top view illustrating the autonomous traveling robot according to Embodiment 5.
Figure 22B:
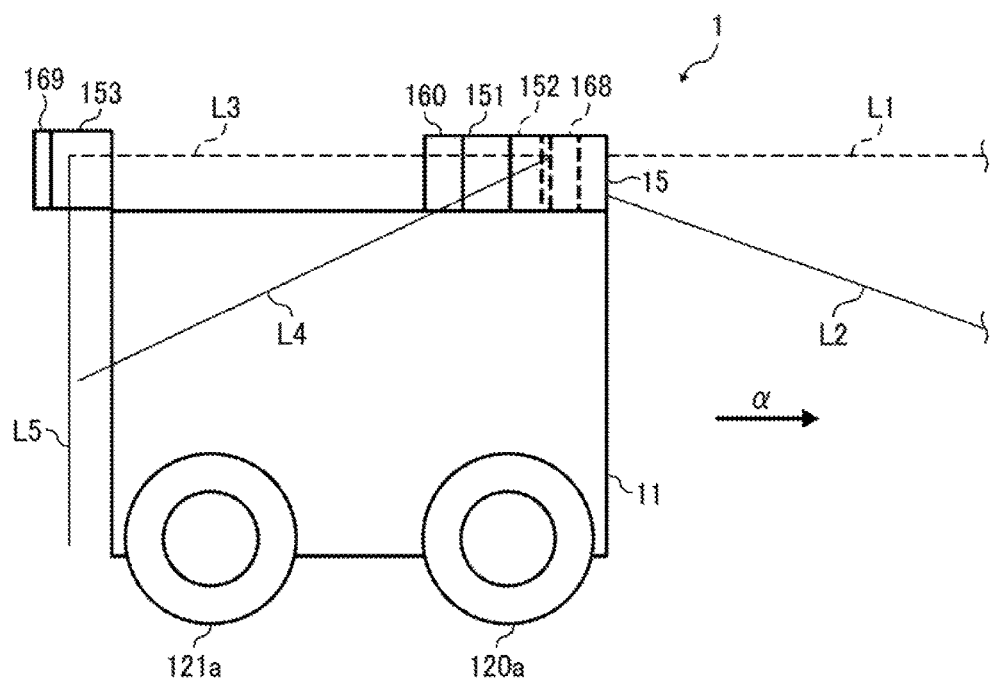
FIG. 22B is a right side view illustrating the autonomous traveling robot according to Embodiment 5.
Figure 23:
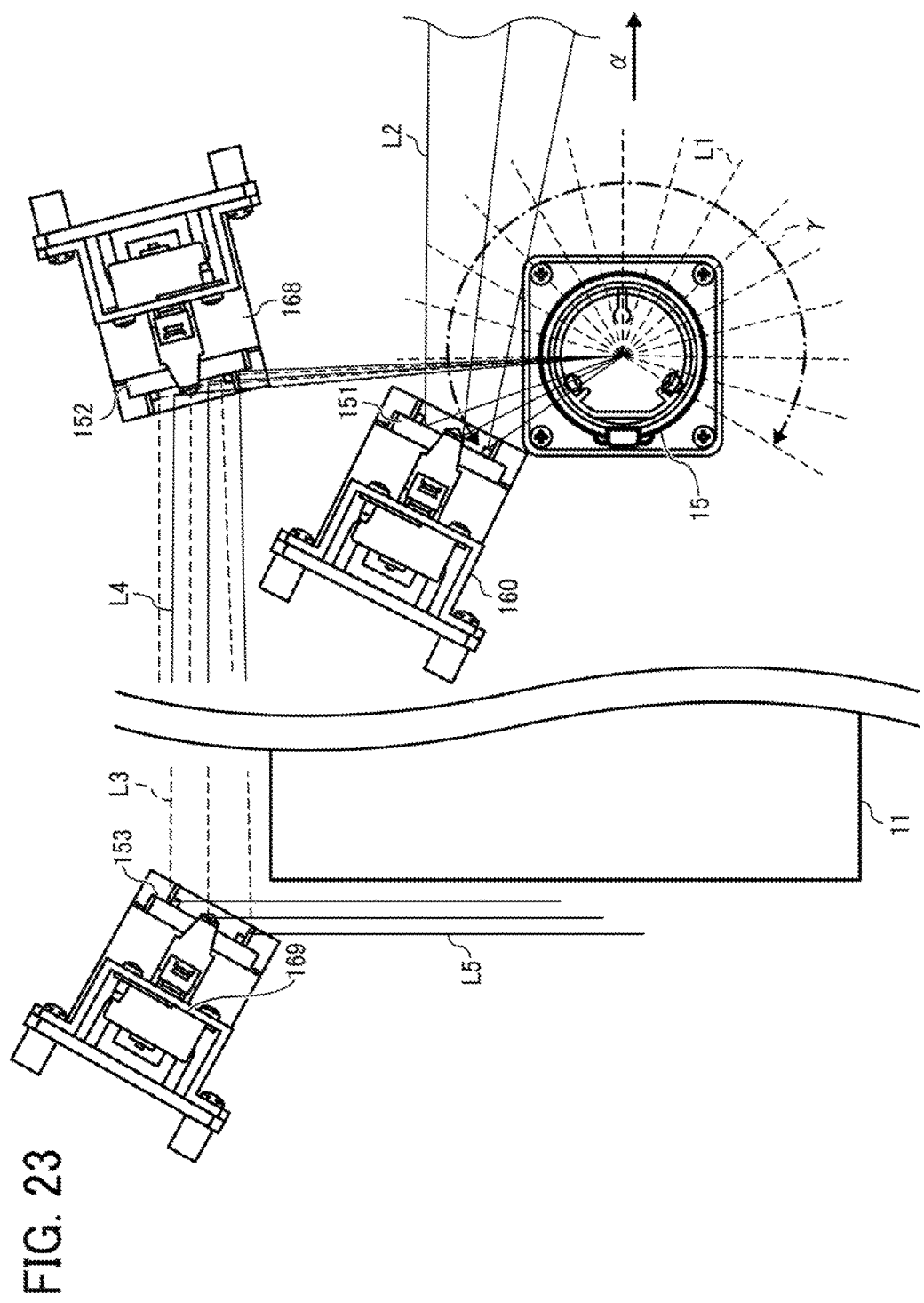
FIG. 23 is an enlarged top view illustrating a region indicated by a dotted line β in FIG. 22A.

FIG. 22 is a top view illustrating the autonomous traveling robot 1 according to Embodiment 5 and FIG. 22B is a right side view illustrating the autonomous traveling robot 1 according to Embodiment 5. FIG. 23 is an enlarged top view illustrating a region indicated by a dotted line β in FIG. 22A. The range indicated by arrow γ in a dotted line in FIGS. 22A and 23 indicates a scanning range in which the laser ranging sensor 15 emits light to measure distance.

Components and units of the autonomous traveling robot 1 according to Embodiment 4 are basically identical to the components and units of the autonomous traveling robot 1 according to Embodiment 2, except that the autonomous traveling robot 1 according to Embodiment 4 further includes a rear mirror 153 and a rear mirror retaining unit 169.

As illustrated in FIGS. 22A, 22B, and 23, the autonomous traveling robot 1 according to Embodiment 5 has a configuration in which part of the laser light that is emitted by the laser ranging sensor 15 is reflected on the side mirror 152. By so doing, laser lights indicated by dashed lines "L3" in FIGS. 22A, 22B, and 23 are emitted in the rearward direction on the lateral side of the autonomous traveling robot 1. Further, by reflecting the laser lights L3 emitted in the rearward direction on the rear mirror 153, laser lights indicated by solid lines "L5" in FIGS. 22A, 22B, and 23 are emitted to the foot area in the rearward direction of the vehicle body 11.

With this configuration, the autonomous travel robot 1 can scan both the forward horizontal direction and the rearward and obliquely downward direction without switching the light emitting direction of the laser light of the laser ranging sensor 15 simultaneously. At the same time, the autonomous traveling robot 1 can scan the forward and obliquely downward direction with the mirror 151.

Accordingly, the autonomous traveling robot 1 according to Embodiment 5 can reliably perform both the self position estimation by scanning the forward horizontal direction and the obstacle detection in the rearward direction by scanning the rearward and obliquely downward direction.

Since the autonomous traveling robot 1 constantly performs the self position estimation while detecting an obstacle in the rearward and obliquely downward direction, the precision of travel thereof can be enhanced.

In addition, the autonomous traveling robot 1 detects an obstacle in the rearward and obliquely downward direction. Therefore, when moving backward, the autonomous traveling robot 1 can detect the obstacle in the rearward and obliquely downward direction.

Similar to Embodiment 4, by tilting the side mirror 152 such that the reflection surface of the side mirror 152 faces downwardly, laser lights indicated by solid lines "L4" in FIGS. 22A, 22B, and 23 are emitted to the foot area in the rearward direction of the autonomous traveling robot 1 to scan the foot area. When an obstacle is detected on the foot area in the rearward direction of the autonomous traveling robot 1, the side mirror retaining unit 168 swings the side mirror 152. By so doing, the three-dimensional shape data of the shape of the obstacle in the rearward direction on the lateral side can be obtained, and therefore the autonomous travel robot 1 can avoid contacting the obstacle 301 in the rearward direction on the lateral side.

In addition, similar to the mirror retaining unit 160, the rear mirror retaining unit 169 includes an actuator function with which the rear mirror retaining unit 169 changes the installation angle of the rear mirror 153. When an obstacle is detected on the foot area in the rearward direction of the autonomous traveling robot 1, the rear mirror retaining unit 169 swings the rear mirror 153. By so doing, the three-dimensional shape data of the shape of the obstacle in the rearward direction on the foot area can be obtained, and therefore the autonomous travel robot 1 can avoid contacting the obstacle 301 in the rearward direction.

In Embodiment 5, the obstacle information obtained by the laser light reflected on the rear mirror 153 is stored separately in the first map memory 230a, the second map memory 230b, and the third map memory 230c.

By storing the obstacle information in separate memories, such as the first map memory 230a, the second map memory 230b, and the third map memory 230c, information of layout of the installation environment and information of a temporary obstacle are grasped individually, and therefore can be managed in each division.

Figure 24A:
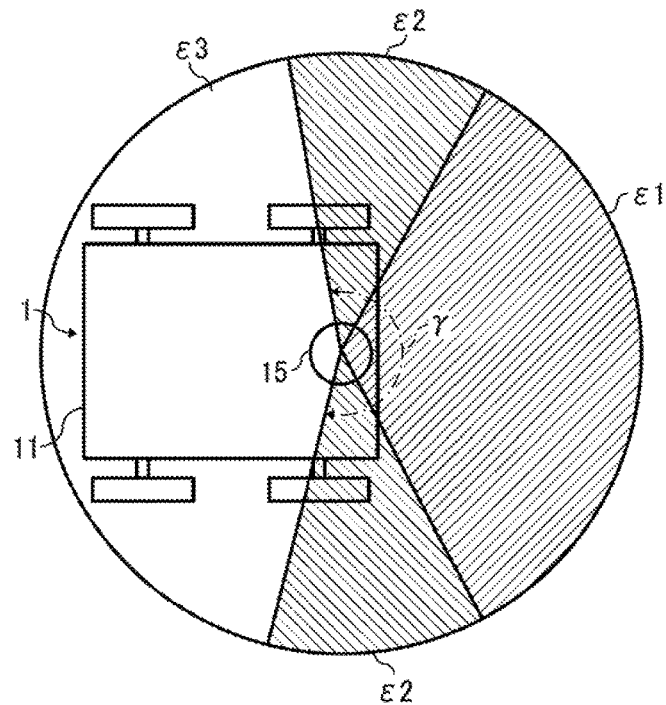
FIG. 24A is a diagram illustrating the detection range by the ranging sensor without a side mirror and a rear mirror.
Figure 24B:
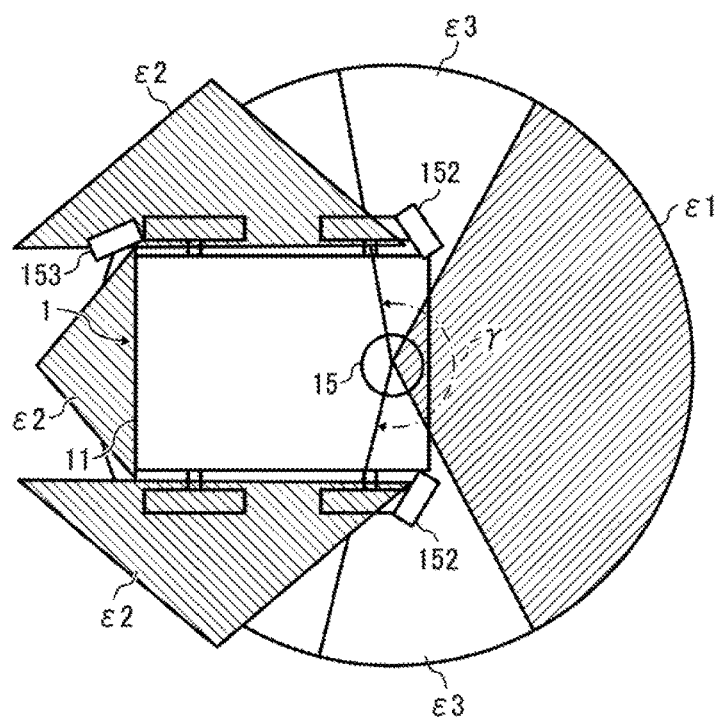
FIG. 24B is a diagram illustrating the detection range by the ranging sensor with a side mirror and a rear mirror.

FIGS. 24A and 24B are top views illustrating comparison of detection ranges of the laser ranging sensor 15 of the autonomous traveling robot 1 with or without the side mirrors 152 and the rear mirror 153. FIG. 24A is a diagram illustrating the detection range by the laser ranging sensor 15 without the side mirrors 152 and the rear mirror 153. FIG. 24B is a diagram illustrating the detection range by the laser ranging sensor 15 with the side mirrors 152 and the rear mirror 153.

A region indicated by symbol epsilon 1 in FIGS. 24A and 24B indicates a detection range for using the data of measured range for autonomous travel in the forward direction. A region indicated by symbol epsilon 2 in FIGS. 24A and 24B indicates a detection range for detecting an obstacle. A region indicated by symbol epsilon 3 in FIGS. 24A and 24B indicates a blind spot range in which the laser ranging sensor 15 cannot measure distance.

The configuration illustrated in FIG. 24B includes the minimum required extent or the least required range for autonomous travel of the autonomous traveling robot 1 in the forward direction to emit laser light in the forward horizontal direction, another range in which part of laser light to be emitted other than the least required range is emitted in the rearward direction on both lateral sides of the autonomous traveling robot 1, and yet another range in which part of laser light to be emitted other than the least required range is emitted in the rearward and obliquely downward direction.

As illustrated in FIG. 24B, with the configuration having the side mirrors 152 and the rear mirror 153, the laser light that has been emitted to the outside of the scanning range used for autonomous travel can be used to detect an obstacle located in the rearward and obliquely downward direction on the foot area of the autonomous traveling robot 1.

Embodiment 6

Next, a description is given of the autonomous traveling robot 1 according to Embodiment 6 of this disclosure.

Figure 25A:
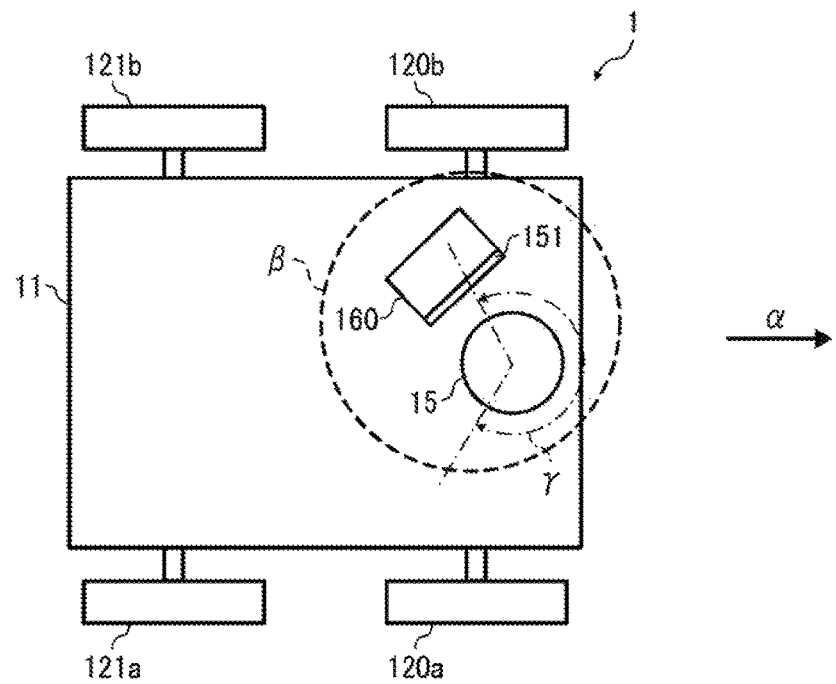
FIG. 25A is a top view illustrating the autonomous traveling robot according to Embodiment 6.
Figure 26:
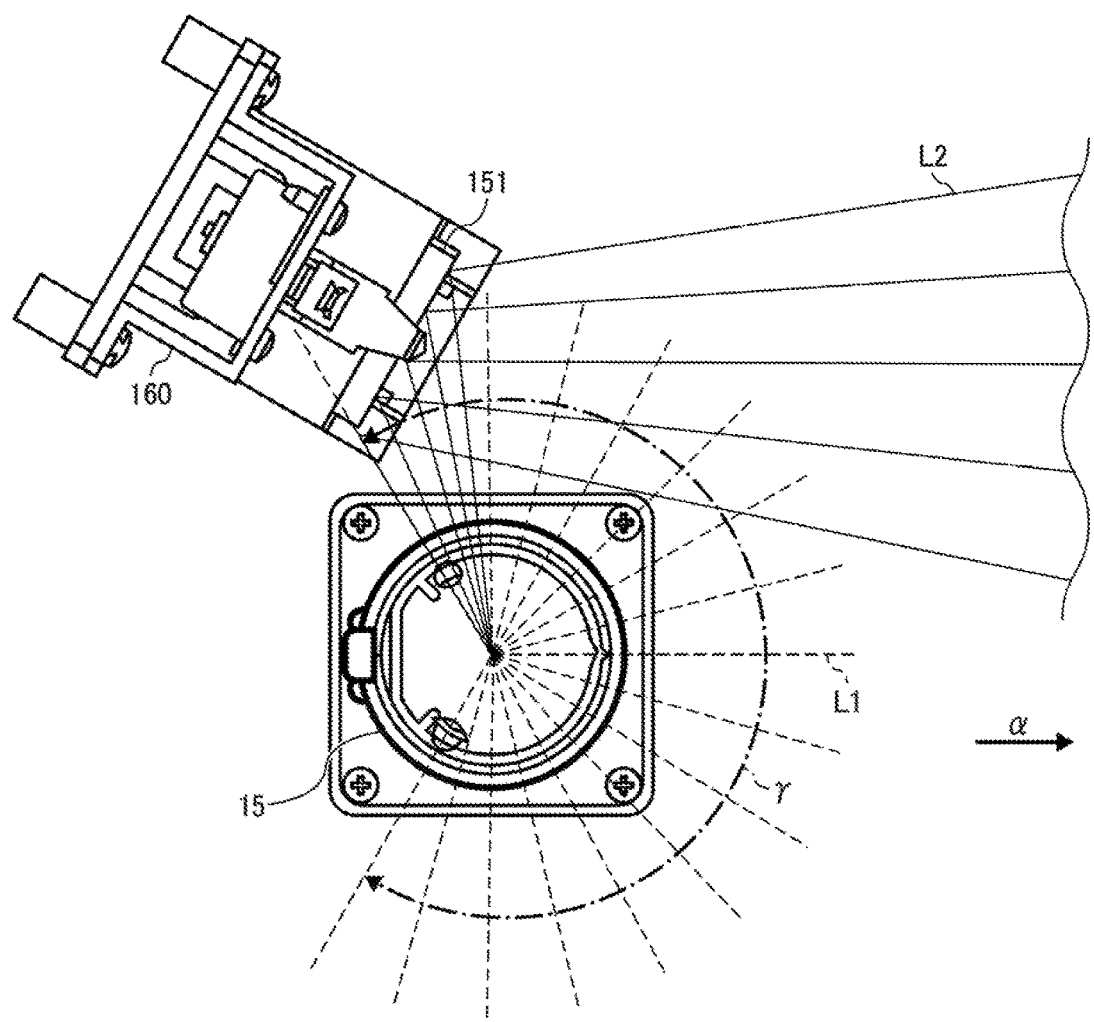
FIG. 26 is an enlarged top view illustrating a region indicated by a dotted line 3 in FIG. 25A.

FIG. 25A is a top view illustrating the autonomous traveling robot 1 according to Embodiment 6 and FIG. 15B is a right side view illustrating the autonomous traveling robot 1 according to Embodiment 6. FIG. 26 is an enlarged top view illustrating a region indicated by a dotted line β in FIG. 25A. The range indicated by arrow γ in a dotted line in FIGS. 25A and 26 indicates a scanning range in which the laser ranging sensor 15 emits light to measure distance.

While the autonomous traveling robot 1 according to Embodiment 1 includes the mirror 151 inclined so that a reflection surface of the mirror 151 faces downwardly, the autonomous traveling robot 1 according to Embodiment 6 includes the mirror 151 having the reflection surface vertical to a horizontal plane. That is, the autonomous traveling robot 1 according to Embodiment 6 has the angle of inclination θβ, which is described in Embodiment 1, to be 0 (zero) degree.

Figure 25B:
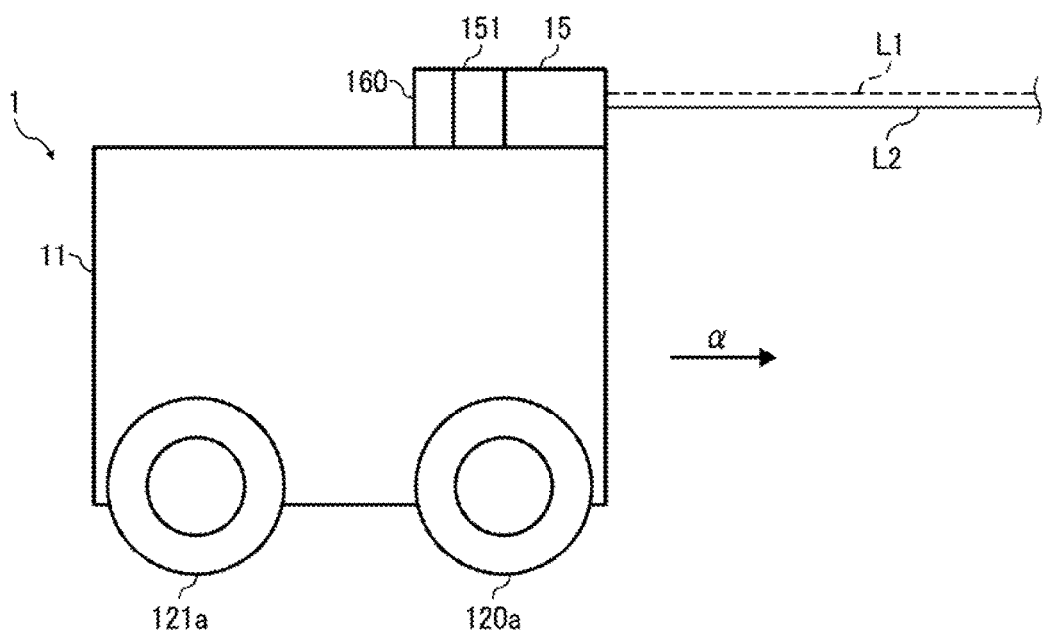
FIG. 25B is a right side view illustrating the autonomous traveling robot according to Embodiment 6.

In the autonomous traveling robot 1 according to Embodiment 6, the reflection laser light L2 reflected on the mirror 151 is reflected in the horizontal direction to scan the forward direction of the autonomous traveling robot 1 in the horizontal direction. Therefore, in the autonomous traveling robot 1 according to Embodiment 6, the region in which the reflection laser light L2 scans and the region in which the direct laser light L1 scans are overlapped. In FIG. 25B, the optical path of the reflection laser light L2 is illustrated below the optical path of the direct laser light L1, for convenience. However, in Embodiment 6, the optical path of the reflection laser light L2 and the optical path of the direct laser light L1 are on the same horizontal plane.

Generally, ranging sensors that perform optical scanning have a viewing angle of approximately 270 degrees. In a case in which such a ranging sensor is disposed so as to scan the forward direction of an autonomous traveling device, the autonomous traveling device can have a scanning range of approximately 135 degrees in the travel direction of the autonomous traveling device. However, a ranging cycle tends to be long and a ranging density tends to be low.

When the ranging cycle is long, an interval of time also becomes long before a subsequent ranging operation in a direction in which the laser ranging has been performed once. By contrast, when the ranging cycle is short, since a small number of laser light is emitted within an optional range of an obstacle to be measured, the ranging resolution becomes low, and therefore the recognition precision of the shape of an obstacle also becomes low. Accordingly, it is likely to erroneously judge the detected obstacle when determining whether the obstacle is to steer around or to detour. Further, it is likely that the shape information of the detected obstacle and the shape information of the obstacle in the map information do not match, and therefore the self position cannot be estimated or is erroneously estimated.

As described above, the ranging cycle and the density of laser ranging are greatly involved in the performance of autonomous travel. However, it is difficult to enhance these abilities. Further, there is a case in which a wide viewing angle that is an advantage of an optical scanning ranging sensor cannot be used effectively and entirely by limitation of field of view due to the mechanical structure of the autonomous traveling device.

In the autonomous traveling robot 1 according to Embodiment 6, the mirror 151 that functions as a reflection body is disposed at the rear side of the laser ranging sensor 15 to utilize the laser light that has not been used due to the limitation of field of view. Specifically, the mirror 151 is disposed such that the region in which the direct laser light L1 emitted from the laser ranging sensor 15 in the forward direction of the autonomous traveling robot 1 measures the distance and the region in which the reflection laser light L2 that is emitted from the laser ranging sensor 15 in the rearward direction and is reflected on the mirror 151 are overlapped.

According to this configuration, the reflection laser light L2 can measure the range in the forward direction of the autonomous traveling robot 1 between the laser ranging by the direct laser light L1 in the forward direction of the autonomous traveling robot 1 and the laser ranging by the direct laser light L1. Therefore, even when the laser ranging sensor 15 has the identical ranging cycles, the cycle to measure the range in the forward direction can be reduced, and therefore the performance of the ranging cycle when ranging in the forward direction can be enhanced.

Further, the laser ranging region of the direct laser light L1 and the laser ranging region of the reflection laser light L2 are overlapped. Therefore, even when the laser ranging sensor 15 has the identical ranging cycles, the number of laser light to be emitted within the optional region to measure the range to an object in the forward direction can be increased, so that the density of laser ranging when ranging in the forward direction can be increased. Consequently, the resolution of the laser ranging is enhanced, and therefore the recognition precision of the shape of the obstacle is also enhanced.

Accordingly, the abilities of the autonomous traveling robot 1 in estimation of the self position and recognition of an obstacle can be enhanced, and therefore the precision of travel of the autonomous traveling robot 1 can be also enhanced.

In addition, the laser light to be emitted in the rearward direction from the laser ranging sensor 15 is directed in the forward direction. By so doing, the density of laser ranging can be enhanced and the ranging cycle can be reduced effectively.

As illustrated in FIG. 26, the autonomous traveling robot 1 has the mirror 151 at the rear side of the scanning range from the laser ranging sensor 15 as a center, with respect to the travel direction. By disposing the mirror 151 as described above, the direction of emission of the laser light is changed from the rearward direction to the forward horizontal direction, and therefore the autonomous traveling robot 1 can effectively enhance the density of laser ranging and reduce the intervals of the ranging timings.

Figure 27:
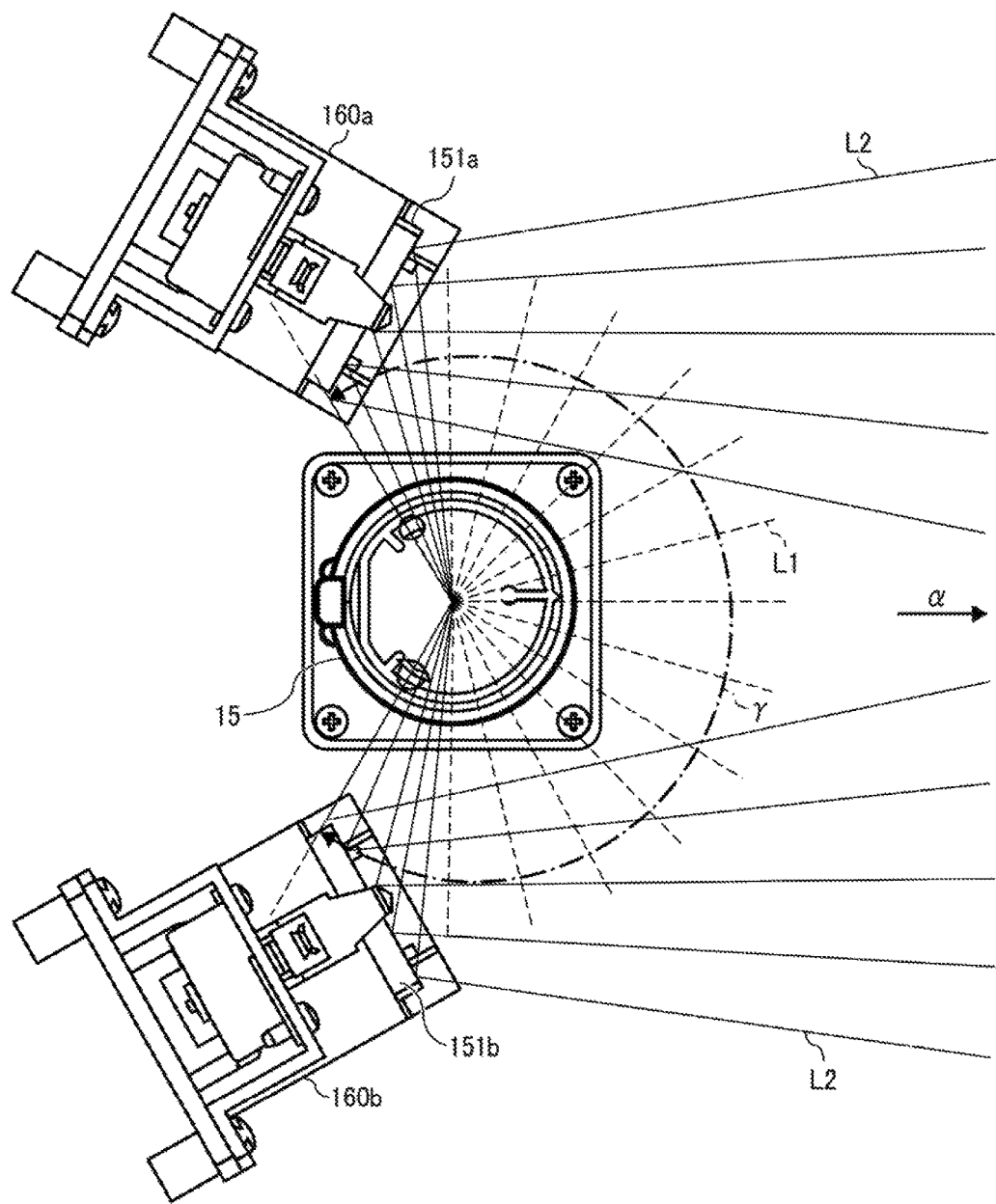
FIG. 27 is an enlarged top view illustrating the autonomous traveling robot according to Embodiment 6, including two mirrors and a ranging sensor disposed near the autonomous traveling robot.

FIG. 27 is an enlarged top view illustrating the autonomous traveling robot 1 according to Embodiment 6, including multiple mirrors 151, which are the first mirror 151a and the second mirror 151b, and an adjacent area of the autonomous traveling robot 1 near the laser ranging sensor 15.

In FIG. 27, the first mirror 151a and the second mirror 151b are disposed at the rear side of the scanning range γ of the laser ranging sensor 15. This configuration is three times, at most, as effective as a configuration not having the mirror 151 in enhancing the density of laser ranging and in reducing the ranging cycle.

Figure 28A:
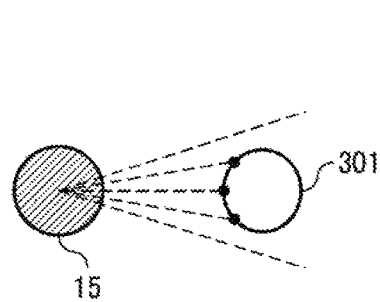
FIG. 28A is a diagram illustrating a configuration without a mirror in a state in which laser light is emitted at a cylindrical obstacle.
Figure 28B:
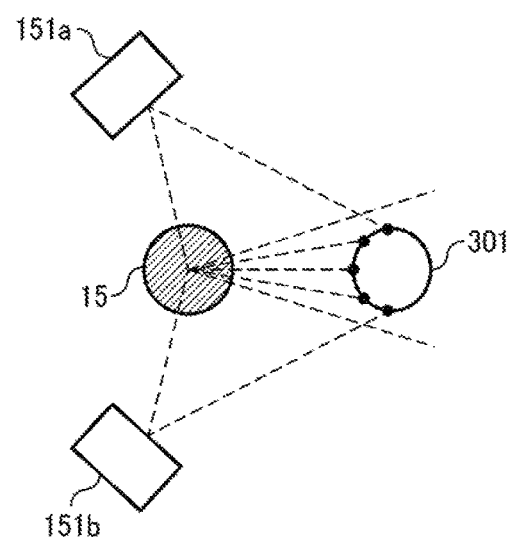
FIG. 28B is a diagram illustrating a configuration with two mirrors in the state in which laser light is emitted at the cylindrical obstacle.

FIG. 28A is a diagram illustrating a configuration without a mirror in a state in which laser light is emitted from the laser ranging sensor 15 at a cylindrical obstacle 301. FIG. 28B is a diagram illustrating a configuration with two mirrors 151 in the state in which laser light is emitted from the laser ranging sensor 15 at the cylindrical obstacle 301.

In FIGS. 28A and 28B, optical paths of the laser light emitted by the laser ranging sensor 15 are indicated by dotted lines. In the configuration illustrated in FIG. 28A, information of ranging to the obstacle 301 is obtained from a single viewpoint where the laser ranging sensor 15 is disposed. By contrast, in the configuration illustrated in FIG. 28B, information of ranging to the obstacle 301 is obtained from multiple viewpoints where the laser ranging sensor 15 is disposed and where the mirrors 151 (i.e., the first mirror 151a and the second mirror 151b in FIG. 28B) are disposed.

There have been various proposals of methods of recognizing an object shape in the forward direction and tracking the object by using an optical scanning ranging sensor. However, information of the measured range obtained from a single viewpoint has a low density of laser ranging, a long ranging cycle, and a wide range of blind spot. Accordingly, it is difficult to track the object stably. By contrast, the laser ranging sensor 15 according to Embodiment 6 measures the range to the object from multiple viewpoints by using the mirrors 151, and therefore the blind spots can be reduced. In addition, while the configuration without the mirror 151 measures the range to the object from the front, the laser ranging sensor 15 according to Embodiment 6 measures the shape of the object in more detail.

Further, the two-dimensional shape of the object that moves in the installation environment is previously stored in the second map memory 230b, and then the measurement result and the shape of the object stored in the second map memory 230b are compared. Accordingly, even when the object moves, the object tracking can be performed preferably.

Figure 29:
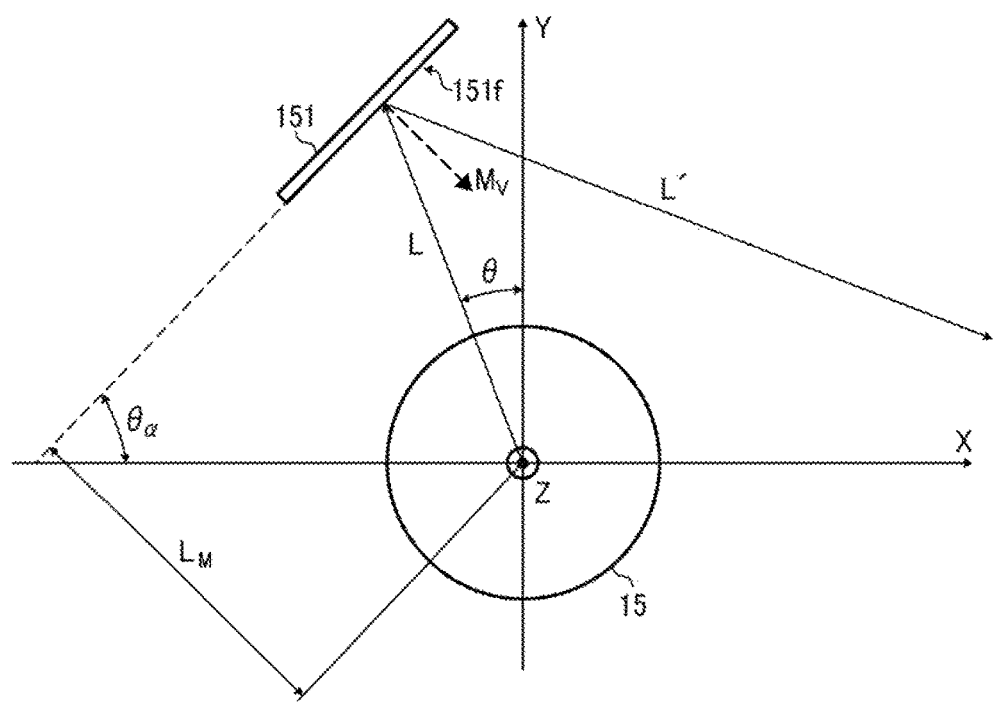
FIG. 29 is a diagram illustrating how to calculate a laser range using coordinates when the center of the LRF functions as a point of origin.

Next, a description is given of a method of calculating the laser ranging using the reflection laser light L2 in the autonomous traveling robot 1 according to Embodiment 6, with reference to FIG. 29.

FIG. 29 is a top view illustrating a calculation method using coordinates having an origin that is a center of a light emitting position (i.e., the center of the LRF) from which the laser ranging sensor 15 emits laser light. In FIG. 29, the X-axis represents the travel direction (indicated by arrow ac) of the autonomous traveling robot 1, the Y-axis represents the horizontal direction (the left and right direction) perpendicular to the X-axis, and the Z-axis represents the vertical direction that directs upward.

Axial Eccentricity of Z-axis of Mirror: $\theta\alpha$,
Emission Angle from LRF: $\theta$,
Distance from Center of LRF to Mirror Surface: LM,
Distance from Center of LRF to Mirror Reflection Point: L, and
Line Length of Reflected Light from Mirror Reflection Point to Target Object: N.

An incident light from the LRF (i.e., the laser ranging sensor 15) to the mirror 151 is represented by vector in Expression 24.

$$\vec{L}(A,B) \qquad \text{Expression 24.}$$

Based on Expression 24, Expression 25 is obtained.

$$A = -|L|\cdot\sin\theta \quad B = |L|\cdot\cos\theta \qquad \text{Expression 25.}$$

When "L" is expressed with "LM" and "$\theta\alpha$" that are layout parameters, Expression 26 is obtained.

$$|L| = \frac{L_M}{\cos(\theta_\alpha - \theta)}. \qquad \text{Expression 26}$$

Based on Expression 25 and Expression 26, Expression 27 is obtained.

$$\vec{L}(A,B) \qquad \text{Expression 27.}$$

Expression 27 is expressed by Expression 28.

$$A = \frac{-L_M \cdot \sin\theta}{\cos(\theta_\alpha - \theta)} \quad B = \frac{L_M \cdot \cos\theta}{\cos(\theta_\alpha - \theta)}. \qquad \text{Expression 28}$$

Next, the mirror reflection face 151f is represented by vector.

A vector that is vertical to the mirror reflection face 151f is represented by Expression 29.

$$\vec{M}_V(a,b) \qquad \text{Expression 29.}$$

Then, Expression 30 is obtained based on Expression 29.

$$\vec{M}_V(a,b) = (-\cos(90-\theta_\alpha), \sin(90-\theta_\alpha)) \qquad \text{Expression 30.}$$

Next, the reflection light L' is represented by vector.

A vector of the reflection light is represented by Expression 31.

$$\vec{L}'(A',B') \qquad \text{Expression 31.}$$

Here, the incident light vector is represented by Expression 32, the reflection light vector is represented by Expression 33, and the mirror normal vector is represented by Expression 34.

$$\vec{L} \qquad \text{Expression 32.}$$

$$\vec{L}'$$ Expression 33.

$$\vec{M}_V$$ Expression 34.

The relation of the incident light vector, the reflection light vector, and the mirror normal vector is expressed by Expressions 35, 36, and 37.

$$k \cdot \vec{M}_V = \vec{L} - \vec{L}' \text{ (}k\text{: constant)}$$ Expression 35.

$$k \cdot (a,b) = (A,B) - (A',B')$$ Expression 36.

$$A' = A - k \cdot a \quad B' = B - k \cdot b$$ Expression 37.

Based on Expression 35 and Expression 37, Expression 38 is obtained.

$$k = \frac{a' \cdot A + b' \cdot B}{a \cdot a' + b \cdot b'} = \frac{a' \cdot A + b' \cdot B}{a \cdot a' + b \cdot b'}.$$ Expression 38

A length calculated by adding a length L from the center of the LRF to the mirror reflection point to the length N of the reflection light L' to the obstacle 301 is a measured range to the obstacle.

An optical path length to scan the mirror by causing the mirror to reflect the laser light is represented as "L+N". Further, by using the laser ranging data obtained by laser light reflected on the mirror with the above-described calculation method, coordinates (x and y) of a measurement point of the laser light is converted to a coordinate system located at the vehicle body 11 as a center, considering an attaching position of the laser ranging sensor 15. Then, the distance information of an estimation value of the self position of the vehicle body 11 calculated based on odometry and the coordinate system located at the vehicle body 11 as a center are converted to distance information of an absolute coordinate system in the installation environment. By so doing, enhancement of the density of laser ranging and the reduction of a ranging cycle can be achieved.

Figure 30:
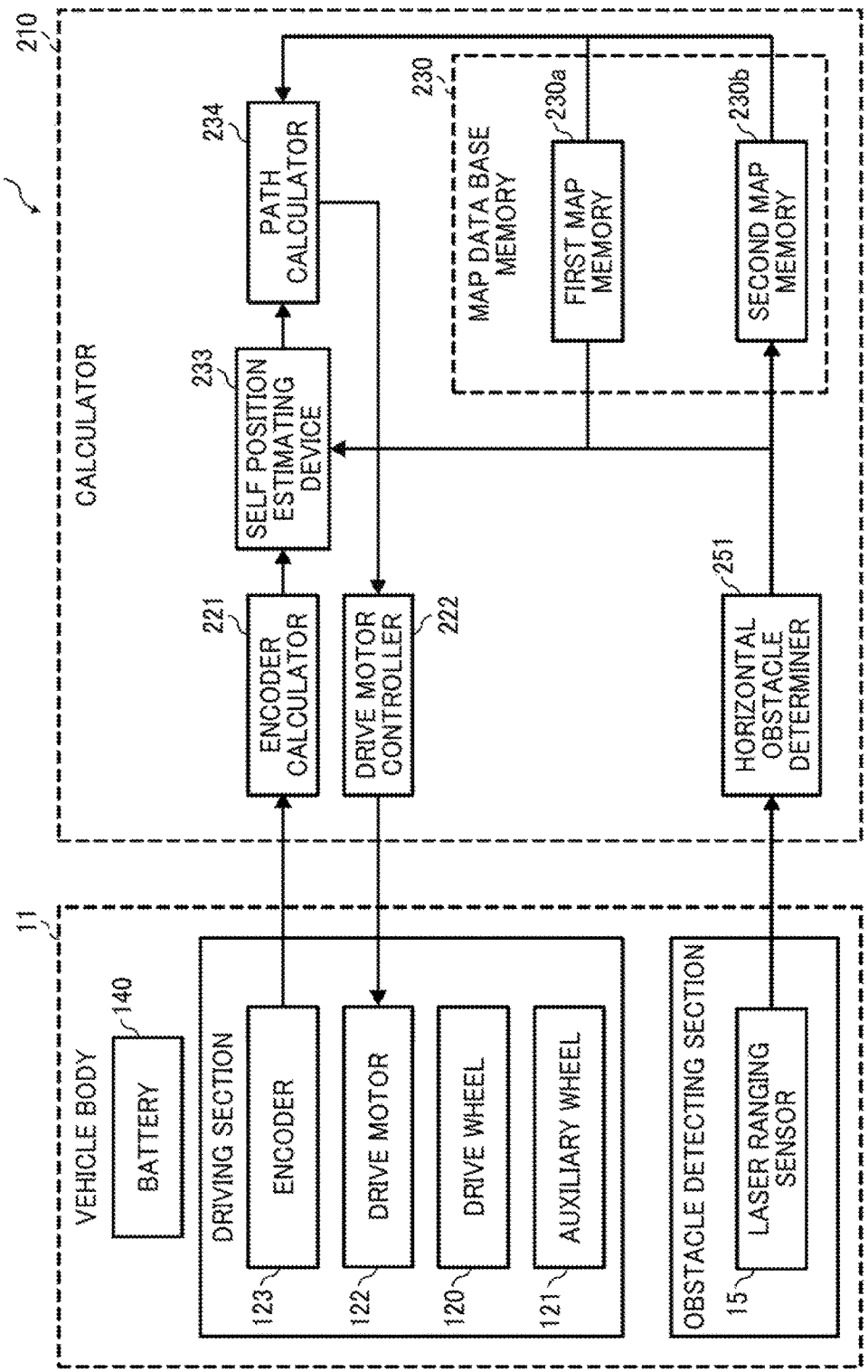
FIG. 30 is a block diagram illustrating a control system of the autonomous traveling robot according to Embodiment 6.

FIG. 30 is a block diagram illustrating an example of the control system of the autonomous traveling robot 1 according to Embodiment 6.

The laser ranging sensor 15 is an optical scanning laser ranging device to measure distance to an object in an installation environment. The calculator 210 includes the horizontal obstacle determiner 251, the self position estimating device 233, and the encoder calculator 221. The self position estimating device 233 estimates the self position based on the distance information obtained by the laser ranging sensor 15. Then, the self position estimating device 233 performs self position estimation to correct the self position obtained based on the amount of movement, using the estimated self position.

In the odometry that calculates the self position based on the accumulated value of the amount of movement, the accumulated error according to the distance of movement increases. The autonomous traveling robot 1 corrects the self position calculated by the odometry by using the self position estimated based on the distance information obtained by the laser ranging sensor 15, thereby grasping the correct self position.

The calculator 210 includes the drive motor controller 222 to control the drive motor 122 that functions as a moving device, based on the self position estimated by the self position estimation.

When the destination of the autonomous traveling robot 1 is set, the path calculator 234 generates the travel path based on the map data (the position information) previously inputted in the first map memory 230*a*. According to the generated travel path, the drive motor controller 222 controls the drive motor controller 222 to start traveling. While traveling, the encoder 123 that is mounted on the drive shaft that is a rotary shaft of the drive wheels 120 monitors the number of rotations of the drive wheels 120. Then, the encoder calculator 221 calculates the amount of movement of the autonomous traveling robot 1.

The autonomous traveling robot 1 measures distance to a surrounding object by the laser ranging sensor 15 at a timing previously determined by the control system. In the configuration of Embodiment 6, the data of measured range by the direct laser light L1 and the data of measured range by the reflection laser light L2 are processed in the horizontal obstacle determiner 251.

The horizontal obstacle determiner 251 compares the data of measured ranges by the direct laser light L1 and the reflection laser light L2 and the map data stored in the first map memory 230*a*, and then determines whether there is an obstacle in the horizontal direction of the laser ranging sensor 15.

Further, based on the result of comparison, the self position estimating device 233 estimates the self position of the autonomous traveling robot 1. In the determination of obstacle in the horizontal direction, there is a case in which an obstacle that is not in the map data stored in the first map memory 230*a*, such as human and other mobile car, is detected, the detection result is stored in the second map memory 230*b*.

The autonomous traveling robot 1 calculates the travel path based on the position information estimated by the self position estimating device 233 and the information stored in the first map memory 230*a* and the second map memory 230*b*. Consequently, the autonomous traveling device 1 can perform efficient autonomous travel to the destination.

FIG. 31 is a flowchart of an example of a control of the autonomous traveling robot 1 according to Embodiment 6.

On starting the control of autonomous traveling, the calculator 210 generates a travel path to a designated destination in step S2000. Then, the autonomous traveling robot 1 start traveling, in step S2001. While traveling, the autonomous traveling robot 1 performs self position estimation based on odometry, in step S2002.

While the autonomous traveling robot 1 is traveling, the control of ranging on the horizontal plane.

Of laser lights that is emitted by the laser ranging sensor 15 while consecutively changing the light emitting direction, the reflection laser light L2 that is direct laser light L1 the mirror 151 obtains data of measured range on a virtual horizontal plane including the light emitting position, in step S2003. By comparing the result obtained based on odometry in step S2002 and the data of measured range obtained in step S2003 with the map information (i.e., geometric information) stored in the first map memory 230*a*, the self position on the map data is estimated, in step S2004.

The estimated self position is overwritten to the second map memory 230*b*, as the present location of the autonomous traveling robot 1, in step S2005.

Based on the data of measured range obtained by the laser light, existence of the obstacle 301 is checked to determine whether the autonomous traveling robot 1 can continue traveling, in step S2006.

When it is determined that the autonomous traveling robot 1 is prohibited to continue traveling (NO in step S2006), the procedure goes back to step S2000 to generate the travel path again.

When it is determined that the autonomous traveling robot 1 can continue traveling (YES in step S2006), the autonomous traveling robot 1 continues traveling, in step S2007. Then, it is determined whether the autonomous traveling robot 1 has reached the destination, in step S2008.

When it is determined that the autonomous traveling robot 1 has not yet reached the destination (NO in step S2008), the procedure goes back to step S2002 to repeat the operation.

When it is determined that the autonomous traveling robot 1 has reached the destination (YES in step S2008), the control of autonomous traveling ends.

The descriptions of the above-described embodiments are given of examples when an mirror (i.e., the mirror 151) to reflect light is employed as an optical path changing device that changes an optical path of laser light that is emitted to the outside of the scanning range in which laser ranging is performed to avoid an obstacle during autonomous travel and to estimate the self position of the autonomous traveling robot 1. However, the optical changing device is not limited to the mirror to reflect light but may be a body that bends light such as a prism and a lens.

The configurations according to the above-descried embodiments are not limited thereto. This disclosure can achieve the following aspects effectively.

Aspect A.

In Aspect A, an autonomous traveling device (for example, the autonomous traveling robot 1) includes a vehicle body (for example, the vehicle body 11), a traveling body (for example, the drive motors 122 and the drive wheels 120), a ranging device (for example, the laser ranging sensor 15), and a reflection body (for example, the mirror 151). The traveling body is configured to move the vehicle body. The ranging device is configured to consecutively change a direction of emission of light beams (for example, laser light beams) while optically scanning a scanning range. The reflection body is configured to change a direction of an optical path of at least part of light beams emitted from the ranging device and reflected to an area other than the center area of the scanning range.

According to this configuration, as descried in the above-described embodiments, the reflection body reflects the light beams emitted in a lateral side or an area other than the center area of the scanning range. Therefore, the light beams from the ranging device are directly emitted in the center area. Accordingly, by disposing the ranging device such that the center area of the scanning range directs in a travel direction of the autonomous traveling device, the ranging device can measure distance in the travel direction of the autonomous traveling device.

In addition, the reflection body reflects the at least part of the light beams emitted in the lateral side on an area other than the center area of the scanning range of the ranging device. Therefore, the ranging device can measure the range in the light reflection direction by the reflection body that is different from the light emitting direction of the ranging device. Accordingly, in Aspect A, while ranging an object in the travel direction of the autonomous traveling device, the laser light that is emitted to the scanning range outside a range to be measured can be used to measure distance different from the light emitting direction of the ranging device (for example, the foot area in the travel direction).

Aspect B.

In Aspect A, the reflection body reflects an incident laser light on a scanning plane (for example, the virtual horizontal plane including the light emitting position) of the ranging device downwardly relative to the scanning plane of the ranging device in the travel direction of the vehicle body.

Accordingly, as descried in Embodiment 1, the laser light beams emitted in a direction other than the travel direction of the autonomous traveling device can be used in laser ranging on the foot area in the travel direction of the autonomous traveling device. Therefore, the laser ranging on the scanning plane in the travel direction and the laser ranging on the foot area in the travel direction can be performed at the same time.

Aspect C.

In Aspects A and B, the autonomous traveling device further includes a light reflecting direction changing device (for example, the mirror retaining unit 160 including the mirror adjusting motor 161) configured to change a light reflecting direction of the reflection body.

According to this configuration, as described in Embodiment 2, an obstacle is detected while the attitude of the reflection body. Therefore, three-dimensional information of the obstacle such as the height can be obtained. Accordingly, the autonomous traveling device can be operated more smoothly.

Aspect D.

In Aspect C having a configuration of Aspect B, the light beams includes direct light beams (for example, the direct laser light L1) emitted directly in the travel direction of the vehicle body from the ranging device without being reflected on the reflection body and reflection light beams (for example, the reflection laser light L2) reflected on the reflection body. When information of an object in front of the vehicle body detected by the direct light beams is different from information of an object in the travel direction of the vehicle body detected by the reflection light beams, the light reflecting direction changing device causes the reflection body to swing at different angles of inclination of the reflection body relative to the scanning plane.

According to this configuration, as described in Embodiment 2, when an obstacle is detected on the foot area in the travel direction of the autonomous traveling device, the height of the obstacle can be grasped. Therefore, when the obstacle has the height over which the autonomous traveling device can climb, the autonomous traveling device can move to the destination along the shortest travel route without detouring the obstacle.

Aspect E.

In Aspect C or D, the reflection body includes multiple reflection bodies (for example, the mirror 151, specifically, the first mirror 151*a* and the second mirror 151*b*) and the light reflecting direction changing device configured to change the light reflecting direction of the respective reflection bodies includes multiple light reflecting direction changing devices (for example, the mirror retaining unit 160 including the mirror adjusting motor 161, specifically, the first mirror retaining unit 160*a* including the first mirror adjusting motor 161*a* and the second mirror retaining unit 160*b* including the second mirror adjusting motor 161*b*). The multiple reflection bodies and the corresponding multiple light reflecting direction changing devices constitute multiple pairs.

According to this configuration, as described in Embodiment 3, a greater amount of information of the shape of the obstacle can be obtained.

Aspect F.

In Aspect E having a configuration of Aspect D, the light reflecting direction changing devices of the multiple pairs cause the corresponding reflection bodies to swing at different angles of inclination in the light reflection direction relative to the scanning plane (for example, the virtual horizontal plane including the light emitting position).

According to this configuration, as described in Embodiment 3, the shape of the obstacle can be detected more quickly.

Aspect G.

In any one of Aspects A through F, the reflection body includes a lateral side reflection body (for example, the side mirrors 152) configured to reflect and direct the reflection light beams toward a foot area on a lateral side of the vehicle body.

According to this configuration, as described in Embodiment 2, the laser light beams emitted in a direction other than the travel direction of the vehicle body can be used to measure distance on the foot area on the side(s) of the vehicle body. Accordingly, the autonomous traveling device can measure distance in the forward horizontal direction and the rearward and obliquely downward direction simultaneously.

Aspect H.

In any one of Aspects A through G, the reflection body includes a rear side reflection body (for example, the rear mirror 153) configured to reflect and direct the reflection light beams toward a foot area on a rear side of the vehicle body.

According to this configuration, as described in Embodiment 5, the laser light beams emitted in a direction other than the travel direction of the vehicle body can be used to measure distance on the foot area on the rear side of the vehicle body. Accordingly, the autonomous traveling device can measure distance in the rearward foot direction and the rearward and obliquely downward direction simultaneously.

Aspect I.

In any of Aspect A, the reflection body includes a reflection body (for example, the mirror 151) configured to reflect incident light beams toward the center area of the scanning range (for example, the travel direction of the autonomous traveling robot 1) of the ranging device (for example, the laser ranging sensor 15).

Accordingly, as descried in Embodiment 6, the laser light beams emitted in a direction other than the center of the scanning range of the ranging device can be used to measure distance in the center area of the scanning range. Accordingly, the ranging performance around the center area of the scanning range can be enhanced.

Aspect J.

In any one of Aspects A through I, the reflection body is disposed on the vehicle body at a position (for example, the light emitting position) behind which the ranging device emits the light beams while optically scanning.

Accordingly, as described in Embodiment 1, the laser light beams emitted in the rearward direction from the position from which the laser light beams are emitted can be used for measuring distance in a direction (the foot area in the travel direction) different from the light emitting direction from the ranging direction.

Aspect K.

In any one of Aspects A through J, the reflection body includes multiple reflection bodies (for example, the multiple mirrors 151).

According to this configuration, as described in Embodiment 3, a greater amount of information of the shape of the obstacle can be obtained.

Aspect L.

In any one of Aspects A through K, the autonomous traveling device further includes an object shape storing device (for example, the second map memory 230*b*) and an object shape checking device (for example, the calculator 210). The object shape storing device is configured to store information of a shape of an object existing around a travel path of the vehicle body. The object shape checking device is configured to generate information of the shape of the object based on a detection result obtained by the ranging device (for example, the laser ranging sensor 15) and compare the information of the shape of the object stored in the object shape storing device and the generated information of the shape of the object.

According to this configuration, as described in Embodiment 6, even though the object moves in installation environment, the object tracking can be performed preferably.

Aspect M.

In any one of Aspects A through L, the autonomous traveling device further includes a storing device (for example, the first map memory 230*a* and the second map memory 230*b*) configured to separately store measured range information obtained by the reflection light beams (for example, the reflection laser light L2) reflected on the reflection body and emitted to an object (for example, the obstacle 301) and measured range information obtained by the direct light beams (for example, the direct laser light L1) directly emitted to the object.

According to this configuration, as described in Embodiment 1, information of the layout of the installation environment and information of a temporary obstacle are grasped individually, and therefore can be managed in each division.

Aspect N.

In Aspect N, an autonomous traveling device (for example, the autonomous traveling robot 1) includes a vehicle body (for example, the vehicle body 11), a traveling body (for example, the drive motors 122 and the drive wheels 120), a ranging device (for example, the laser ranging sensor 15), and an optical path changing device (for example, the mirror 151). The traveling body is configured to move the vehicle body. The ranging device is configured to consecutively change a direction of emission of light beams (for example, laser light beams) while optically scanning a scanning range. The optical path changing device is configured to change a direction of an optical path of at least part of light beams emitted from the ranging device and reflected to an area other than a center area of the scanning range. The optical path changing device changes an angle of inclination downwardly relative to a scanning plane (for example, the virtual horizontal plane including the light emitting position) of the ranging device and changes a direction of an incident light from a lateral direction to a forward direction of the vehicle body.

According to this configuration, as described in Embodiment 1, the laser light beams emitted in a direction of the ends or in an area other than the center area of the scanning range of the ranging device can be used to measure distance in the foot area of the vehicle body. Accordingly, the autonomous traveling device can measure distance in the travel direction of the optical path changing device on the horizontal plane and in a distance on the front foot area simultaneously.

Aspect O.

In Aspect O, an autonomous traveling device (for example, the autonomous traveling robot 1) includes a vehicle body (for example, the vehicle body 11), a traveling body (for example, the drive motors 122 and the drive wheels 120), a ranging device (for example, the laser ranging sensor 15), and an optical path changing device (for example, the mirror 151). The traveling body is configured to move the vehicle body. The ranging device is configured to consecutively change a direction of emission of light beams (for example, laser light beams) while optically scanning a scanning range. The optical path changing device is configured to change a direction of an optical path of at least part of light beams emitted from the ranging device and reflected to an area other than a center area of the scanning range. The optical path changing device (for example, the side mirror 152) includes a device configured to change a direction of an incident light toward a foot area on a lateral side of the vehicle body.

According to this configuration, as described in Embodiment 4, the laser light beams emitted in a direction of the ends or an area other than the center area of the scanning range of the ranging device can be used to measure distance in the foot area of the vehicle body. Accordingly, the autonomous traveling device can range or measure distance in the forward direction and the obliquely downward direction on the foot area on a lateral side of the vehicle body simultaneously.

Aspect P.

In Aspect P, an autonomous traveling device (for example, the autonomous traveling robot 1) includes a vehicle body (for example, the vehicle body 11), a traveling body (for example, the drive motors 122 and the drive wheels 120), a ranging device (for example, the laser ranging sensor 15), and an optical path changing device (for example, the mirror 151). The traveling body is configured to move the vehicle body. The ranging device is configured to consecutively change a direction of emission of light beams (for example, laser light beams) while optically scanning a scanning range. The optical path changing device is configured to change a direction of an optical path of at least part of light beams emitted from the ranging device and reflected to an area other than a center area of the scanning range. The optical path changing device (for example, the side mirror 152) includes a device configured to change a direction of an incident light toward a foot area on a rear side of the vehicle body.

According to this configuration, as described in Embodiment 5, the laser light beams emitted in a direction of the ends or an area other than the center area of the scanning range of the ranging device can be used to measure distance in the rearward and obliquely downward direction on the foot area of the vehicle body. Accordingly, the autonomous traveling device can range or measure distance in the forward direction and the rearward and obliquely downward direction on the foot area on a rear side of the vehicle body simultaneously.

Aspect Q.

In any one of Aspects A through P, an autonomous traveling device (for example, the autonomous traveling robot 1) further includes an obstacle detector (for example, the horizontal obstacle detector 251 and the foot area obstacle detector 252), a self position estimating device (for example, the self position estimating device 233), and a traveling body controller (for example, the drive motor controller 222). The obstacle detector is configured to detect an obstacle based on range information of a distance obtained by the ranging device. The self position estimating device is configured to estimate a self position based on the range information and correct a self position obtained by an amount of movement of the vehicle body using the estimated self position. The traveling body controller is configured to control the traveling body based on the obstacle information obtained by the obstacle detector and the self position corrected by the self position estimating device.

According to this configuration, as described in the embodiments above, the autonomous traveling device (for example, the autonomous traveling robot 1) that performs autonomous travel using the results detected by the ranging device.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An autonomous traveling device comprising:
   a vehicle body;
   a traveling body configured to move the vehicle body;
   a ranging device configured to consecutively change a direction of emission of light beams while optically scanning a scanning range; and
   a reflection body configured to change a direction of an optical path of at least part of light beams emitted from the ranging device and reflected to an area other than a center area of the scanning range,
   wherein an entire scanning surface of the reflection body on the vehicle body is disposed behind a light emitting position at which the ranging device emits the light beams while optically scanning, relative to a travel direction of the vehicle body, and
   wherein the reflection body reflects the at least part of the light beams emitted from the ranging device to a foot area in the travel direction of the vehicle body without changing an arrangement angle of the reflection body.

2. The autonomous traveling device according to claim 1, wherein the reflection body reflects an incident light on a scanning plane of the ranging device downwardly relative to the scanning plane of the ranging device in the travel direction of the vehicle body.

3. The autonomous traveling device according to claim 2, further comprising a light reflecting direction changing device configured to change a light reflecting direction of the reflection body.

4. The autonomous traveling device according to claim 3, wherein the light beams includes direct light beams emitted directly in the travel direction of the vehicle body from the ranging device without being reflected on the reflection body and reflection light beams reflected on the reflection body, and
   wherein, when information of an object in front of the vehicle body detected by the direct light beams is different from information of an object in the travel direction of the vehicle body detected by the reflection light beams, the light reflecting direction changing device causes the reflection body to swing at different angles of inclination of the reflection body relative to the scanning plane.

5. The autonomous traveling device according to claim 4, wherein the reflection body includes multiple reflection bodies and the light reflecting direction changing device configured to change the light reflecting direction of the respective reflection bodies includes multiple light reflecting direction changing devices, and wherein the multiple reflection bodies and the corresponding multiple light reflecting direction changing devices constitute multiple pairs.

6. The autonomous traveling device according to claim 5, wherein the light reflecting direction changing devices of the multiple pairs cause the corresponding reflection bodies to swing at different angles of inclination in the light reflection direction relative to the scanning plane.

7. The autonomous traveling device according to claim 1, wherein the reflection body includes a lateral side reflection body configured to reflect and direct the reflection light beams toward the foot area on a lateral side of the vehicle body.

8. The autonomous traveling device according to claim 7, wherein the reflection body includes a rear side reflection body configured to reflect and direct the reflection light beams toward the foot area on a rear side of the vehicle body.

9. The autonomous traveling device according to claim 1, wherein the reflection body includes a reflection body configured to reflect incident light beams toward the center area of the scanning range of the ranging device.

10. The autonomous traveling device according to claim 1, wherein the reflection body includes multiple reflection bodies.

11. The autonomous traveling device according to claim 1, further comprising:
an object shape storing device configured to store information of a shape of an object existing around a travel path of the vehicle body; and
an object shape checking device configured to generate information of the shape of the object based on a detection result obtained by the ranging device and compare the information of the shape of the object stored in the object shape storing device and the generated information of the shape of the object.

12. The autonomous traveling device according to claim 1, further comprising a storing device configured to separately store measured range information obtained by the reflection light beams reflected on the reflection body and emitted to an object and measured range information obtained by the direct light beams directly emitted to the object.

13. The autonomous traveling device according to claim 1, further comprising:
an obstacle detector configured to detect an obstacle based on range information of a distance obtained by the ranging device;
a self position estimating device configured to estimate a self position based on the range information and correct a self position obtained by an amount of movement of the vehicle body using the estimated self position; and
a traveling body controller configured to control the traveling body based on the obstacle information obtained by the obstacle detector and the self position corrected by the self position estimating device.

14. An autonomous traveling device comprising:
a vehicle body;
a traveling body configured to move the vehicle body;
a ranging device configured to consecutively change a direction of emission of light beams while optically scanning a scanning range; and
an optical path changing device configured to change a direction of an optical path of at least part of light beams emitted from the ranging device and reflected to an area other than a center area of the scanning range,
the optical path changing device changing an angle of inclination downwardly relative to a scanning plane of the ranging device and changing a direction of an incident light to a forward direction in a width of the vehicle body,
wherein an entire scanning surface of the optical path changing device on the vehicle body is disposed behind a light emitting position at which the ranging device emits the light beams while optically scanning, relative to a travel direction of the vehicle body, and
wherein the optical path changing device reflects the at least part of the light beams emitted from the ranging device to a foot area in the travel direction of the vehicle body without changing an arrangement angle of the optical path changing device.

15. An autonomous traveling device comprising:
a vehicle body;
a traveling body configured to move the vehicle body;
a ranging device configured to consecutively change a direction of emission of light beams while optically scanning a scanning range; and
an optical path changing device configured to change a direction of an optical path of at least part of light beams emitted from the ranging device and reflected to an area other than a center area of the scanning range,
the optical path changing device including a device configured to change a direction of an incident light toward a foot area of the vehicle body,
wherein an entire scanning surface of the optical path changing device on the vehicle body is disposed behind a light emitting position at which the ranging device emits the light beams while optically scanning, relative to a travel direction of the vehicle body, and
wherein the optical path changing device reflects the at least part of the light beams emitted from the ranging device to the foot area in the travel direction of the vehicle body without changing an arrangement angle of the optical path changing device.

16. The autonomous traveling device according to claim 15, wherein the optical path changing device including a device configured to change a direction of an incident light toward the foot area on a lateral side of the vehicle body.

17. The autonomous traveling device according to claim 15, wherein the optical path changing device including a device configured to change a direction of an incident light toward the foot area on a rear side of the vehicle body.

* * * * *